US011310857B2

(12) United States Patent
Kawasaki et al.

(10) Patent No.: US 11,310,857 B2
(45) Date of Patent: Apr. 19, 2022

(54) TERMINAL APPARATUS, CONTROL APPARATUS, GATEWAY, AND COMMUNICATION CONTROL METHOD

(71) Applicants: SHARP KABUSHIKI KAISHA, Sakai (JP); FG INNOVATION COMPANY LIMITED, Tuen Mun (HK)

(72) Inventors: Yudai Kawasaki, Sakai (JP); Masafumi Aramoto, Sakai (JP)

(73) Assignees: SHARP KABUSHIKI KAISHA, Osaka (JP); FG Innovation Company Limited, Tuen Mun (HK)

(*) Notice: Subject to any disclaimer, the term of this patent is extended or adjusted under 35 U.S.C. 154(b) by 0 days.

(21) Appl. No.: 16/895,645

(22) Filed: Jun. 8, 2020

(65) Prior Publication Data

US 2020/0314936 A1  Oct. 1, 2020

Related U.S. Application Data

(63) Continuation of application No. 16/314,614, filed as application No. PCT/JP2017/024384 on Jul. 3, 2017.

(30) Foreign Application Priority Data

Jul. 4, 2016 (JP) .................................. 2016-132768

(51) Int. Cl.
*H04W 76/16* (2018.01)
*H04W 76/11* (2018.01)
(52) U.S. Cl.
CPC ............ *H04W 76/16* (2018.02); *H04W 76/11* (2018.02)

(58) Field of Classification Search
CPC ......... H04L 12/1403; H04W 36/0033; H04W 4/00; H04W 28/08; H04W 48/17;
(Continued)

(56) References Cited

U.S. PATENT DOCUMENTS

2006/0264217 A1  11/2006  Shaheen
2012/0113968 A1   5/2012  Zhou et al.
(Continued)

FOREIGN PATENT DOCUMENTS

JP   2008-541669 A   11/2008
JP   2012-531134 A   12/2012
(Continued)

OTHER PUBLICATIONS

3GPP TR 23.799 V0.5.0(May 2016); 3rd Generation Partnership Project; Technical Specification Group Services and System Aspects; Study on Architecture for Next Generation System (Release 14).
(Continued)

*Primary Examiner* — Khoa Huynh
(74) *Attorney, Agent, or Firm* — ScienBiziP, P.C.

(57) ABSTRACT

To provide a communication control means for establishing a session suitable for a terminal apparatus connecting to multiple access networks of various kinds and a network apparatus, a user data communication control means suitable for a terminal apparatus that has established sessions via multiple access networks and a network apparatus, and the like. This provides a communication control means suitable for a terminal apparatus and a network apparatus that support connection to multiple access networks of various kinds.

8 Claims, 20 Drawing Sheets

(58) Field of Classification Search
CPC ..... H04W 76/11; H04W 76/15; H04W 76/16; H04W 88/06; H04W 88/16
See application file for complete search history.

(56) References Cited

U.S. PATENT DOCUMENTS

| | | | |
|---|---|---|---|
| 2014/0086141 A1* | 3/2014 | Morioka | H04W 52/02 370/315 |
| 2015/0156336 A1* | 6/2015 | Tamura | H04W 48/18 455/406 |
| 2015/0305070 A1 | 10/2015 | Ahmad | |
| 2015/0382264 A1 | 12/2015 | Cho et al. | |
| 2016/0337909 A1* | 11/2016 | Cai | H04W 36/0033 |
| 2018/0262930 A1 | 9/2018 | da Silva et al. | |
| 2019/0320339 A1* | 10/2019 | Laselva | H04W 28/0221 |

FOREIGN PATENT DOCUMENTS

| | | |
|---|---|---|
| JP | 2016-503609 A | 2/2016 |
| JP | 2016-513431 A | 5/2016 |

OTHER PUBLICATIONS

Non-Final Office Action dated Mar. 3, 2020 for U.S. Appl. No. 16/314,614.

* cited by examiner

FIG. 5B

| IMSI |
|---|
| EMM State |
| GUTI |
| ME Identity |
| Mobility Type |
| Handover Information |

FIG. 5C

| APN in Use (Data Network Identifier) |
|---|
| Assigned Session Type (Assigned PDN Type) |
| IP Address(es) |
| Default Bearer |
| Mobility Type |
| Handover Information |

FIG. 5D

| EPS Bearer ID |
|---|
| TI |
| TFT |

| |
|---|
| IMSI |
| MSISDN |
| MM State |
| GUTI |
| ME Identity |
| UE Radio Access Capability |
| UE Network Capability |
| MS Network Capability |
| Access Restriction |
| MME F-TEID |
| SGW F-TEID |
| eNB Address |
| MME UE S1AP ID |
| eNB UE S1AP ID |
| 5GBS Address |
| 5GBS ID |
| WAG Address |
| WAG ID |
| Mobility Type |
| Handover Information |

| |
|---|
| APN in Use (Data Network Identifier) |
| Assigned Session Type (PDN Type) |
| IP Address(es) |
| PGW F-TEID |
| SCEF ID |
| Default bearer |
| Mobility Type |
| Handover Information |

FIG. 9D

| |
|---|
| EPS Bearer ID |
| TI |
| TFT |
| SGW F-TEID |
| PGW F-TEID |
| MME F-TEID |
| eNB/5GBS/WAG address |
| eNB/5GBS/WAG ID |

FIG. 11B

| |
|---|
| IMSI |
| ME Identity |
| MSISDN |
| MME F-TIED |
| SGW F-TIED |

FIG. 11C

| |
|---|
| APN in Use (Data Network Identifier) |
| Assigned Session Type (PDN Type) |
| SGW F-TEID |
| PGW F-TEID |
| Default Bearer |
| IP Address(es) |

FIG. 11D

| |
|---|
| EPS Bearer ID |
| TFT |
| PGW F-TEID |
| SGW F-TEID |
| eNB F-TEID |
| MME/5GBS/WAG address |
| MME/5GBS/WAG ID |

FIG. 12B

| IMSI |
|---|
| ME Identity |
| MSISDN |
| RAT type |

FIG. 12C

| APN in Use (Data Network Identifier) |
|---|

FIG. 12D

| Assigned Session Type (PDN Type) |
|---|
| IP Address(es) |
| SGW F-TEID |
| PGW F-TEID |
| Default Bearer |

FIG. 12E

| EPS Bearer ID |
|---|
| TFT |
| SGW F-TEID |
| PGW F-TEID |

| User Identity |
|---|
| APN in Use (Data Network Identifier) |
| EPS Bearer ID |
| Serving Node Information |

FIG. 13B

TERMINAL APPARATUS, CONTROL APPARATUS, GATEWAY, AND COMMUNICATION CONTROL METHOD

TECHNICAL FIELD

The present invention relates to a terminal apparatus, a control apparatus, a gateway, and a communication control method. This application claims priority based on JP 2016-132768 filed on Jul. 4, 2016 in Japan, the contents of which are incorporated herein in its entirety by reference.

BACKGROUND ART

The 3rd Generation Partnership Project (3GPP), which undertakes activities for standardizing recent mobile communication systems, discusses System Architecture Enhancement (SAE), which is the system architecture of the Long Term Evolution (LTE). The 3GPP is in the process of creating specifications for the Evolved Packet System (EPS) as a communication system which realizes an all-IP architecture. Note that a core network constituting EPS is called an Evolved Packet Core (EPC).

Moreover, in recent years, the 3GPP also discusses next generation communication technologies and system architectures for 5th Generation (5G) mobile communication systems, which are next generation mobile communication systems, and discusses Architecture for Next Generation System (NextGen) as a discussion about a next generation communication technology. In NextGen, technical problems for connecting various terminals to a cellular network are extracted, and solutions are standardized.

Requirements are, for example, optimization and diversification of communication procedures for supporting intermittent mobile communication services for terminals supporting various access networks, optimization of system architectures in line with the optimization and diversification of communication procedures, and the like.

CITATION LIST

Non Patent Literature

NPL 1: 3GPP TR 23.799 V0.5.0 (2016-05); 3rd Generation Partnership Project; Technical Specification Group Services and System Aspects; Study on Architecture for Next Generation System; (Release 14)

SUMMARY OF INVENTION

Technical Problem

In NextGen, optimization of session management in mobile communication services between a terminal and a network apparatus is under discussion.

More specifically, discussions have been conducted for providing intermittent mobile communication services suitable for terminals and network apparatuses by diversifying access networks used in a session establishment procedure and a user data communication procedure.

However, there are no known means for establishing a session for a terminal supporting various access networks and a network apparatus, a means for realizing various user data communication means, and the like.

The present invention has been made in view of these circumstances, and an object of the present invention is to provide a means for session establishment, a communication control means for realizing various kinds of user data communication, and the like.

Solution to Problem

A terminal apparatus according to the present invention includes: a transmission and/or reception unit configured to receive a session establishment accept message including at least first identification information, from a core network or an access network via a Non-3GPP access in a first session establishment procedure; and a controller configured to establish a session supporting Access Traffic Splitting with the core network, based on the first session establishment procedure, wherein the first identification information is information indicating that the session supporting Access Traffic Splitting is established, and the session is a session in which communication through a first communication path via the Non-3GPP access is possible.

A communication control method of a terminal apparatus according to the present invention includes the steps of: receiving a session establishment accept message including at least first identification information, from a core network or an access network via a Non-3GPP access in a first session establishment procedure; and establishing a session supporting Access Traffic Splitting with the core network, based on the first session establishment procedure. The first identification information is information indicating that a session supporting Access Traffic Splitting is established. The session is a session in which communication through a first communication path via the Non-3GPP access is possible.

A control apparatus included in a core network according to the present invention includes: a transmission and/or reception unit configured to receive a session establishment request message including at least first identification information, from a terminal apparatus via a 3GPP access in a session establishment procedure, wherein the transmission and/or reception unit transmits a session establishment accept message including at least second identification information, to the terminal apparatus via a 3GPP access in the session establishment procedure, the first identification information is information indicating that establishment of a session supporting Access Traffic Splitting is requested, and the second identification information is information indicating that establishment of a session supporting Access Traffic Splitting is established.

A communication control method of a control apparatus included in a core network according to the present invention includes the steps of: receiving a session establishment request message including at least first identification information, from a terminal apparatus via the 3GPP access in a session establishment procedure; and transmitting a session establishment accept message including at least first identification information, to the terminal apparatus via the 3GPP access in the session establishment procedure, wherein the first identification information is information indicating that establishment of a session supporting Access Traffic Splitting is requested, and the second identification information is information indicating that establishment of the session supporting Access Traffic Splitting is established.

A gateway that connects an access network and a core network according to the present invention includes a transmission and/or reception unit configured to transmit a session establishment accept message including at least first identification information, to a terminal apparatus via a Non-3GPP access in a session establishment procedure, wherein the first identification information is information indicating that a session supporting Access Traffic Splitting is established.

A communication control method of a gateway for connecting an access network and a core network according to the present invention includes a step of transmitting a session establishment accept message including at least first identification information, to a terminal apparatus via a Non-3GPP access in a session establishment procedure, wherein the first identification information is information indicating that a session supporting Access Traffic Splitting is established.

Advantageous Effects of Invention

According to the present invention, a terminal is capable of connecting to a core network via multiple access networks simultaneously and also realizing various kinds of user data communication. Moreover, a core network is capable of accommodating a terminal apparatus connecting to various access networks and also providing a mobile communication service.

BRIEF DESCRIPTION OF DRAWINGS

FIGS. 2A and 2B are diagrams illustrating an example of a configuration of a mobile communication network, and the like.

FIGS. 3A and 3B are diagrams illustrating an example of the configuration of the mobile communication network, and the like.

FIGS. 5B to 5D are diagrams illustrating a storage unit of the UE.

FIG. 8B is a diagram illustrating a storage unit of the MME.

FIGS. 9C and 9D are diagrams illustrating the storage unit of the MME.

FIGS. 11B to 11D are diagrams illustrating a storage unit of the SGW.

FIGS. 12B to 12E are diagrams illustrating a storage unit of the PGW.

FIG. 13B is a diagram illustrating a storage unit of the SCEF.

DESCRIPTION OF EMBODIMENTS

Hereinafter, preferred embodiments for carrying out the present invention will be described with reference to the drawings. Note that as an example, the present embodiments describes embodiments of a mobile communication system to which the present invention is applied.

1. EMBODIMENTS 1.1. System Overview

Figure 1:
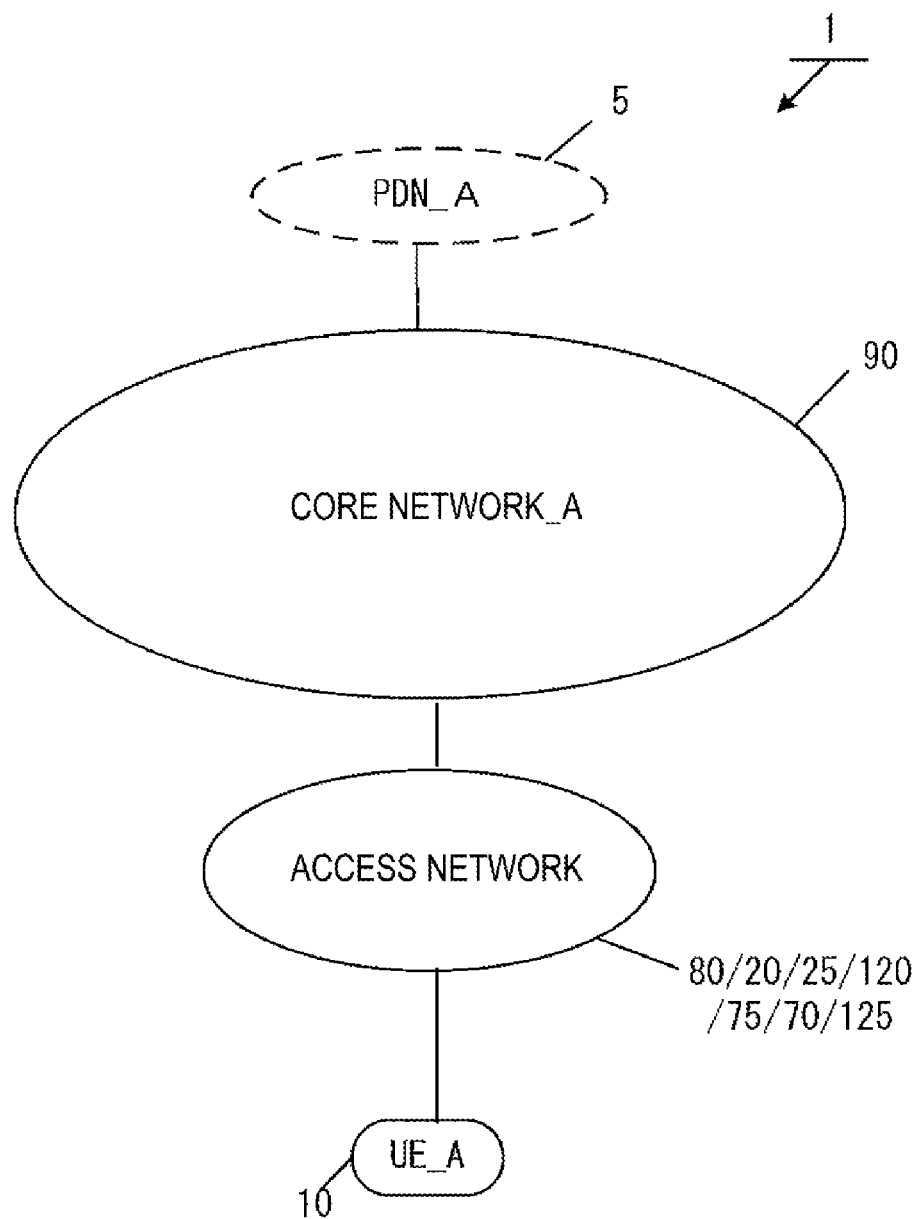
FIG. 1 is a diagram illustrating an overview of a mobile communication system.

FIG. 1 is a diagram illustrating an overview of a mobile communication system according to the present embodiment. As illustrated in FIG. 1, a mobile communication system 1 includes a mobile terminal apparatus UE_A 10, an access network, a core network_A 90, and a Packet Data Network (PDN)_A 5. Here, the UE_A 10 may be any wirelessly connectable terminal apparatus, and may be a User equipment (UE), a Mobile Equipment (ME), or a Mobile Station (MS). The UE_A 10 may be a Cellular Internet of Things (CIoT) terminal. Note that the CIoT terminal is an Internet of Things (IoT) terminal connectable to the core network_A 90, and the IoT terminal includes a mobile phone terminal such as a smartphone and may be any of various IT apparatuses such as a personal computer and a sensor apparatus.

Moreover, the UE_A 10 is capable of connecting to the access network and/or the core network_A 90. Moreover, the UE_A 10 is capable of connecting to the PDN_A 5 via the access network and/or the core network_A 90 and is also configured to transmit and/or receive user data to and/or from the PDN_A 5. Note that the user data may be data transmitted and/or received between the UE_A 10 and the PDN_A 5. Moreover, user data transmission and/or reception may be performed through a Packet Data Unit (PDU) session. Moreover, user data communication may be non-IP communication without being limited to IP communication.

Here, a PDU session is connectivity established between the UE_A 10 and the PDN_A 5 to provide a PDU connection service performing transmission and/or reception of user data between the UE_A 10 and the PDN_A 5. More specifically, the PDU session may be connectivity established between the UE_A 10 and an external gateway device. Here, the external gateway device may be a device connecting the core network_A 90 and the PDN_A 5, such as the PGW_A 30 or the SCEF_A 46.

Alternatively, the PDU session may be a communication path established to transmit and/or receive user data between the UE_A 10, and the core network_A 90 and/or the PDN_A 5, and may be a communication path to transmit and/or receive a PDU. Furthermore, the PDU session may be a session established between the UE_A 10, and the core network_A 90 and/or the PDN_A 5 and may be a logical communication path constituted of transfer paths such as one or multiple bearers between each device in the mobile communication system 1. More specifically, the PDU session may be connection established by the UE_A 10 between the core network_A 90 and an external gateway device, and may be connection such as Packet Data Network Connection (PDN Connection) established between the UE_A 10, and the PGW_A 30 and/or the SCEF_A 46.

Note that a PDU session may be connectivity and/or connection between the UE_A 10 and the PGW_A 30 via an eNB_A 45 and/or a SGW_A 35, or may be connectivity and/or connection between the UE_A 10 and the SCEF_A 46 via the eNB_A 45 and/or a MME_A 40. Here, define a PDU session established between the UE_A 10 and the PGW_A 30 via a device in the access network and the SGW_A 35 as a first PDU session, and define a PDU session established between the UE_A 10 and SCEF_A 46 via a device in the access network and the MME_A 40 as a second PDU session.

Note that a device such as an application server placed in the UE_A 10 and the PDN_A 5 can perform transmission and/or reception of user data by using the PDU session. In other words, the PDU session can transfer user data transmitted and/or received by a device such as an application server placed in the UE_A 10 and the PDN_A 5. Furthermore, each device (the UE_A 10, and/or a device in the access network, and/or a device in the core network_A 90) may manage one or multiple identification information in association with a PDU session. Note that the identification information may include one or more of an APN, a TFT, a session type, application identification information, identification information of the PDN_A 5, network slice identification information, and access network identification information, or may further include other information. Furthermore, in a case of establishing multiple PDU sessions, each identification information associated with a PDU session may be the same contents, or may be different contents.

IP communication is data communication that uses Internet Protocol (IP), and is data communication implemented by transmission and/or reception of an IP packet to which an IP header is given. Note that a payload portion constituting an IP packet may include user data transmitted and/or received by the UE_A 10. Non-IP communication is communication of data without using IP, and is data communication implemented by transmission and/or reception of data to which an IP header is not given. For example, non-IP communication may be data communication implemented by transmission and/or reception of application data to which an IP packet is not given, or may transmit and/or receive user data transmitted and/or received by the UE_A 10 with another given header such as a MAC header and an Ethernet (trade name) frame header.

Furthermore, the PDN_A 5 is a Data Network (DN) which provides a communication service to the UE_A 10. Note that the DN may be configured as a packet data service network, or may be configured for each service. Furthermore, the PDN_A 5 may include a connected communication terminal. Therefore, connecting with the PDN_A 5 may be connecting with a communication terminal located in the PDN_A 5, and furthermore, transmitting and/or receiving user data to and/or from the PDN_A 5 may be transmitting and/or receiving user data to and/or from a communication terminal located in the PDN_A 5.

Furthermore, the access network is a radio network connected with the UE_A 10 and/or the core network_A 90. The access network may be a 3GPP access network, or may be a non-3GPP access network. Note that the 3GPP access network may be an Evolved Universal Terrestrial Radio Access Network (E-UTRAN)_A 80, a Universal Terrestrial Radio Access Network (UTRAN)_A 20, a GSM (trade name) EDGE Radio Access Network (GERAN)_A 25, and a Next Generation Radio Access Network (NextGen RAN)_A 120, and the non-3GPP access network may be a WLAN ANb 75, a WLAN ANa 70, and a WLAN ANc 125. Note that the UE_A 10 may connect with the access network to connect with the core network_A 90, and may connect with the core network_A 90 via the access network.

Furthermore, the core network_A 90 is an IP mobile communication network operated by a Mobile Operator connected with the access network and/or the PDN_A 5. The core network_A 90 may be a core network for a Mobile Operator to operate and manage the mobile communication system 1, or may be a core network for a virtual Mobile Operator such as a Mobile Virtual Network Operator (MVNO). Alternatively, the core network_A 90 may be a core network for accommodating a CIoT terminal. Note that the core network_A 90 may be an Evolved Packet Core (EPC) for an Evolved Packet System (EPS), or may be a Next Generation Core (NextGen Core) for a Next Generation System (NextGen System).

Next, an example of a configuration of the core network_A 90 will be described. In the present embodiment, two configuration examples of the core network_A 90 will be described. Note that the core network_A 90 may be a first core network, a second core network, or a combination of these. Moreover, the first core network may be an EPC, and the second core network may be a NextGen Core. Furthermore, the first core network and/or the second core network may be constituted by a system optimized for IoT.

Figure 2A:
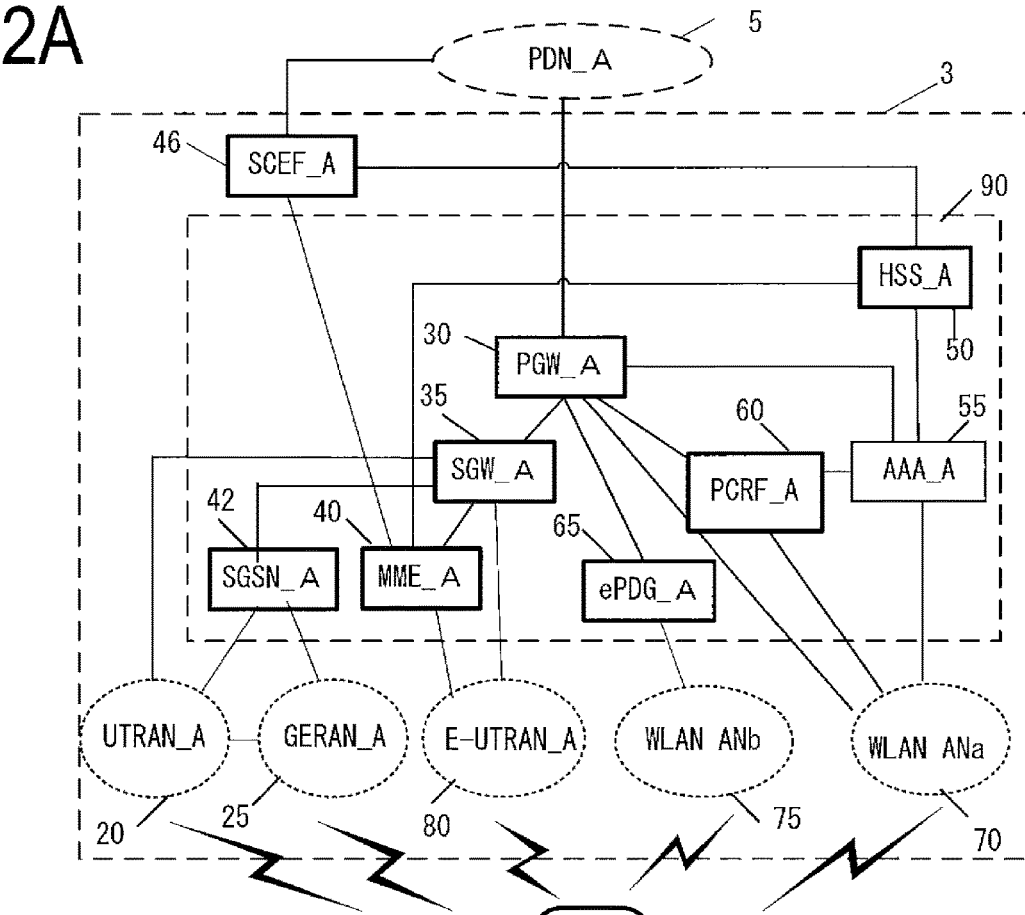
Figure 2B:
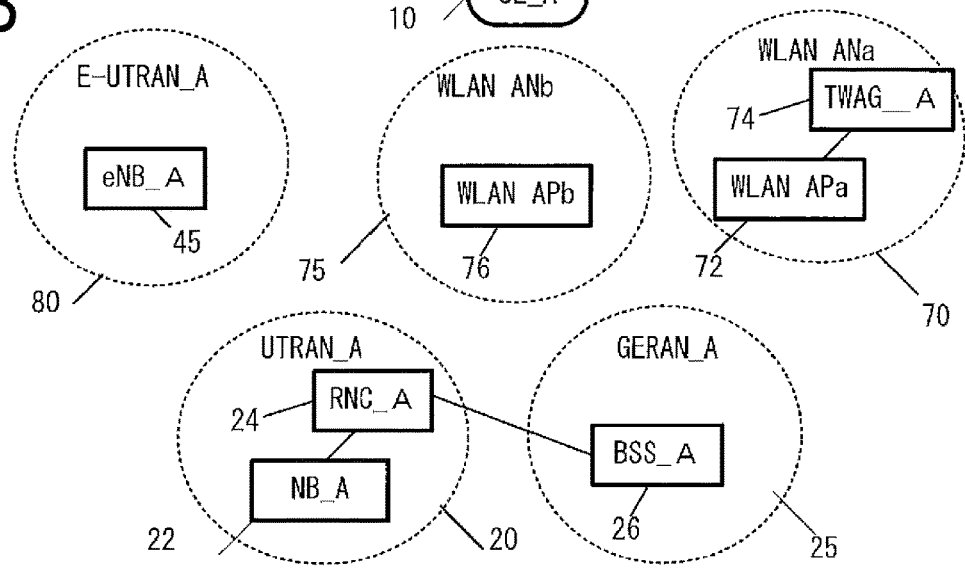

First, an example of the configuration of the core network_A 90 in a case that the core network_A 90 is a first core network is illustrated in FIGS. 2A and 2B. The core network_A 90 in FIG. 2A includes a Home Subscriber Server (HSS)_A 50, an Authentication Authorization Accounting (AAA)_A 55, a Policy and Charging Rules Function (PCRF)_A 60, a Packet Data Network Gateway (PGW)_A 30, an enhanced Packet Data Gateway (ePDG)_A 65, a Serving Gateway (SGW)_A 35, a Mobility Management Entity (MME)_A 40, a Serving GPRS Support Node (SGSN)_A 42, and a Service Capability Exposure Function (SCEF)_A 46. Furthermore, the core network_A 90 is capable of connecting to multiple radio access networks (the E-UTRAN_A 80, the WLAN ANb 75, the WLAN ANa 70, the UTRAN_A 20, and the GERAN_A 25).

Such a radio access network may be configured by connecting to multiple different access networks, or may be configured by connecting to either one of the access networks. Moreover, the UE_A 10 is capable of wirelessly connecting to the radio access network. Moreover, a WLAN Access Network b (WLAN ANb 75) that connects to the core network via the ePDG_A 65 and a WLAN Access Network a (WLAN ANa 70) that connects to the PGW_A 30, the PCRF_A 60, and the AAA_A 55 can be configured as access networks connectable in a WLAN access system. Note that each apparatus has a similar configuration to those of the apparatuses of the related art in a mobile communication system using EPS, and thus detailed descriptions thereof are omitted. Each apparatus will be described briefly hereinafter.

The PGW_A 30 is connected to the PDN_A 5, the SGW_A 35, the ePDG_A 65, the WLAN ANa 70, the PCRF_A 60, and the AAA_A 55, and serves as a relay apparatus configured to transfer user data by functioning as a gateway apparatus between the PDN_A 5 and/or a DN and the core network_A 90. Note that the PGW_A 30 may be a gateway apparatus for IP communication and/or non-IP communication. Moreover, the PGW_A 30 may have a function of transferring IP communication and/or may have a function of converting between non-IP communication and IP communication. Note that multiple gateways thus configured may be provided in the core network_A 90. Moreover, multiple gateways each of which connects the core network_A 90 and a single DN may also be provided.

Moreover, the PGW_A 30 may be an UP network apparatus (U-Plane Network Function) having a contact with the PDN_A 5 and configured to transfer user data, or may be a User Plane Gateway (UP GW), which is a gateway for transferring user data between the PDN_A 5 and the core network.

The SGW_A 35 is connected to the PGW_A 30, the MME_A 40, the E-UTRAN_A 80, the SGSN_A 42, and the UTRAN_A 20, and serves as a relay apparatus configured to transfer user data by functioning as a gateway apparatus between the core network_A 90 and a 3GPP access network (the UTRAN_A 20, the GERAN_A 25, the E-UTRAN_A 80).

Moreover, the SGW_A 35 may be an UP network apparatus (U-Plane Network Function) having a contact with the access network and configured to transfer user data, or may be a User Plane Gateway (UP GW), which is a gateway for transferring user data between the access network and the core network.

The MME_A 40 is connected to the SGW_A 35, the access network, the HSS_A 50, and the SCEF_A 46 and serves as a control apparatus configured to perform location information management including mobility management and access control for the UE_A 10 via the access network. Moreover, the MME_A 40 may have a function as a session management apparatus configured to manage sessions established by the UE_A 10. Multiple control apparatuses thus configured may be provided in the core network_A 90. For example, a location management apparatus different from the MME_A 40 may be configured. As the MME_A 40, the location management apparatus different from the MME_A 40 may be connected to the SGW_A 35, the access network, the SCEF_A 46, and the HSS_A 50.

Furthermore, in a case that multiple MMEs are included in the core network_A 90, the MMEs may be connected to each other. With this configuration, the context of the UE_A 10 may be transmitted and/or received between the MMEs. As has been described, the MME_A 40 is a management apparatus configured to transmit and/or receive control information associated with mobility management and session management to and/or from the UE_A 10, and may be, in other words, any control plane control apparatus.

Moreover, a description has been given of the example in which the MME_A 40 is included in the core network_A 90. However, in a case that multiple core networks or network slices are configured, the MME_A 40 may be a management apparatus connected to one or more of the core networks or may be a management apparatus connected to multiple network slices.

The multiple core networks or network slices may be networks run by a single network operator or may be networks run by different network operators. Here, the network slices may be logical networks configured so that user data to be delivered through services and the like are divided. The network slices may be network slice instances.

Furthermore, the MME_A 40 may be a relay apparatus configured to transfer user data as a gateway apparatus between the core network_A 90 and the access network. The user data transmitted and/or received from and/or by the MME_A 40 as a gateway apparatus may be small data.

Moreover, the MME_A 40 may be a Network Function playing a role of mobility management for the UE_A 10 or the like, a Network Function playing a role of session management for a PDU session or the like, or a Network Function configured to manage one or multiple network slices. The MME_A 40 may be a network apparatus playing one or multiple of these roles. Note that the network apparatus may be one or multiple apparatuses provided in the core network_A 90, a Control Plane (C-Plane) Function for control information and/or a control message, or Common Control Plane (C-Plane) Function that is in common among multiple network slices.

The HSS_A 50 is connected to the MME_A 40, the AAA_A 55, and the SCEF_A 46 and serves as a managing node that manages subscriber information. The subscriber information of the HSS_A 50 is referred to during MME_A 40 access control, for example. Moreover, the HSS_A 50 may be connected to the location management apparatus different from the MME_A 40. The AAA_A 55 is connected to the PGW_A 30, the HSS_A 50, the PCRF_A 60, and the WLAN ANa 70, and is configured to perform access control for the UE_A 10 connected via the WLAN ANa 70.

The PCRF_A 60 is connected to the PGW_A 30, the WLAN ANa 75, the AAA_A 55, and the PDN_A 5, and is configured to perform QoS management on data delivery. For example, the PCRF_A 60 manages QoS of a communication path between the UE_A 10 and the PDN_A 5. The ePDG_A 65 is connected to the PGW_A 30 and the WLAN ANb 75 and is configured to deliver user data by functioning as a gateway apparatus between the core network_A 90 and the WLAN ANb 75.

The SGSN_A 42 is connected to the UTRAN_A 20, the GERAN_A 25, and the SGW_A 35 and is a control apparatus for location management between a 3G/2G access network (UTRAN/GERAN) and the LTE access network (E-UTRAN). In addition, the SGSN_A 42 includes functions of: selecting the PGW and the SGW; managing a time zone of the UE_A 10; and selecting the MME at the time of handover to the E-UTRAN.

The SCEF_A 46 is connected to the PDN_A 5, the MME_A 40, and the HSS_A 50, and serves as a relay apparatus configured to transfer user data by functioning as a gateway apparatus between the PDN_A 5 and/or a DN and the core network_A 90. Note that the SCEF_A 46 may be a gateway apparatus for non-IP communication. Moreover, the SCEF_A 46 may have a function of converting non-IP communication and IP communication. Multiple gateways thus configured may be provided in the core network_A 90. Moreover, multiple gateways each of which connects the core network_A 90 and a single DN may also be provided.

Additionally, as illustrated in FIG. 2B, each radio access network includes apparatuses to which the UE_A 10 is actually connected (e.g., a base station apparatus and an access point apparatus), and the like. The apparatuses used in these connections can be thought of as apparatuses adapted to the radio access networks.

In the present embodiment, the E-UTRAN_A 80 is a Long Term Evolution (LTE) access network and includes an evolved Node B (eNB)_A 45. The eNB_A 45 is a radio base station to which the UE_A 10 connects through an Evolved Universal Terrestrial Radio Access (E-UTRA), and the E-UTRAN_A 80 may include one or multiple eNBs_A 45. Furthermore, the multiple eNBs may be connected to each other.

The UTRAN_A 20 is a 3G access network and includes a Radio Network Controller (RNC)_A 24 and a Node B (NB)_A 22. The NB_A 22 is a radio base station to which the UE_A 10 connects through a Universal Terrestrial Radio Access (UTRA), and the UTRAN_A 20 may include one or multiple radio base stations. Furthermore, the RNC_A 24 is a controller configured to connect the core network_A 90 and the NB_A 22, and the UTRAN_A 20 may include one or multiple RNCs. Moreover, the RNC_A 24 may be connected to one or multiple NBs_A 22. In addition, the RNC_A 24 may be connected to a radio base station (Base Station Subsystem (BSS)_A 26) included in the GERAN_A 25.

The GERAN_A 25 is a 2G access network and includes the BSS_A 26. The BSS_A 26 is a radio base station to which the UE_A 10 connects through GSM (trade name)/EDGE Radio Access (GERA), and the GERAN_A 25 may include one or multiple radio base stations BSS. Furthermore, the multiple BSSs may be connected to each other. Moreover, the BSS_A 26 may be connected to the RNC_A 24.

The WLAN ANa 70 is a wireless LAN access network and includes a WLAN Access Point (WLAN AP) a 72 and a Trusted WLAN Access Gateway (TWAG)_A 74. The WLAN APa 72 is a radio base station to which the UE_A 10 connects in the WLAN access system trusted by the operator running the core network_A 90, and the WLAN ANa 70 may include one or multiple radio base stations. The TWAG_A 74 serves as a gateway apparatus between the core network_A 90 and the WLAN ANa 70. The WLAN APa 72 and the TWAG_A 74 may be configured as a single apparatus. Even in a case that the operator running the core network_A 90 and the operator running the WLAN ANa 70 are different, such a configuration can be implemented through contracts and agreements between the operators.

Furthermore, the WLAN ANb 75 is a wireless LAN access network and includes a WLAN Access Point (WLAN AP) b 76. The WLAN APb 76 is a radio base station to which the UE_A 10 connects in the WLAN access system in a case that no trusting relationship is established with the operator running the core network_A 90, and the WLAN ANb 75 may include one or multiple radio base stations.

In this manner, the WLAN ANb 75 is connected to the core network_A 90 via the ePDG_A 65, which is an apparatus included in the core network_A 90, serving as a gateway. The ePDG_A 65 has a security function for ensuring security.

Figure 3A:
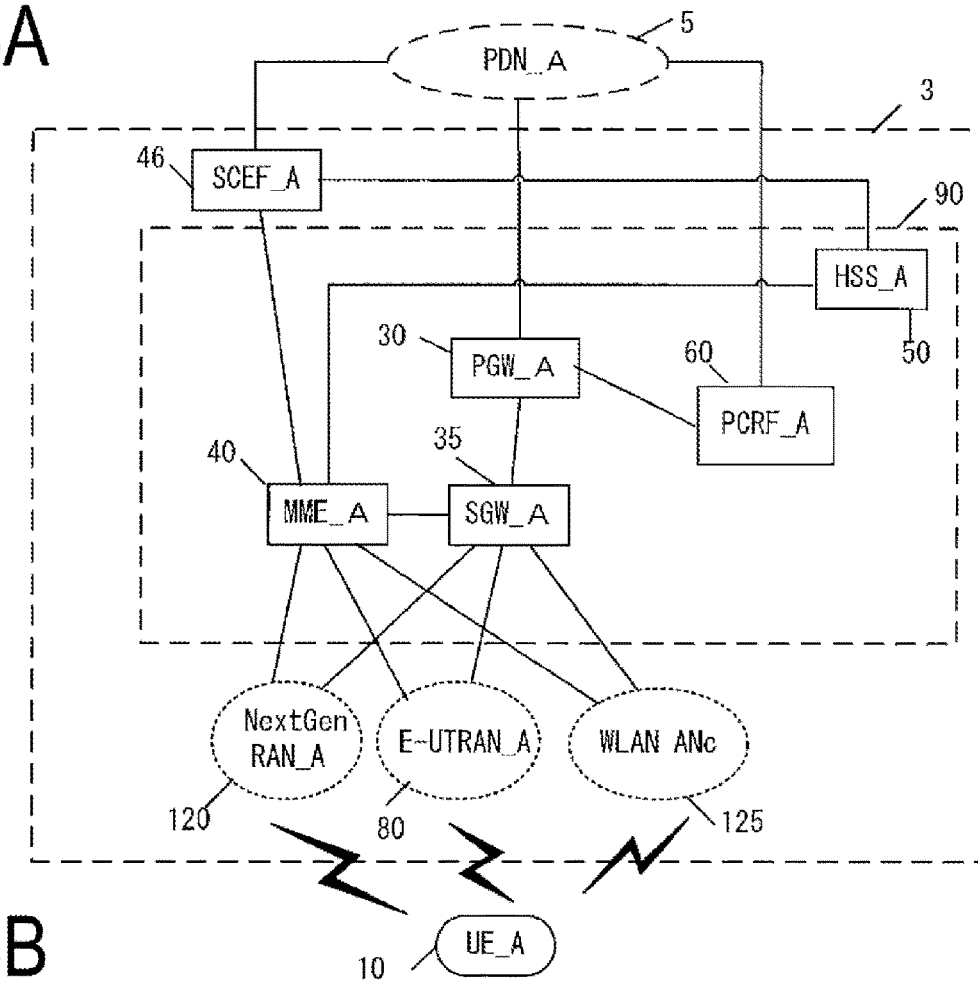
Figure 3B:
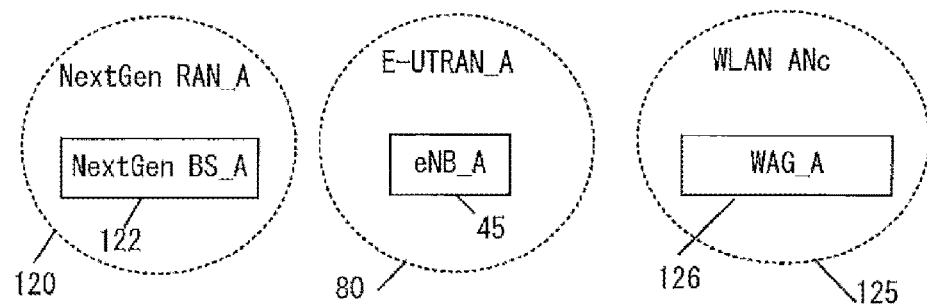

Next, an example of a configuration of the core network_A 90 in a case that the core network_A 90 is a second core network will be described. FIGS. 3A and 3B illustrate an example of the configuration of the core network_A 90. The core network_A 90 in FIG. 3A includes the HSS_A 50, the PCRF_A 60, the PGW_A 30, the SGW_A 35, the MME_A 40, and the SCEF_A 46.

Furthermore, the core network_A 90 can connect to multiple radio access networks (the E-UTRAN 80, the NextGen RAN_A 120, and the WLAN ANc 125). Such a radio access network may be configured by connecting to multiple different access networks, or may be configured by connecting to either one of the access networks. Moreover, the UE_A 10 is capable of wirelessly connecting to the radio access network.

Moreover, the E-UTRAN_A 80 and the NextGen RAN_A 120 can be configured as access networks connectable in a 3GPP access system. Moreover, a WLAN access network c (WLAN ANc 125) that connects to the MME_A 40 and the SGW_A 35 can be configured as an access network connectable in a WLAN access system. Note that each apparatus has a similar configuration to the corresponding apparatus of the first core network, and thus detailed descriptions thereof are omitted. Each apparatus will be described briefly hereinafter.

The PGW_A 30 is an apparatus connected to the PDN_A 5, the SGW_A 35, and the PCRF_A 60. Moreover, the SGW_A 35 is an apparatus connected to the PGW_A 30, the MME_A 40, the E-UTRAN 80, the NextGen RAN_A 120, and the WLAN ANc 126. Moreover, the MME_A 40 is an apparatus connected to the SGW_A 35, the E-UTRAN 80, the NextGen RAN_A 120, the WLAN ANc 126, the HSS_A 50, and the SCEF_A 46. Note that the roles of the PGW_A 30, the SGW_A 35, and the MME_A 40 may be the same as the roles of the corresponding apparatuses described for the first core network. The configurations and roles of SCEF_A 46, the HSS_A 50, and the PCRF_60 may be similar to the apparatuses described for the first core network. Therefore, description of the steps is omitted.

Additionally, as illustrated in FIG. 3B, each radio access network includes apparatuses to which the UE_A 10 is actually connected (such as a base station apparatus and an access point apparatus), and the like. The apparatuses used in these connections can be thought of as apparatuses adapted to the radio access networks.

In the present embodiment, the NextGen RAN_A 120 is a 5G access network and includes a Next Generation Base Station (NextGen BS)_A 122. The NextGen BS_A 122 is a radio base station to which the UE_A 10 connects through Next Generation Radio Access (NextGen RA), and the NextGen RAN_A 120 may include one or multiple NextGen BS_A 122.

Furthermore, the WLAN ANc 125 is a wireless LAN access network and includes a WAG_A 126. The WLAN Access Gateway (WAG)_A 126 is a radio base station to which the UE_A 10 connects through a wireless LAN access, and the WLAN ANc 125 may include one or multiple WAGs_A 126. Moreover, the WAG_A 126 may serve as a gateway apparatus between the core network_A 90 and the WLAN ANc 125. In the WAG_A 126, a function unit of a radio base station and a function unit of a gateway apparatus may be constituted by separate apparatuses.

Note that herein, the UE_A 10 being connected to radio access networks refers to the UE_A 10 being connected to a base station apparatus, an access point, or the like included in each of the radio access networks, and data, signals, and the like being transmitted and/or received also pass through those base station apparatuses, access points.

1.2. Device Configuration

At first, identification information stored in each apparatus will be described. International Mobile Subscriber Identity (IMSI) is permanent identification information of a subscriber (user), and is identification information assigned to a user using a UE. IMSI stored in the UE_A 10, the MME_A 40, and the SGW_A 35 may be the same as IMSI stored in the HSS_A 50.

EMM State/MM State indicates a Mobility management state of the UE_A 10 or the MME_A 40. For example, the EMM State/MM State may be an EMM-REGISTERED state (registration state) where the UE_A 10 is registered with a network and/or an EMM-DEREGISTERD state (non-registration state) where the UE_A 10 is not registered with a network. Alternatively, the EMM State/MM State may be an ECM-CONNECTED state where connection between the UE_A 10 and the core network_A 90 is maintained and/or an ECM-IDLE state where the connection is released.

The Globally Unique Temporary Identity (GUTI) is temporary identification information about the UE_A 10. The GUTI is constituted of identification information of the MME_A 40 (GUMMEI: Globally Unique MME Identifier) and identification information of the UE_A 10 in the specific MME_A 40 (M-TMSI). ME Identity is ID of the UE_A 10 or a ME, and for example, may be International Mobile Equipment Identity (IMEI) and IMEI Software Version (IMISV). MSISDN represents a basic phone number of the UE_A 10. The MSISDN stored in the MME_A 40 may be information provided by a storage unit of the HSS_A 50.

MME F-TEID is information for identifying the MME_A 40. The MME F-TEID may include an IP address of the MME_A 40, may include Tunnel Endpoint Identifier (TEID)

of the MME_A 40, or may include both the IP address and the TEID. The IP address of the MME_A 40 and the TEID of the MME_A 40 may be stored independently. The MME F-TEID may be identification information for user data, and may be identification information for control information.

SGW F-TEID is information for identifying the SGW_A 35. The SGW F-TEID may include an IP address of the SGW_A 35, may include TEID of the SGW_A 35, or may include both the IP address and the TEID. The IP address of the SGW_A 35 and the TEID of the SGW_A 35 may be stored independently. The SGW F-TEID may be identification information for user data, and may be identification information for control information.

PGW F-TEID is information for identifying the PGW_A 30. The PGW F-TEID may include an IP address of the PGW_A 30, may include TEID of the PGW_A 30, or may include both the IP address and the TEID. The IP address of the PGW_A 30 and the TEID of the PGW_A 30 may be stored independently. The PGW F-TEID may be identification information for user data, and may be identification information for control information.

eNB F-TEID is information for identifying the eNB_A 45. The eNB F-TEID may include an IP address of the eNB_A 45, may include TEID of the eNB_A 45, or may include both the IP address and the TEID. The IP address of the eNB_A 45 and the TEID of the SGW_A 35 may be stored independently. The eNB F-TEID may be identification information for user data, and may be identification information for control information.

An Access Point Name (APN) may be identification information for identifying the core network_A 90 and an external network such as a DN. Furthermore, the APN can be used as information for selecting a gateway device such as the PGW_A 30 to connect with the core network_A 90.

Note that the APN may be identification information for identifying such a gateway device, or may be identification information for identifying an external network such as a DN. Note that there may be multiple gateways selectable by APNs in a case that multiple gateways are located to connect the core network_A 90 and a DN. Furthermore, in a case of selecting one gateway from such multiple gateway devices, the gateway may be selected by another technique using identification information other than the APN.

UE Radio Access Capability is identification information for indicating a radio access capability of the UE_A 10. UE Network Capability includes an algorithm of security supported by a UE and a key derivative function. The MS Network Capability is information including at least one kind of information necessary for the SGSN to the UE having the GERAN and/or UTRAN function. The Access Restriction is registration information for access restriction. eNB Address is an IP address of the eNB_A 45. MME UE S1AP ID is information for identifying a UE in the MME_A 40. eNB UE S1AP ID is information for identifying a UE in the eNB_A 45.

APN in Use (Data Network Identifier) is an APN recently used. This APN may include identification information about the network and identification information about a default operator. Furthermore, APN in Use (Data Network Identifier) may be information for identifying a DN of an establishment destination of a PDU session.

Assigned Session Type (Assigned PDN Type) is information for indicating a type of a PDU session. The type of a PDU session may be IP or may be non-IP. Furthermore, in a case that the type of a PDU session is IP, information for indicating a type of a PDN assigned from a network may be included. Note that Assigned Session Type (Assigned PDN Type) may be IPv4, IPv6, or IPv4v6.

In addition, unless otherwise specified, IP Address is an IP address assigned to a UE. The IP address may be an IPv4 address, may be an IPv6 address, or may be an IPv6 prefix. Note that an element of IP Address may not be included in a case that Assigned Session Type (Assigned PDN Type) indicates non-IP.

SCEF ID is an IP address of the SCEF_A 46 used in a PDU session. Default Bearer is information obtained and/or generated at the time of PDU session establishment, and is EPS bearer identification information for identifying a default bearer associated with a PDU session.

EPS Bearer ID is identification information of an EPS bearer. In addition, EPS Bearer ID may be identification information for identifying a SRB and/or a CRB, and may be identification information for identifying a DRB. Transaction Identifier (TI) is identification information for identifying bidirectional message flow (Transaction). Note that EPS Bearer ID may be EPS bearer identification information for identifying a dedicated bearer. Therefore, it may be identification information for distinguishing a different EPS bearer from a default bearer. Traffic Flow Template (TFT) indicates all packet filters associated with an EPS bearer. TFT is information for identifying a part of user data to transmitted and/or received, and the UE_A 10 transmits and/or receives user data identified by TFT by using an EPS bearer associated with TFT. Further, in other words, the UE_A 10 transmits and/or receives user data identified by TFT by using RB associated with TFT. In addition, TFT may associate user data such as application data transmitted and/or received with an appropriate transfer path, and may be identification information for identifying the application data. In addition, the UE_A 10 may transmit and/or receive user data which is not identified with TFT by using a default bearer. In addition, the UE_A 10 may store TFT associated with a default bearer in advance.

Default Bearer is EPS bearer identification information for identifying a default bearer associated with a PDU session. Note that an EPS bearer may be a logical communication path established between the UE_A 10 and the PGW_A 30. Also in this case, an EPS bearer may be configured including Radio Bearer (RB) established between the UE_A 10 and a base station in the access network, and/or an access point. Furthermore, the RB and the EPS bearer may be associated one-to-one. Therefore, identification information of the RB may be associated with identification information of the EPS bearer one-to-one, or may be the same identification information. Note that the RB may be a Signalling Radio Bearer (SRB) and/or a Control-plane Radio bearer (CRB), or may be a Data Radio Bearer (DRB). In addition, Default Bearer may be information that the UE_A 10 and/or the SGW_A 35 and/or the PGW_A 30 obtain from the core network_A 90 at the time of PDU session establishment.

User Identity is information for identifying a subscriber. The User Identity may be IMSI or may be MSISDN. Furthermore, the User Identity may be identification information other than IMSI or MSISDN. Serving Node Information is information for identifying the MME_A 40 used in a PDU session, and may be an IP address of the MME_A 40.

eNB/NextGen BS/WAG Address is an IP address of the eNB_A 45 and/or the NextGen BS_A 122 and/or the WAG_A 126. eNB/NextGen BS/WAG ID is information for identifying a UE in the eNB_A 45 and/or the NextGen BS_A 122 and/or the WAG_A 126.

NextGen BS Address is an IP address of the NextGen BS_A 122. NextGen BS ID is information for identifying a UE in the NextGen BS_A 122. WAG Address is an IP address of the WAG_A 126. WAG ID is information for identifying a UE in the WAG_A 126.

MME/eNB/NextGen BS/WAG Address is an IP address of the MME_A 40 and/or the eNB_A 45 and/or the NextGen BS_A 122 and/or the WAG_A 126. MME/eNB/NextGen BS/WAG ID is information for identifying a UE in the MME_A 40 and/or the eNB_A 45 and/or the NextGen BS_A 122 and/or the WAG_A 126.

Mobility Type is information indicating granularity of mobility. Furthermore, Mobility Type may be information for indicating a type of Service Continuity, may be the information for indicating a type of mobility supported, or may be information about handover. For example, Mobility Type may be Mobility Type corresponding to UE-initiated handover, may be the Mobility Type corresponding to conditions a state where UE-initiated handover is not allowed, or may be the Mobility Type corresponding to a state where network-initiated handover is not allowed. Note that the Mobility Type may be Mobility Class or may be Mobility level.

Handover Information is information about the handover of the UE_A 10 and/or a network (the access network and/or the core network_A 90). Handover Information may be information for indicating a sort of handover supported, or may be handover permission information in each state.

Note that a type of handover supported may be handover in a 3GPP access network or a non-3GPP access network, or may be handover between a 3GPP access network and a non-3GPP access network. In addition, the handover permission information in each state may be information for indicating to allow for handover in an active mode and/or an idle mode, or may be information for indicating not to allow for handover in an active mode and/or an idle mode.

Furthermore, Handover Information may be information including UE UE-initiated Handover Capability, and/or NW UE-initiated Handover Capability, and/or UE-initiated Handover allowed, and/or NW-initiated Handover allowed.

Note that the UE UE-initiated Handover Capability is capability information for indicating whether the UE_A 10 supports UE-initiated handover. Furthermore, the NW UE-initiated Handover Capability is capability information for indicating whether a network and/or a device in the network support UE-initiated handover.

In addition, the UE-initiated Handover allowed is information for indicating whether UE-initiated handover is allowed. The UE-initiated Handover allowed may be information for indicating whether UE-initiated handover is allowed in a connected cell, and/or a tracking area, and/or an access network, or may be information for indicating whether it is temporarily allowed.

Furthermore, the NW-initiated Handover allowed is information for indicating whether network-initiated handover is allowed. The NW-initiated Handover allowed may be information for indicating whether network-initiated handover is allowed in a connected cell, and/or a tracking area, and/or an access network, or may be information for indicating whether it is temporarily allowed.

The configuration of each apparatus will be described below.

1.2.1. Configuration of UE

Figure 4A:
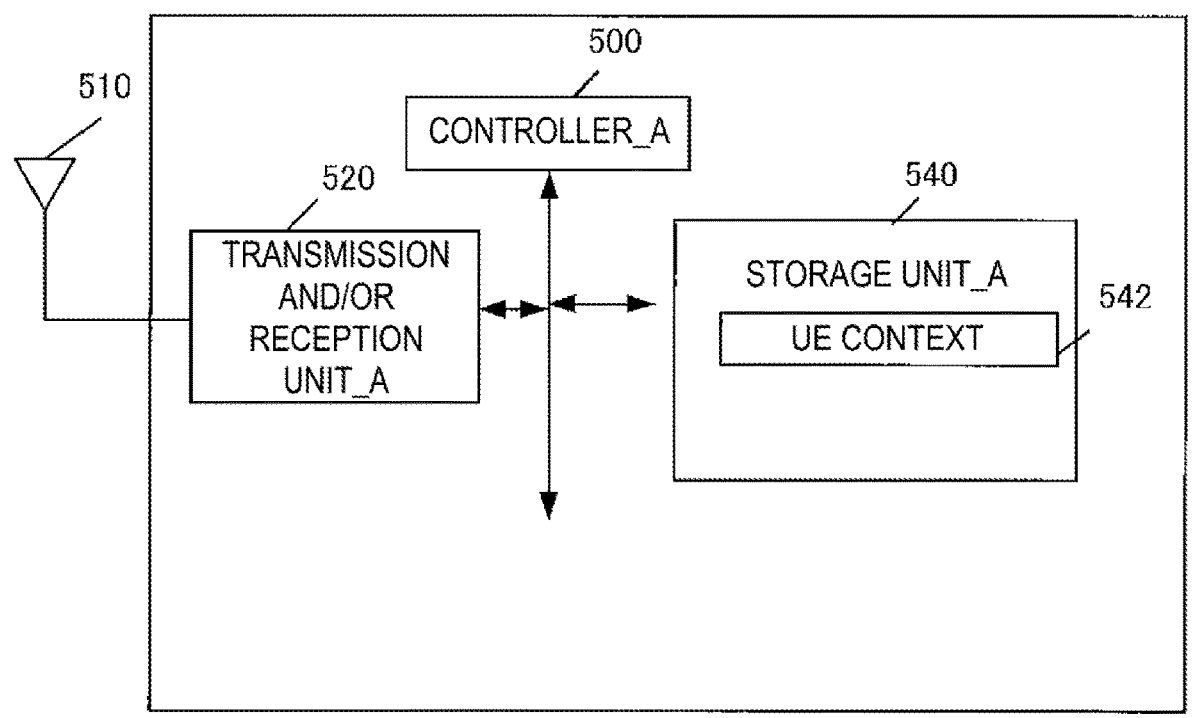
FIG. 4A is a diagram illustrating an apparatus configuration of a UE.

FIG. 4A illustrates an apparatus configuration of the UE_A 10. As illustrated in the drawing, the UE_A 10 includes a transmission and/or reception unit_A 420, a controller_A 400, and a storage unit_A 440. The transmission and/or reception unit_A 420 and the storage unit_A 440 are connected to the controller_A 400 via a bus.

The controller_A 400 is a function unit for controlling the UE_A 10. The controller_A 400 implements various processes by reading out and executing various programs stored in the storage unit_A 440.

The transmission and/or reception unit_A 420 is a function unit through which the UE_A 10 connects to a base station and/or an access point in the access network to connect to the access network. Furthermore, an external antenna_A 410 is connected to the transmission and/or reception unit_A 420. To put it another way, the transmission and/or reception unit_A 420 is a function unit through which the UE_A 10 connects to a base station and/or an access point in the access network. Moreover, the transmission and/or reception unit_A 420 is a transmission and/or reception function unit through which the UE_A 10 transmits and/or receives user data and/or control information to and/or from a base station and/or an access point in the access network.

The storage unit_A 440 is a function unit for storing programs, data, and the like necessary for each operation of the UE_A 10. The storage unit_A 440 includes, for example, a semiconductor memory, a Hard Disk Drive (HDD), or the like. The storage unit_A 440 may store at least identification information and/or control information and/or a flag and/or a parameter included in a control message transmitted and/or received in a communication procedure to be described later. As illustrated in the drawing, the storage unit_A 440 stores a UE context 542. Hereinafter, information elements stored in the storage unit_A 440 will be described.

First, FIG. 5B illustrates information elements included in the UE context stored for each UE. As illustrated in the drawing, the UE context stored for each UE includes an IMSI, an EMM State, a GUTI, and an ME Identity.

Moreover, the UE context stored for each UE may include a Mobility Type and/or Handover Information.

Next, FIG. 5C illustrates a UE context for each Packet Data Unit (PDU) session stored for each PDU session. As illustrated in the drawing, the UE context for each PDU session includes an APN in Use (Data Network Identifier), an Assigned Session Type (Assigned PDN Type), an IP Address(es), and a Default Bearer.

Moreover, the UE context stored for each PDU session may include a Mobility Type and/or Handover Information.

FIG. 5D illustrates the UE context for each bearer stored in the storage unit of the UE. As illustrated in the drawing, the UE context for each bearer includes an EPS Bearer ID, a TI, and a TFT.

1.2.2. Configuration of eNB/NextGen BS/WAG

Figure 6A:
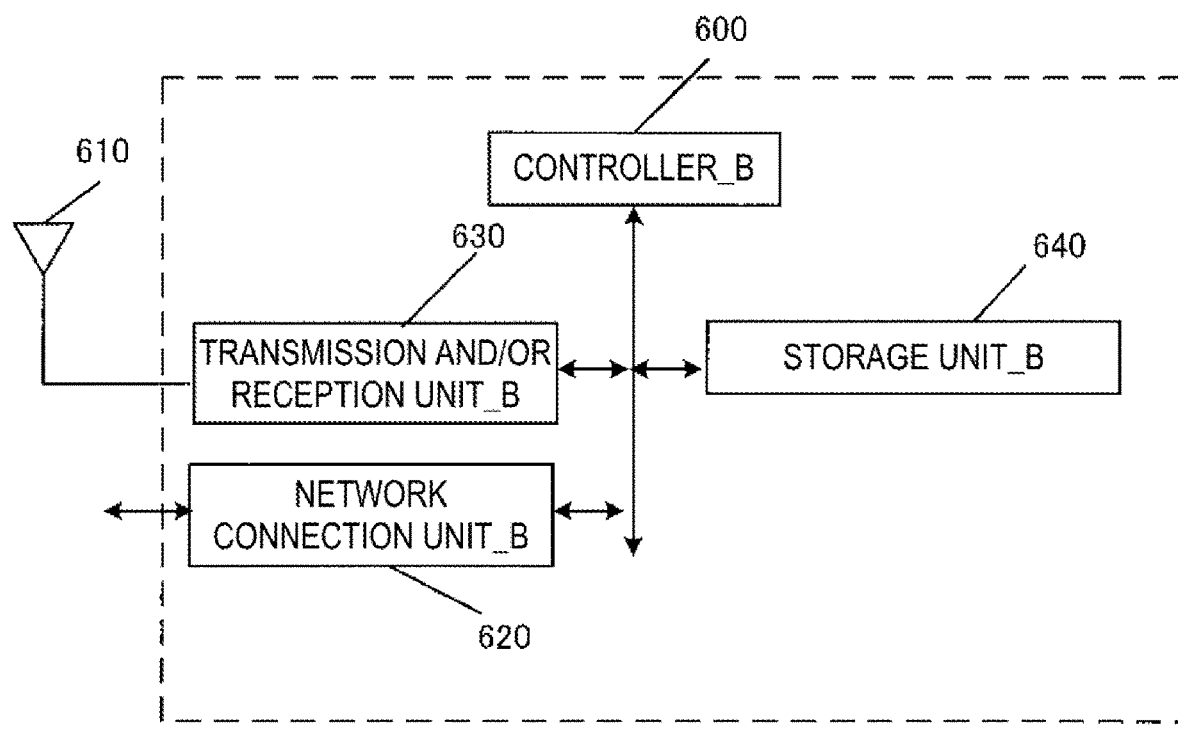
FIG. 6A is a diagram illustrating an apparatus configuration of an eNB/NextGen B S/WAG.

A configuration of the eNB_A 45, the NextGen BS_A 122, and the WAG_A 126 will be described below. FIG. 6A illustrates an apparatus configuration of the eNB_A 45, the NextGen BS_A 122, and the WAG_A 126. As illustrated in the drawing, each of the eNB_A 45, the NextGen BS_A 122, and the WAG_A 126 includes a network connection unit_B 620, a transmission and/or reception unit_B 630, a controller_B 600, and a storage unit_B 640. The network connection unit_B 620, the transmission and/or reception unit_B 630, and the storage unit_B 640 are connected to the controller_B 600 via a bus.

The controller_B 600 is a function unit for controlling the eNB_A 45. The controller_B 600 implements various processes by reading out and executing various programs stored in the storage unit_B 640.

The network connection unit_B 620 is a function unit through which the eNB_A 45, the NextGen BS_A 122, and the WAG_A 126 connect to the MME_A 40 and/or the SGW_A 35. Moreover, the network connection unit_B 620 is a transmission and/or reception unit through which the eNB_A 45, the NextGen BS_A 122, and the WAG_A 126 transmit and/or receive user data and/or control information to and/or from the MME_A 40 and/or the SGW_A 35.

The transmission and/or reception unit_B 630 is a function unit through which the eNB_A 45, the NextGen BS_A 122, and the WAG_A 126 connect to the UE_A 10. Moreover, the transmission and/or reception unit_B 630 is a transmission and/or reception function unit configured to transmit and/or receive user data and/or control information to and/or from the UE_A 10. Furthermore, an external antenna_B 610 is connected to the transmission and/or reception unit_B 630.

The storage unit_B 640 is a function unit configured to store programs, data, and the like necessary for each operation of the eNB_A 45, the NextGen BS_A 122, and the WAG_A 126. The storage unit_B 640 includes, for example, a semiconductor memory, a Hard Disk Drive (HDD), or the like. The storage unit_B 640 may store at least identification information and/or control information and/or a flag and/or a parameter included in a control message transmitted and/or received in the communication procedure to be described later. The storage unit_B 640 may store these pieces of information as a UE context.

Moreover, the storage unit_B 640 may include a Mobility Type and/or Handover Information.

1.2.3. Configuration of MME

Figure 7A:
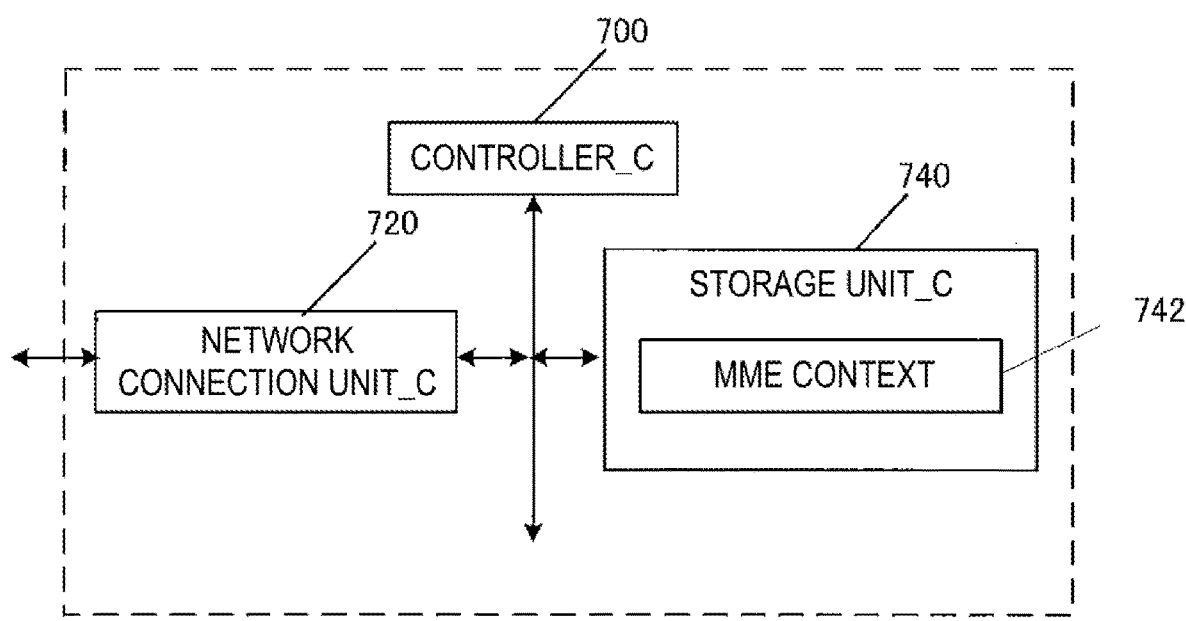
FIG. 7A is a diagram illustrating an apparatus configuration of an MME.

A configuration of the MME_A 40 will be described below. FIG. 7A illustrates an apparatus configuration of the MME_A 40. As illustrated in the drawing, the MME_A 40 includes a network connection unit_C 720, a controller_C 700, and a storage unit_C 740. The network connection unit_C 720 and the storage unit_C 740 are connected to the controller_C 700 via a bus.

The controller_C 700 is a function unit for controlling the MME_A 40. The controller_C 700 implements various processes by reading out and executing various programs stored in the storage unit_C 740.

The network connection unit_C 720 is a function unit through which the MME_A 40 connects to a base station in the access network and/or an access point in the access network and/or the SCEF_A 46 and/or the HSS_A 50 and/or the SGW_A 35. Furthermore, the network connection unit_C 720 is a transmission and/or reception unit through which the MME_A 40 transmits and/or receives user data and/or control information to and/or from a base station in the access network and/or an access point in the access network and/or the SCEF_A 46 and/or the HSS_A 50 and/or the SGW_A 35.

The storage unit_C 740 is a function unit for storing programs, data, and the like necessary for each operation of the MME_A 40. The storage unit_C 740 includes, for example, a semiconductor memory, a Hard Disk Drive (HDD), or the like. The storage unit_C 740 may store at least the identification information and/or the control information and/or the flag and/or the parameter included in the control message transmitted and/or received in the communication procedure to be described later.

As illustrated in the drawing, the storage unit_C 740 stores an MME context 1142. Hereinafter, information elements stored in the storage unit_C 740 will be described. FIG. 8B illustrates information elements included in the UE context stored for each UE. As illustrated in the drawing, the MME context stored for each UE includes an IMSI, a MSISDN, a MM State, a GUTI, a ME Identity, UE Radio Access Capability, UE Network Capability, MS Network Capability, Access Restriction, an MME F-TEID, a SGW F-TEID, an eNB Address, an MME UE S1AP ID, an eNB UE S1AP ID, a NextGen BS Address, a NextGen BS ID, a WAG Address, and a WAG ID.

Moreover, the MME context stored for each UE may include a Mobility Type and/or Handover Information.

Next, FIG. 9C illustrates an MME context for each PDU session stored for each PDU session. As illustrated in the drawing, the MME context for each PDU session includes APN in Use (Data Network Identifier), an Assigned Session Type (Assigned PDN Type), an IP Address, a PGW F-TEID, a SCEF ID, and a Default Bearer.

Moreover, the MME context for each PDU session may include a Mobility Type and/or Handover Information.

FIG. 9D illustrates the MME context for each bearer stored for each bearer. As illustrated in the drawing, the MME context stored for each bearer includes an EPS Bearer ID, a TI, TFT, a SGW F-TEID, a PGW F-TEID, an MME F-TEID, an eNB/NextGen BS/WAG Address, and an eNB/NextGen BS/WAG ID. Here, the information elements included in the MME context illustrated in FIG. 8B and FIGS. 9C and 9D may be included and stored in either a MM context 644 or an EPS bearer context.

1.2.4. Configuration of SGW

Figure 10A:
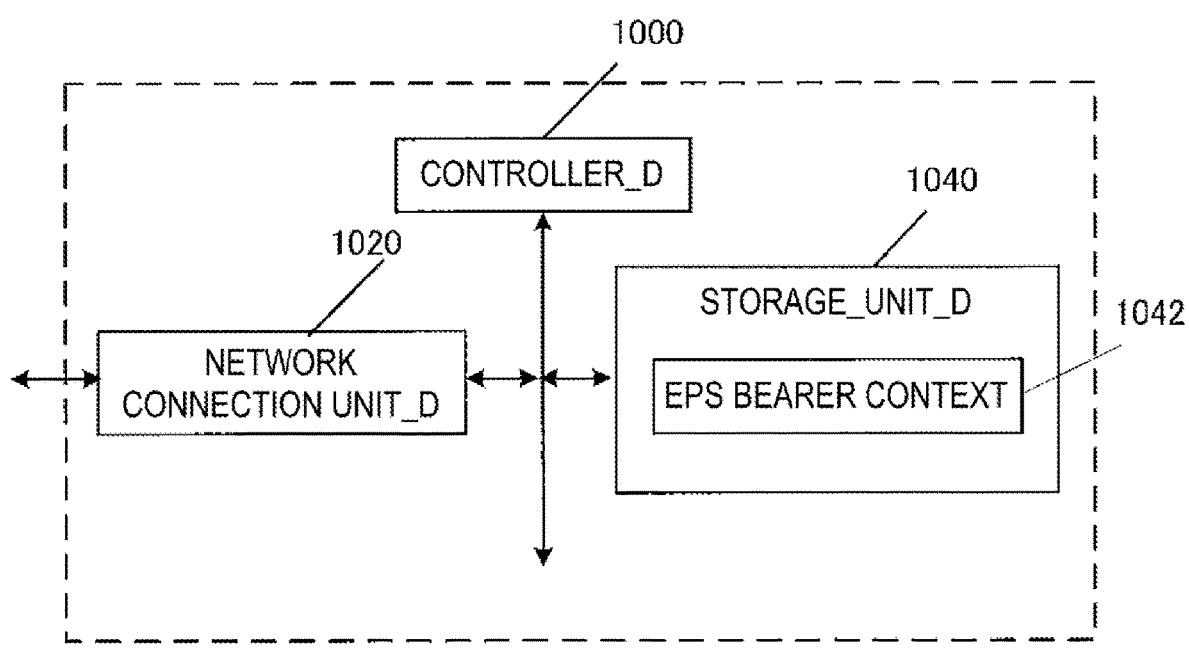
FIG. 10A is a diagram illustrating an apparatus configuration of a SGW/PGW/SCEF.

FIG. 10A illustrates an apparatus configuration of the SGW_A 35. As illustrated in the drawing, the SGW_A 35 includes a network connection unit_D 1020, a controller_D 1000, and a storage unit_D 1040. The network connection unit_D 1020 and the storage unit_D 1040 are connected to the controller_D 1000 via a bus.

The controller_D 1000 is a function unit for controlling the SGW_A 35. The controller_D 1000 implements various processes by reading out and executing various programs stored in the storage unit_D 1040.

The network connection unit_D 1020 is a function unit through which the SGW_A 35 connects to a base station in the network and/or an access point and/or the MME_A 40 and/or the PGW_A 30 and/or SGSN_A 42. Furthermore, the network connection unit_D 1020 is a transmission and/or reception unit through which the SGW_A 35 transmits and/or receives user data and/or control information to and/or from the base station in the access network and/or the access point and/or the MME_A 40 and/or the PGW_A 30 and/or SGSN_A 42.

The storage unit_D 1040 is a function unit configured to store programs, data, and the like necessary for each operation of the SGW_A 35. The storage unit_D 1040 includes, for example, a semiconductor memory, a Hard Disk Drive (HDD), or the like.

The storage unit_D 1040 may store at least the identification information and/or the control information and/or the flag and/or the parameter included in the control message transmitted and/or received in the communication procedure to be described later.

As illustrated in the drawing, the storage unit_D 1040 stores an EPS bearer context 1442. Note that the EPS bearer context includes an EPS bearer context stored for each UE, an EPS bearer context stored for each PDU session, and an EPS bearer context stored for each bearer.

First, FIG. 11B illustrates information elements of the EPS bearer context stored for each UE. As illustrated in the drawing, the EPS bearer context stored for each UE includes an IMSI, an ME Identity, a MSISDN, an MME F-TEID, and a SGW F-TEID.

Furthermore, the EPS bearer context includes an EPS bearer context for each PDU session stored for each PDU session. FIG. 11C illustrates the EPS bearer context for each PDU session. As illustrated in the drawing, the EPS bearer context for each PDU session includes APN in Use (Data Network Identifier), an Assigned Session Type (Assigned PDN Type), a SGWF-TEID, a PGW F-TEID, a Default Bearer, and an IP Address(es).

Furthermore, the EPS bearer context includes the EPS bearer context for each bearer. FIG. 11D illustrates the EPS bearer context for each bearer. As illustrated in the drawing, the EPS bearer context for each bearer includes an EPS Bearer ID, TFT, a PGW F-TEID, a SGW F-TEID, an eNB F-TEID, an MME/NextGen BS/WAG Address, and an MME/NextGen BS/WAG ID.

1.2.5. Configuration of PGW

FIG. 10A illustrates an apparatus configuration of the PGW_A 30. As illustrated in the drawing, the PGW_A 30 includes the network connection unit_D 1020, the controller_D 1000, and the storage unit_D 1040. The network connection unit_D 1020 and the storage unit_D 1040 are connected to the controller_D 1000 via a bus.

The controller_D 1000 is a function unit for controlling the PGW_A 30. The controller_D 1000 implements various processes by reading out and executing various programs stored in the storage unit_D 1040.

The network connection unit_D 1020 is a function unit through which the PGW_A 30 connects to the SGW_A 35 and/or the PCRF_A 60 and/or the ePDG_A 65 and/or the AAA_A 55 and/or the TWAG_A 74 and/or the PDN_A 5. The network connection unit_D 1020 is a transmission and/or reception unit through which the PGW_A 30 transmits and/or receives user data and/or control information to and/or from the SGW_A 35 and/or the PCRF_A 60 and/or the ePDG_A 65 and/or the AAA_A 55 and/or the TWAG_A 74 and/or the PDN_A 5.

The storage unit_D 1040 is a function unit configured to store programs, data, and the like necessary for each operation of the PGW_A 30. The storage unit_D 1040 includes, for example, a semiconductor memory, a Hard Disk Drive (HDD), or the like.

The storage unit_D 1040 may store at least the identification information and/or the control information and/or the flag and/or the parameter included in the control message transmitted and/or received in the communication procedure to be described later.

As illustrated in the drawing, the storage unit_D 1040 stores an EPS bearer context 1642. Note that the EPS bearer context may be stored in such a manner that an EPS bearer context stored for each UE, an EPS bearer context stored for each APN, an EPS bearer context stored for each PDU session, and an EPS bearer context stored for each bearer are separately stored.

FIG. 12B illustrates information elements included in the EPS bearer context stored for each UE. As illustrated in the drawing, the EPS bearer context stored for each UE includes an IMSI, an IMSI-unauthenticated-indicator, an ME Identity, an MSISDN, and a RAT type.

Next, FIG. 12C illustrates the EPS bearer context stored for each APN. As illustrated in the drawing, the EPS bearer context stored for each APN of the PGW storage unit includes APN in use. Note that the EPS bearer context stored for each APN may be stored for each Data Network Identifier.

Furthermore, FIG. 12D illustrates the EPS bearer context for each PDU session stored for each PDU session. As illustrated in the drawing, the EPS bearer context for each PDU session includes an Assigned Session Type (Assigned PDN Type), an IP Address, a SGW F-TEID, a PGW F-TEID, and a Default Bearer.

Furthermore, FIG. 12E illustrates the EPS bearer context stored for each EPS bearer. As illustrated in the drawing, the EPS bearer context includes an EPS Bearer ID, a TFT, a PGW F-TEID, and a SGW F-TEID.

1.2.6. Configuration of SCEF

FIG. 10A illustrates an apparatus configuration of the SCEF_A 46. As illustrated in the drawing, the SCEF_A 46 includes a network connection unit_D 1020, a controller_D 1000, and a storage unit_D 1040. The network connection unit_D 1020 and the storage unit_D 1040 are connected to the controller_D 1000 via a bus.

The controller_D 1000 is a function unit for controlling the SCEF_A 46. The controller_D 1000 implements various processes by reading out and executing various programs stored in the storage unit_D 1040. The network connection unit_D 1020 is a function unit through which the SCEF_A 46 connects to the core network_A 90. In other words, the network connection unit_D 1020 is a function unit through which the SCEF_A 46 connects to the MME_A 40. Furthermore, the network connection unit_D 1020 is a transmission and/or reception unit through which the SCEF_A 46 transmits and/or receives user data and/or control information to and/or from the MME_A 40.

The storage unit_D 1040 is a function unit configured to store programs, data, and the like necessary for each operation of the SCEF_A 46. The storage unit_D 1040 includes, for example, a semiconductor memory, a Hard Disk Drive (HDD), or the like. The storage unit_D 1040 may store at least the identification information and/or the control information and/or the flag and/or the parameter included in the control message transmitted and/or received in the communication procedure to be described later.

As illustrated in the drawing, the storage unit_D 1040 stores an EPS bearer context 1042. Hereinafter, information elements stored in the storage unit_D 1040 will be described. FIG. 13B illustrates information elements included in the EPS bearer context. As illustrated in the drawing, the EPS bearer context includes a User Identity, APN in Use (Data Network Identifier), an EPS Bearer ID, and Serving Node Information.

1.3. Description of Communication Procedure

Figure 15:
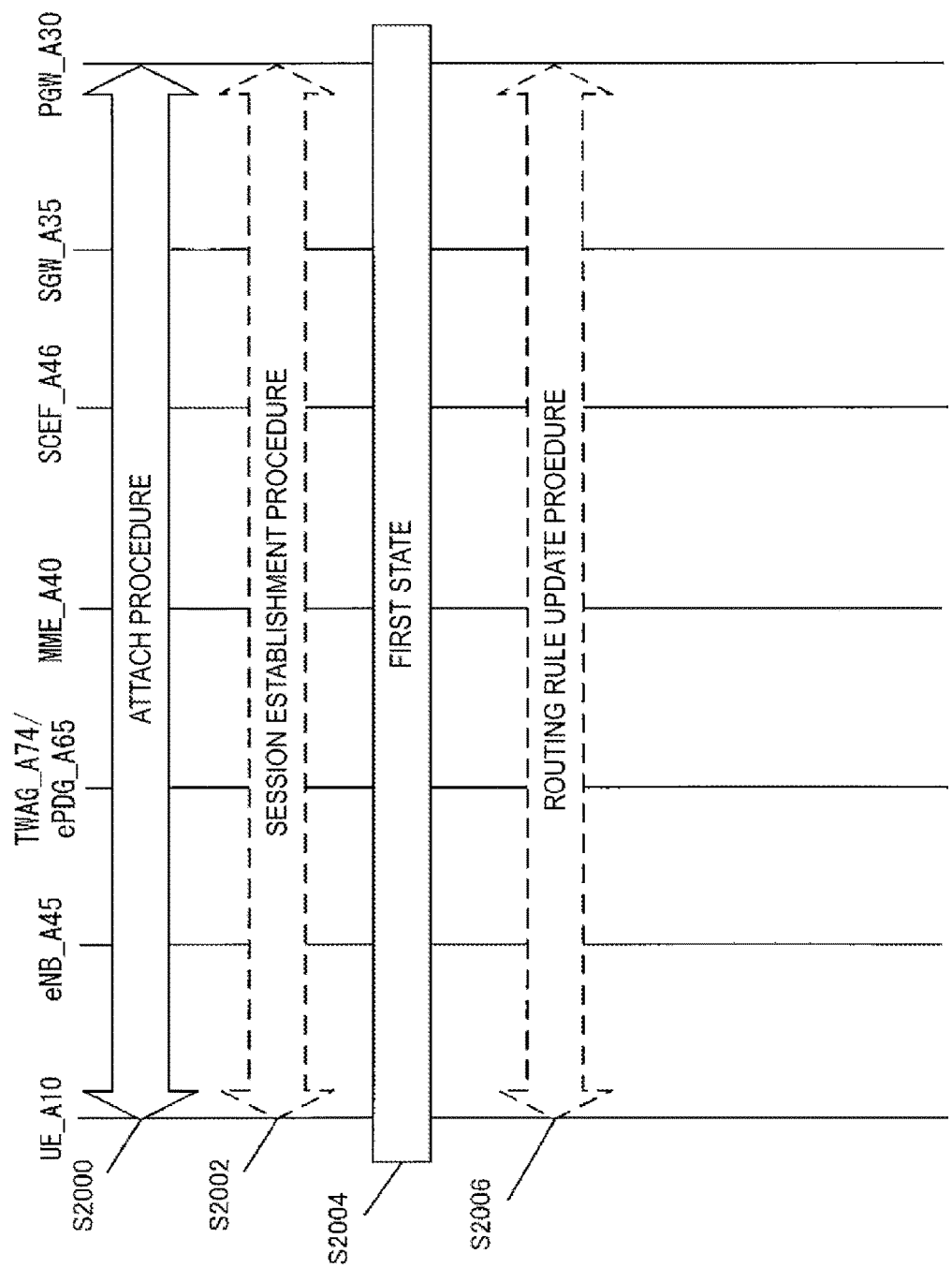
FIG. 15 is a diagram illustrating an overview of a communication procedure.

Next, the communication procedure according to the present embodiment will be described using FIG. 15. Here, before describing the detailed process of each procedure, in order to avoid redundant descriptions, terminology specific to the present embodiment and primary identification information used in each procedure will be described beforehand.

Figure 14:
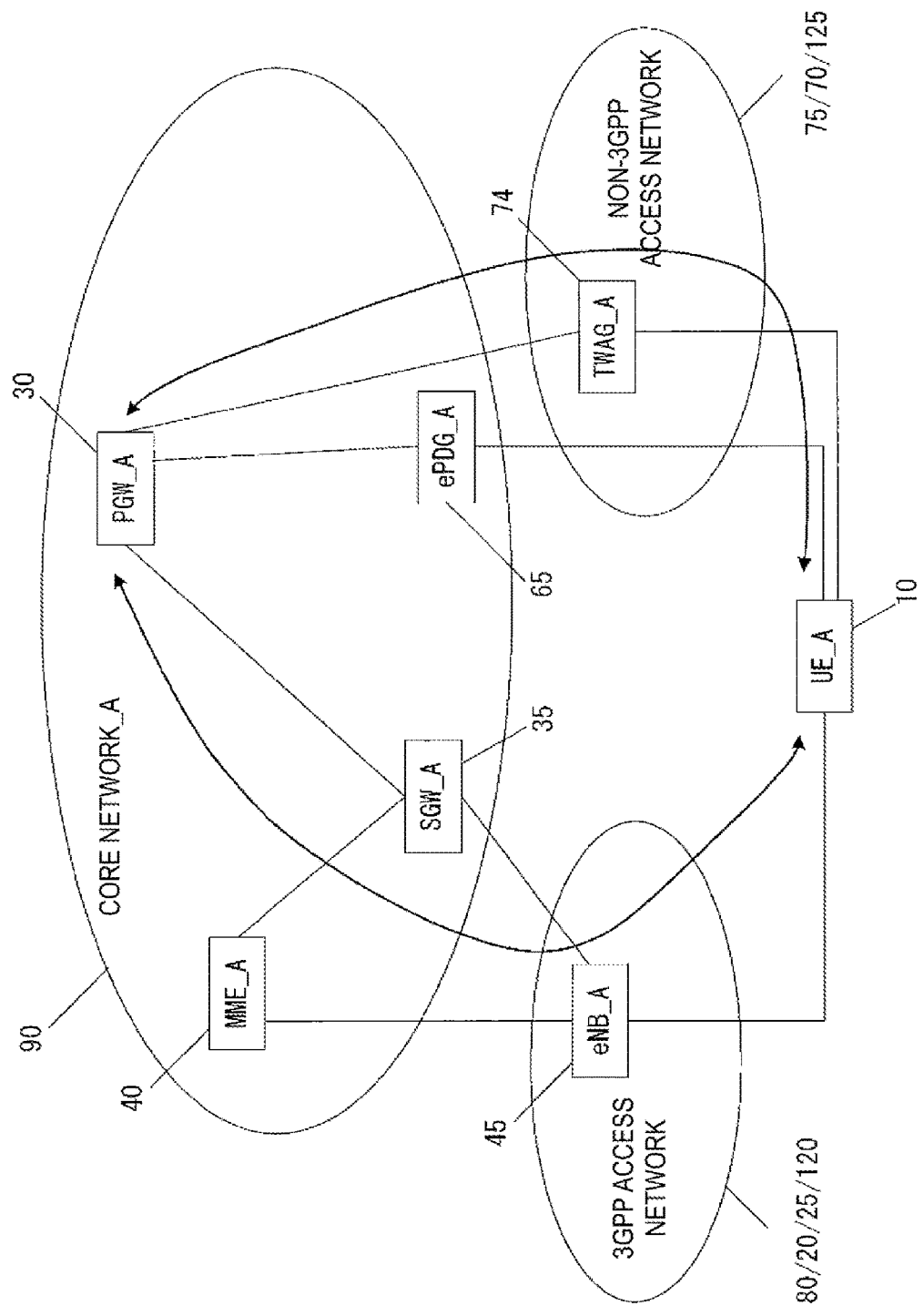
FIG. 14 is a diagram illustrating a state in which a PDU session is established.

A first state in the present embodiment will be described with reference to FIG. 14. The first state in the present embodiment is a state in which the UE_A 10 is connected and registered to the core network_A 90 and each apparatus has established a PDU session. Note that each apparatus may perform a procedure for registering the UE_A 10 to the core network_A 90 and a procedure for establishing a PDU session at the same time or separately.

A first access in the present embodiment may be a 3GPP access. Moreover, in the description in the present embodiment, a 3GPP access may indicate a 3GPP access network or may indicate a 3GPP access system. Note that a 3GPP access system may be a radio access system for constituting various 3GPP access networks.

A second access in the present embodiment may be a non-3GPP access. Moreover, in the description in the present embodiment, the non-3GPP access may indicate a non- 3GPP access network or may indicate a non-3GPP access system. Note that the non-3GPP access system may be a radio access system for constituting various non-3GPP access networks.

Next, Access Traffic Steering refers to a procedure for selecting an optimal access network for data flow transmission and/or reception and transmitting and/or receiving data flow traffic via the selected access network. Note that selection of an optimal access network may be performed based on an application or the like associated with network load, radio signal quality, and/or a data flow. Access Traffic Steering may be applicable between the 3GPP access and the non-3GPP access.

Access Traffic Steering refers to a procedure for transferring traffic of all data flows in progress to another access network while keeping the intermittency of the data flows. Access Traffic Steering may be applicable between the first access and the second access.

Specifically, Access Traffic Steering may be function or a communication procedure for transmitting and/or receiving user data by selecting a communication path via the first access or a communication path via the second access for each data flow of one or multiple data flows transmitted and/or received using an IP address associated with a session. In other words, at the time of performing communication in multiple flows for transmitting and/or receiving user data by using a single IP address, a communication path via the first access or a communication path via the second access can be selected for each flow. Hence, transmission and/or reception in multiple flows can be performed by using the communication path via the first access and the communication path via the second access at the same time at a time point.

Moreover, Access Traffic Splitting refers to a procedure for separating traffic of a single data flow into communications via multiple access networks. Here, part of the traffic separated from the single data flow may be transmitted and/or received via the first access, while the other traffic may be transmitted and/or received via the second access. Note that Access Traffic Splitting may be applicable between the first access and the second access.

Specifically, Access Traffic Splitting may be function or a communication procedure for performing communication in a single data flow in which transmission and/or reception is performed by using an IP address associated with a session by using a communication path via the first access or a communication path via the second access. In other words, at the time of performing communication in multiple flows for transmitting and/or receiving user data by using a single IP address, a communication path via the first access and/or a communication path via the second access can be selected for each flow. Hence, transmission and/or reception in multiple flows can be performed by using the communication path via the first access and the communication path via the second access at the same time at a time point. Note that each data unit transmitted and/or received in communication of a single flow is delivered by using either the first access or the second access. In other words, a single data unit is not replicated to be delivered through multiple communication paths.

A routing filter is information used to identify one or multiple IP flows for the purpose of routing and may specifically be a set of parameters or a set of ranges of IP headers used for communication in flows.

In other words, a routing filter is information that can identify each flow and may include a set of parameters of IP headers transmitted and/or received in flows. Note that the set of parameters of IP headers may be information including a combination of one or more of five-tuples such as a source IP address, a destination IP address, a source port number, a destination port number, and a protocol number.

A routing access type may be information indicating a type of an access network through which transmission and/or reception in one or multiple IP flows transmittable and/or receivable in association with a session is performed. Note that the type of access network may be the first access or the second access.

A routing rule may be information that enables association of a routing filter and a routing access type. The routing rule may be information associating a routing filter and a routing access type and may be information that can identify a routing access type to be used for transmission and/or reception for each of one or more flows transmitted and/or received in association with a session. Note that the UE_A 10 and the core network can select, as a communication path for transmission and/or reception of each flow, either the communication path via the first access or the communication path via the second access, based on the routing rule.

Alternatively, the routing rule may associate multiple routing access types with a routing filter and indicate that communication of a certain flow is transmitted and/or received by using multiple communication paths. In this case, communication can be performed by using, as communication paths for transmission and/or reception of a certain flow, both the communication path via the first access and the communication path via the second access. Note that each data unit transmitted and/or received in communication of a single flow is delivered by using either the first access or the second access. In other words, a single data unit is not replicated to be delivered through multiple communication paths. Moreover, selection of an access network or selection of a communication path may be performed based on an application or the like associated with network load, radio signal quality, and/or a data flow or may be performed based on a UE policy and/or an operator policy.

A multi-access session in the present embodiment is a session that can deliver traffic via the first access or the second access, or both of the accesses at the same time. Note that the multi-access session may include a first type multi-access session and/or a second type multi-access session.

The first type multi-access session in the present embodiment is a session that can deliver traffic via the first access or the second access, or both of the accesses at the same time. In addition, one or multiple IP addresses may be associated with a multi-access session, and the UE_A 10 can perform communication of multiple flows by using the IP addresses in the multi-access session. Note that each flow is associated with either the first access or the second access, and communication of each flow is performed via an access associated at a time point.

Note that the access to be used for transmission and/or reception of each flow may be determined based on a routing rule. Note that the routing rule may be determined based on an operator policy and/or a UE policy.

Note that the first type multi-access session may be a session based on IP Flow Mobility based on network mobility protocols (NBIFOM). Additionally/Alternatively, the first type multi-access session may be a session supporting Access Traffic Switching function.

The second type multi-access session in the present embodiment is a session that can deliver traffic via the first access or the second access, or both of the accesses at the same time. In addition, one or multiple IP addresses may be associated with a multi-access session, and the UE_A 10 can perform communication of multiple flows by using the IP addresses in the multi-access session. Note that communication of each flow can be performed by using either the first access or the second access, or can be performed by using multiple accesses at the same time at a time point.

Note that the second type multi-access session may be a session supporting Access Traffic Splitting function. The second type multi-access session may be a single session in which communication of multiple flows can be performed by using one or multiple IP addresses associated with the session.

Note that each data unit transmitted and/or received in communication of each flow is delivered by using either the first access or the second access. Note that the access to be used for transmission and/or reception of each data unit may be determined based on a routing rule. Note that the routing rule may be determined based on an operator policy and/or a UE policy.

Moreover, the first state in the present embodiment is a state in which each apparatus has established PDU sessions via the first access and the second access. More specifically, the first state is a state in which each apparatus has established a PDU session established between the UE_A 10 and the PGW_A 30 via the eNB_A 45 and the SGW_A 35 and a PDU session established between the UE_A 10 and the PGW_A 30 via the TWAG_A 74 and/or the ePDG_A 65. In other words, the first state may be a state in which each apparatus has established a multi-access session.

Next, identification information in the present embodiment will be described. First identification information in the present embodiment is information indicating that the UE_A 10 has capability of enabling establishment of a communication path via the first access and a communication path via the second access in which communication can be performed by using a single IP address. In other words, the first identification information may be information indicating that the UE_A 10 has capability of establishing a first type multi-access session and/or a second type multi-access session. Alternatively, the first identification information may be information indicating that the UE_A 10 has capability of performing communication by using a first type multi-access session and/or a second type multi-access session. Alternatively, the first identification information may be information indicating that the UE_A 10 has capability of performing Access Traffic Switching and/or Access Traffic Splitting. Alternatively, the first identification information may be information indicating that the UE_A 10 has a capability for performing communication using Access Traffic Switching and/or Access Traffic Splitting.

Second identification information in the present embodiment may be information indicating that the UE_A 10 has capability of establishing a first type multi-access session. Additionally/Alternatively, the second identification information may be information indicating that the UE_A 10 has capability of performing communication by using a first type multi-access session. Additionally/Alternatively, the second identification information may be information indicating that the UE_A 10 has capability of performing Access Traffic Switching. Additionally/Alternatively, the second identification information may be information indicating that the UE_A 10 has capability of performing communication using Access Traffic Switching. Additionally/Alternatively, the second identification information may be information indicating that the UE_A 10 has capability of performing NBIFOM. Additionally/Alternatively, the second identification information may be information indicating that the UE_A 10 has capability of performing communication using NBIFOM.

Third identification information according to the present embodiment may be information indicating that the UE_A 10 has capability of establishing a second type multi-access session. Additionally/Alternatively, the third identification information may be information indicating that the UE_A 10 has capability of performing communication by using a second type multi-access session. Additionally/Alternatively, the third identification information may be information indicating that the UE_A 10 has capability of performing Access Traffic Splitting. Additionally/Alternatively, the third identification information may be information indicating that the UE_A 10 has capability of performing Access Traffic Splitting.

Fourth identification information in the present embodiment is information indicating that a network has capability of enabling establishment of a communication path via the first access and a communication path via the second access in which communication can be performed by using a single IP address. In other words, the fourth identification information may be information indicating that the network has capability of establishing a first type multi-access session and/or a second type multi-access session. Alternatively, the fourth identification information may be information indicating that a network has capability of performing communication by using a first type multi-access session and/or a second type multi-access session. Alternatively, the fourth identification information may be information indicating that a network has a capability of performing Access Traffic Switching and/or Access Traffic Splitting. Alternatively, the fourth identification information may be information indicating that a network has capability of performing communication using Access Traffic Switching and/or Access Traffic Splitting.

Note that in the present embodiment, a network having capability may mean that the core network_A 90 and/or an apparatus included in the core network_A 90, such as the MME_A 40 or the PGW_A 30, has the capability.

Fifth identification information according to the present embodiment may be information indicating that a network has capability of establishing a first type multi-access session. Additionally/Alternatively, the fifth identification information may be information indicating that a network has capability of performing communication by using a first type multi-access session. Additionally/Alternatively, the fifth identification information may be information indicating that a network has capability of performing Access Traffic Switching. Additionally/Alternatively, the fifth identification information may be information indicating that a network has capability of performing communication using Access Traffic Switching. Additionally/Alternatively, the fifth identification information may be information indicating that a network has capability of performing NBIFOM. Additionally/Alternatively, the fifth identification information may be information indicating that a network has capability of performing communication using NBIFOM.

Sixth identification information according to the present embodiment may be information indicating that a network has capability of establishing a second type multi-access session. Additionally/Alternatively, the sixth identification information may be information indicating that a network has capability of performing communication by using a second type multi-access session. Additionally/Alternatively, the sixth identification information may be information indicating that a network has capability of performing Access Traffic Splitting. Additionally/Alternatively, the sixth identification information may be information indicating that a network has capability of performing communication using Access Traffic Splitting.

Seventh identification information according to the present embodiment is information indicating that establishment of a first type multi-access session is requested. Eighth identification information according to the present embodiment is information indicating that establishment of a second type multi-access session is requested.

Ninth identification information according to the present embodiment is information indicating that establishment of a first type multi-access session is allowed. Additionally/Alternatively, the ninth identification information may be status information indicating that a request to establish a first type multi-access session is accepted. Additionally/Alternatively, the ninth identification information may be information indicating that a first type multi-access session is established. Additionally/Alternatively, the ninth identification information may be information indicating that an established session is a first type multi-access session. Additionally/Alternatively, the ninth identification information may be session identification information identifying an established session.

Tenth identification information according to the present embodiment is information indicating that establishment of a second type multi-access session is allowed. Additionally/Alternatively, the tenth identification information may be status information indicating that a request to establish a second type multi-access session is accepted. Additionally/Alternatively, the tenth identification information may be information indicating that a second type multi-access session is established. Additionally/Alternatively, the tenth identification information may be information indicating that an established session is a second type multi-access session. Additionally/Alternatively, the tenth identification information may be session identification information identifying an established session.

Eleventh identification information according to the present embodiment is information indicating that establishment of a first type multi-access session is not allowed. Additionally/Alternatively, the eleventh identification information may be cause information (Reject Cause) indicating that establishment of a first type multi-access session is not allowed. Additionally/Alternatively, the eleventh identification information may be cause information (Reject Cause) indicating that a first type multi-access session is not supported.

Twelfth identification information according to the present embodiment is information indicating that establishment of a second type multi-access session is not allowed. Additionally/Alternatively, the twelfth identification information may be cause information (Reject Cause) indicating that establishment of a second type multi-access session is not allowed. Additionally/Alternatively, the twelfth identification information may be cause information (Reject Cause) indicating that a second type multi-access session is not supported.

Thirteenth identification information according to the present embodiment is information requesting to modify or configure an access to be used for communication of one or multiple flows that can be performed by using a first type multi-access session. Additionally/Alternatively, the thirteenth identification information may be information requesting to perform Access Traffic Switching function or NBIFOM function. Additionally/Alternatively, the thirteenth identification information may be information indicating that an access for performing communication using a first type multi-access session is to be modified or configured. Note that the thirteenth identification information may include a routing rule associated with the first type multi-access session. Moreover, the routing rule may be a rule for the UE_A 10 to request modification or a rule based on the UE policy.

Fourteenth identification information according to the present embodiment is information requesting to perform or stop Access Traffic Splitting function for communication of one or multiple flows that can be performed by using a second type multi-access session. Note that the fourteenth identification information may include a routing rule associated with the second type multi-access session. Moreover, the routing rule may be a rule for the UE_A 10 to request modification or a rule based on the UE policy.

Fifteenth identification information according to the present embodiment is information indicating that modification or configuration of an access to be used for communication of one or multiple flows that can be performed by using a first type multi-access session is allowed. Additionally/Alternatively, the fifteenth identification information may be information indicating that Access Traffic Switching function or NBIFOM function has been performed. Additionally/Alternatively, the fifteenth identification information may be information indicating that modification or configuration of an access for performing communication using a first type multi-access session has been performed. Note that the fifteenth identification information may include a routing rule associated with the first type multi-access session. Here, the routing rule may be a routing rule that is allowed to be performed or may be a routing rule that has been performed. Moreover, the routing rule may be a rule that the UE_A 10 has requested to modify and a network has allowed to perform or may be a rule that is allowed to be performed based on the operator policy.

Sixteenth identification information according to the present embodiment is information indicating that execution or stop of Access Traffic Splitting function requested by the UE_A 10 for communication of one or multiple flows that can be communicated by using a second type multi-access session is allowed. Additionally/Alternatively, sixteenth identification information may be information indicating that function of Access Traffic Splitting has been performed or stopped for communication of one or multiple flows that can be performed by using a second type multi-access session. Note that the sixteenth identification information may include a routing rule associated with the second type multi-access session. Here, the routing rule may be a routing rule that is allowed to be performed or may be a routing rule that has been performed. Moreover, the routing rule may be a rule that the UE_A 10 has requested to modify and a network has allowed to perform or may be a rule that is allowed to be performed based on the operator policy.

Seventeenth identification information according to the present embodiment is information indicating that modification or configuration of an access to be used for communication of one or multiple flows that can be performed by using a first type multi-access session is not allowed. Additionally/Alternatively, the seventeenth identification information may be information indicating that Access Traffic Switching function or NBIFOM function is rejected. Additionally/Alternatively, the seventeenth identification information may be information indicating that modification or configuration of an access for communication using a first type multi-access session is not performed. Additionally/Alternatively, the seventeenth identification information may be cause information (Reject Cause) indicating that modification or configuration of an access to be used for communication of one or multiple flows is not allowed. Additionally/Alternatively, the seventeenth identification information may be cause information (Reject Cause) indicating that execution of Access Traffic Switching function or NBIFOM function is rejected. Additionally/Alternatively, the seventeenth identification information may be cause information (Reject Cause) indicating that modification or configuration of an access for performing communication using a first type multi-access session is not performed.

Eighteenth identification information according to the present embodiment is information indicating that execution or stop of Access Traffic Splitting function for communication of one or multiple flows that can be communicated by using a second type multi-access session is not allowed. Additionally/Alternatively, the eighteenth identification information may be information indicating rejection of execution of Access Traffic Splitting function requested by the UE_A 10. Additionally/Alternatively, the eighteenth identification information may be information indicating that modification or configuration of an access for performing communication using a second type multi-access session is not performed. Additionally/Alternatively, the eighteenth identification information may be cause information (Reject Cause) indicating that modification or configuration of an access used for communication of one or multiple flows is not allowed. Additionally/Alternatively, the eighteenth identification information may be cause information (Reject Cause) indicating rejection of execution of function of Access Traffic Splitting. Additionally/Alternatively, the eighteenth identification information may be cause information (Reject Cause) indicating that modification or configuration of a routing rule for performing communication using a second type multi-access session is not performed.

Nineteenth identification information according to the present embodiment is information requesting to modify or configure an access to be used for communication of one or multiple flows that can be performed by using a first type multi-access session. Additionally/Alternatively, the nineteenth identification information may be information requesting to perform Access Traffic Switching function or NBIFOM function. Additionally/Alternatively, the nineteenth identification information may be information indicating that an access for performing communication using a first type multi-access session is to be modified or configured. Note that the nineteenth identification information may include a routing rule associated with the first type multi-access session. Moreover, the routing rule may be a rule for a network to request modification or a rule based on the operator policy.

Note that in the present embodiment, a network requesting modification may mean that the core network_A 90 and/or an apparatus included in the core network_A 90, such as the MME_A 40 or the PGW_A 30, requests modification.

Twentieth identification information according to the present embodiment is information for requesting to perform or stop Access Traffic Splitting function for communication of one or multiple flows that can be performed by using a second type multi-access session. Note that the twentieth identification information may include a routing rule associated with the second type multi-access session. Moreover, the routing rule may be a rule for a network to request modification or a rule based on the operator policy.

Twenty-first identification information according to the present embodiment is information indicating that modification or configuration of an access to be used for communication of one or multiple flows that can be performed by using a first type multi-access session is allowed. Additionally/Alternatively, the twenty-first identification information may be information indicating that Access Traffic Switching function or NBIFOM function has been performed. Additionally/Alternatively, the twenty-first identification information may be information indicating that modification or configuration of an access for performing communication using a first type multi-access session has been performed. Note that the twenty-first identification information may include a routing rule associated with the first type multi-access session. Here, the routing rule may be a routing rule that is allowed to be performed or may be a routing rule that has been performed. Moreover, the routing rule may be a rule that the network has requested to modify and the UE_10 has allowed to perform or may be a rule that is allowed to be performed based on the UE policy.

Twenty-second identification information according to the present embodiment is information indicating that execution or stop of Access Traffic Splitting function requested by the network for communication of one or multiple flows that can be communicated by using a second type multi-access session is allowed. Additionally/Alternatively, twenty-second identification information may be information indicating that Access Traffic Splitting function has been performed or stopped for communication of one or multiple flows that can be performed by using a second type multi-access session. Note that the twenty-second identification information may include a routing rule associated with the second type multi-access session. Here, the routing rule may be a routing rule that is allowed to be performed or may be a routing rule that has been performed. Moreover, the routing rule may be a rule that the network has requested to modify and the UE_10 has allowed to perform or may be a rule that is allowed to be performed based on the UE policy.

Twenty-third identification information according to the present embodiment is information indicating that modification or configuration of an access to be used for communication of one or multiple flows that can be performed by using a first type multi-access session is not allowed. Additionally/Alternatively, the twenty-third identification information may be information indicating rejection of execution of Access Traffic Switching function or NBIFOM function. Additionally/Alternatively, the twenty-third identification information may be information indicating that modification or configuration of an access for performing communication using a first type multi-access session is not performed. Additionally/Alternatively, the twenty-third identification information may be cause information (Reject Cause) indicating that modification or configuration of an access used for communication of one or multiple flows is not allowed. Additionally/Alternatively, the twenty-third identification information may be cause information (Reject Cause) indicating rejection of execution of Access Traffic Switching function or NBIFOM function. Additionally/Alternatively, the twenty-third identification information may be cause information (Reject Cause) indicating that modification or configuration of an access for performing communication using a first type multi-access session is not performed.

Twenty-fourth identification information according to the present embodiment is information indicating that execution or stop of Access Traffic Splitting function for communication of one or multiple flows that can be communicated by using a second type multi-access session is not allowed. Additionally/Alternatively, the twenty-fourth identification information may be information indicating rejection of execution of Access Traffic Splitting function requested by the network. Additionally/Alternatively, the twenty-fourth identification information may be information indicating that modification or configuration of an access for performing communication using a second type multi-access session is not performed. Additionally/Alternatively, the twenty-fourth identification information may be cause information (Reject Cause) indicating that modification or configuration of an access used for communication of one or multiple flows is not allowed. Additionally/Alternatively, the twenty-fourth identification information may be cause information (Reject Cause) indicating rejection of execution of Access Traffic Splitting function. Additionally/Alternatively, the twenty-fourth identification information may be cause information (Reject Cause) indicating that modification or configuration of a routing rule for performing communication using a second type multi-access session is not performed.

Next, the communication procedures according to the present embodiment will be described using FIG. 15. Note that details of each of the procedures will be described later. Each apparatus first performs the attach procedure (S2000), and the state is changed to a state in which the UE_A 10 has established a connection with the network. Each apparatus then performs the PDU session establishment procedure (S2002) to change to the first state. Note that the apparatuses may exchange various kinds of capability information and/or various kinds of request information of the apparatuses in the attach procedure and/or the PDU session establishment procedure.

To change to the first state, each apparatus also performs an initial procedure via the second access separately from an initial procedure (attach procedure and/or PDU session establishment procedure) via the first access. Note that each apparatus may perform the initial procedure via the second access after performing the initial procedure via the first access or may perform the initial procedure via the first access after performing the initial procedure via the second access. The apparatuses may perform exchange of various kinds of capability information and/or various kinds of request information of the apparatuses in the initial procedure via the first access or the initial procedure via the second access, or both of the initial procedures.

Note that, in a case that the apparatuses perform exchange of various kinds of information and/or negotiation of various requests in the attach procedure, the apparatuses may not necessarily perform exchange of various kinds of information and/or negotiation of various requests in the PDU session establishment procedure. On the other hand, in a case that the apparatuses do not perform exchange of various kinds of information and/or negotiation of various requests in the attach procedure, the apparatuses may perform exchange of various kinds of information and/or negotiation of various requests in the PDU session establishment procedure. Alternatively, even in a case that the apparatuses perform exchange of various kinds of information and/or negotiation of various requests in the attach procedure, the apparatus may perform exchange of various kinds of information and/or negotiation of various requests in the PDU session establishment procedure.

For example, the apparatuses may exchange one or more pieces of identification information among first identification information to eighteenth identification information in the attach procedure and the PDU session establishment procedure. The apparatuses may exchange one or more pieces of identification information among the first identification information to the eighteenth identification information in the attach procedure and not necessarily exchange the one or more pieces of identification information in the PDU session establishment procedure. Alternatively, each apparatus may exchange one or more pieces of identification information among the first identification information to the eighteenth identification information in the PDU session establishment procedure instead of the attach procedure. The apparatuses may exchange identification information not exchanged in the attach procedure among the first identification information to the eighteenth identification information, in the PDU session procedure.

Moreover, each apparatus may exchange these pieces of identification information in a case of managing the pieces of identification information in the attach procedure in association with the UE_A 10, while each apparatus may exchange the pieces of identification information in the procedure of establishing a PDU session in a case of managing the pieces of identification information in association with a PDU session.

Moreover, each apparatus may perform the PDU session establishment procedure in the attach procedure or after completion of the attach procedure. Note that, in a case that the PDU session establishment procedure is performed in the attach procedure, each apparatus may establish a PDU session, based on completion of the attach procedure or change to the first state.

Next, each apparatus performs a routing rule update procedure (S2006). Note that the routing rule update procedure may be performable at an arbitrary timing as long as it is after the entry into the first state. Each apparatus may exchange various kinds of request information in the routing rule update procedure. For example, the apparatuses may exchange one or more pieces of identification information among thirteen identification information to twenty-fourth identification information in the routing rule update procedure.

Through the above-described procedures, each apparatus completes this procedure. Note that each apparatus related to this procedure may transmit and/or receive each control message described in this procedure, to thereby transmit and/or receive one or multiple pieces of identification information included in the control message and store each transmitted and/or received piece of identification information as a context.

1.3.1. Overview of Attach Procedure

First, an overview of the attach procedure will be described. This procedure is a procedure for connecting to a network (the access network and/or the core network_A 90 and/or the PDN_A 5) under the initiative of the UE_A 10. In a case that the UE_A 10 is not connected to the core network_A 90, the UE_A 10 can perform this procedure at an arbitrary timing, such as at the time when the terminal is turned on. In other words, the UE_A 10 may start this procedure at an arbitrary timing as long as the UE_A 10 is in a deregistered state (EMM-DEREGISTERED). Each apparatus may be changed to a registered state (EMM-REGISTERED), based on completion of the attach procedure.

This procedure may include a procedure via the first access and a procedure via the second access. The UE_A 10 may start this procedure via the second access in a state of being connected to the core network_A 90 via the first access or may start this procedure via the first access in a state of being connected to the core network_A 90 via the second access.

Note that hereinafter this procedure via the first access will be described as an example of an attach procedure, and this procedure via the second access will be described as an example of an attach access via the second access.

1.3.2. Example of PDU Session Establishment Procedure

Next, an example of the PDU session establishment procedure will be described. This procedure is a procedure in which each apparatus establishes a PDU session. Note that each apparatus may perform this procedure in a state that the attach procedure is completed or may perform this procedure during the attach procedure. Each apparatus may start this procedure at an arbitrary timing after the attach procedure. Each apparatus may establish a PDU session, based on completion of the PDU session establishment procedure. Moreover, each apparatus may establish multiple PDU sessions by performing this procedure multiple times.

Note that the PDU session established in this procedure may be multi-access session. Moreover, each apparatus may perform this procedure multiple times to add a communication path via multiple accesses to a single multi-access session or establish a new multi-access session. Note that this procedure may include a procedure via the first access and a procedure via the second access.

This procedure may be performed under the initiative of the UE_A 10. For example, this procedure may be performed under the initiative of the UE_A 10 at an initial connection, such as at the time when the terminal is turned on. Moreover, the UE_A 10 may start this procedure via the first access and/or the second access in a state of being connected to the core network_A 90 via the first and/or the second access.

Note that each apparatus may perform this procedure via the second access in a state of having established a multi-access session via the first access, to add a communication path via the second access to the multi-access session or to enable communication using a communication path via the first access and a communication path via the second access to be performed.

Moreover, each apparatus may perform this procedure via the first access in a state of having established a multi-access session via the second access, to add a communication path via the first access to the multi-access session or to enable communication using a communication path via the first access and a communication path via the second access to be performed.

Each apparatus may perform this procedure via the first access and/or the second access in a state of having not established a multi-access session, to establish a new multi-access session.

Note that a condition for a communication path via a new access being added to a multi-access session and/or a condition for a new multi-access session being established is not limited to these. Hereinafter, this procedure via the first access will be described as an example of a UE-initiated PDU session procedure, and this procedure via the second access will be described as an example of a UE-initiated PDU session establishment procedure via the second access.

1.3.2.1. Example of UE-Initiated PDU Session Establishment Procedure

Figure 17:
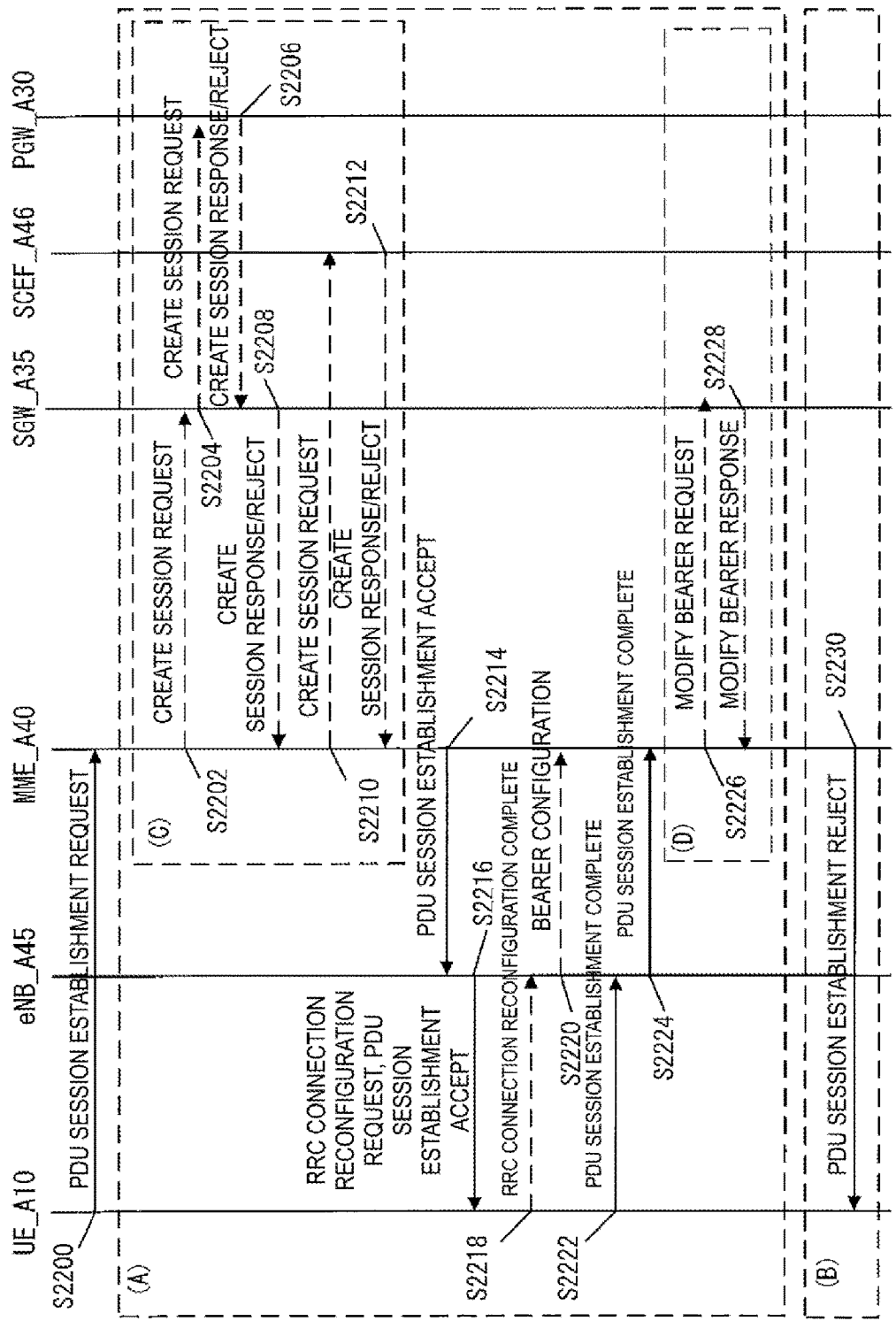
FIG. 17 is a diagram illustrating a UE-initiated PDU session establishment procedure.

With reference to FIG. 17, a description will be given of an example of a process for performing the PDU session establishment procedure under the initiative of the UE_A 10. Steps of this procedure will be described below. First, the UE_A 10 transmits a PDU session establishment request message to the MME_A 40 via the eNB_A 45 and starts the UE-initiated PDU session establishment procedure (S2200).

Note that this procedure may be an example of the UE-initiated PDU session establishment procedure via the first access. Here, the UE_A 10 may include, in the PDU session establishment request message, at least one or more pieces of identification information among the first identification information, the second identification information, the third identification information, the seventh identification information, the eighth identification information, the thirteenth identification information, and the fourteenth identification information, or may include these pieces of identification information in the message to request to establish a multi-access session.

Moreover, each apparatus may transmit and/or receive the first identification information and/or the second identification information and/or the seventh identification information and/or the thirteenth identification information to request establishment of a first type multi-access session, request to perform communication using Access Traffic Switching, or request to perform communication using NBIFOM.

Moreover, each apparatus may transmit and/or receive the first identification information and/or the second identification information and/or the seventh identification information and/or the thirteenth identification information to indicate that the UE_A 10 supports Access Traffic Switching or request to establish a PDU session supporting Access Traffic Switching.

Moreover, each apparatus may transmit and/or receive the thirteenth identification information to request to configure an access for performing communication using a first type multi-access session and/or to configure a routing rule corresponding to a first type multi-access session.

Moreover, each apparatus may transmit and/or receive the first identification information and/or the third identification information and/or the eighth identification information and/or the fourteenth identification information to request to establish a second type multi-access session or request to perform communication using Access Traffic Splitting.

Moreover, each apparatus may transmit and/or receive the first identification information and/or the third identification information and/or the eighth identification information and/or the fourteenth identification information to indicate that the UE_A 10 supports Access Traffic Splitting or request to establish a PDU session supporting Access Traffic Splitting.

Moreover, each apparatus may transmit and/or receive the fourteenth identification information to request to perform or not to perform the Access Traffic Splitting function for each flow or request to configure a routing rule corresponding to a second type multi-access session.

Moreover, in a case of having already established a multi-access session, the UE_A 10 may include, in a PDU session establishment request message, information indicating that this is not an initial request and/or the APN used in the multi-access session to request to add a communication path via the first access to the already established multi-access session. Note that the information indicating that this is not an initial request may be information indicating that this is a handover.

Alternatively, the UE_A 10 may transmit information indicating that this is an initial request in a PDU session establishment request message or may include these pieces of identification information in a PDU session establishment request message to request to establish a new multi-access session via the first access.

The MME_A 40 receives a PDU session establishment request message to evaluate the first condition. In a case that the first condition is true, the MME_A 40 starts a procedure (A) of this procedure; in a case that the first condition is false, the MME_A 40 starts a procedure (B) of this procedure.

Steps of the procedure (A) of this procedure will be described below. The MME_A 40 performs a procedure (C) of this procedure and starts the procedure (A) of this procedure. Moreover, each step of the procedure (C) of this procedure will be described below. The MME_A 40 performs second condition evaluation and starts the procedure (C) of this procedure. In a case that the second condition is true, the MME_A 40 may transmit a create session request message to the SGW_A 35 (S2202). In contrast, in a case that the second condition is false, the MME_A 40 may transmit a create session request message to the SCEF_A 46 (S2210). Note that steps in a case that the first condition is false will be described later.

Here, the first condition evaluation is for evaluating whether or not the MME_A 40 is to accept the request from the UE_A 10. The first condition being true may be a case of accepting the request from the UE_A 10, that is, a case that the request from the UE_A 10 is allowed. Moreover, the first condition being false may be a case of rejecting the request from the UE_A 10, that is, a case of not judging that the first condition is true.

The second condition evaluation is for the MME_A 40 to determine the type of a PDU session to be established. The second condition being true may be a case that the PDU session to be established is a first type PDU session, and may be a case that the UE_A 10 has requested to establish a first type PDU session and the MME_A 40 has allowed the request and/or a case that the MME_A 40 has determined to establish a first type PDU session. Moreover, the second condition being false may be a case that the PDU session to be established is a second type PDU session, and may be a case that the UE_A 10 has requested establishment of a second type PDU session and the MME_A 40 has allowed the request and/or a case that the MME_A 40 has determined to establish a second type PDU session, and may be a case of not judging that the second condition is true.

Here, the first type PDU session is connectivity between the UE_A 10 and the DN via the eNB_A 45 and/or the SGW_A 35 and/or the PGW_A 30, and the second type PDU session is connectivity between the UE_A 10 and the DN via the eNB_A 45 and/or the MME_A 40 and/or the SCEF_A 46.

Note that, in a case of receiving the create session request message, the SGW_A 35 transmits the create session request message to the PGW_A 30 (S2204). Moreover, the PGW_A 30 receives the create session request message and evaluates the third condition.

Here, the MME_A 40 and/or the SGW_A 35 may include, in the create session request message, one or more pieces of identification information among the first identification information, the second identification information, the third identification information, the seventh identification information, the eighth identification information, the thirteenth identification information, and the fourteenth identification information, or information indicating whether or not this is an initial request and/or an APN, or may include these pieces of identification information in the message to transfer the request from the UE_A 10.

The third condition evaluation may be performed by the PCRF_A 60 instead of the PGW_A 30. In this case, the PGW_A 30 performs the IP-CAN session establishment procedure with the PCRF_A 60. More specifically, the PGW_A 30 transmits a request message in the IP-CAN session establishment procedure to the PCRF_A 60. Moreover, the PCRF_A 60 receives the request message in the IP-CAN session establishment procedure, evaluates the third condition, and transmits a response message in the IP-CAN session establishment procedure to the PGW_A 30. Moreover, the PGW_A 30 receives the response message in the IP-CAN session establishment procedure and recognizes a result of the third condition evaluation.

Here, the PGW_A 30 may include, in the request message in the IP-CAN session establishment procedure, at least one or more pieces of identification information among the first identification information, the second identification information, the third identification information, the seventh identification information, the eighth identification information, the thirteenth identification information, and the fourteenth identification information, or information indicating whether or not this is an initial request, or may include these pieces of identification information in the request message to transfer the request from the UE_A 10.

The PCRF_A 60 may include at least the result of the third information evaluation in a response message in the IP-CAN session establishment procedure or may include this result in the message to notify the PGW_A 30 of the result of the third condition evaluation.

Moreover, the PCRF_A 60 may include, in the response message in the IP-CAN session establishment procedure, one or more pieces of identification information among the fourth identification information, the fifth identification information, the sixth identification information, the ninth identification information, the tenth identification information, the fifteenth identification information, and the sixteenth identification information, or may include these pieces of identification information in the message to indicate that the request from the UE_A 10 is allowed.

The PCRF_A 60 may include, in the response message in the IP-CAN session establishment procedure, one or more pieces of identification information among the eleventh identification information, the twelfth identification information, the seventeenth identification information, and the eighteenth identification information, or may include these pieces of identification information in the message to indicate that the request from the UE_A 10 is rejected.

In a case that the third condition is true, the PGW_A 30 transmits a session generation response message to the SGW_A 35 (S2206). Moreover, the SGW_A 35 receives the session generation response message and transmits the session generation response message to the MME_A 40 (S2208). Moreover, the MME_A 40 receives the session generation response message.

The PGW_A 30 and/or the SGW_A 35 may include, in the session generation response message, one or more pieces of identification information among the fourth identification information, the fifth identification information, the sixth identification information, the ninth identification information, the tenth identification information, the fifteenth identification information, and the sixteenth identification information, or an APN and/or an IP address, or include these pieces of identification information in the message to indicate that the request from the UE_A 10 is allowed.

In a case that the third condition is false, the PGW_A 30 transmits a create session reject message to the SGW_A 35 (S2206). Moreover, the SGW_A 35 receives the create session reject message and transmits the create session reject message to the MME_A 40 (S2208). Note that the create session reject message may be a session generation response message including a reject cause.

The PGW_A 30 and/or the SGW_A 35 may include, in the create session reject message, one or more pieces of identification information among the eleventh identification information, the twelfth identification information, the seventeenth identification information, and the eighteenth identification information, or may include these pieces of identification information in the message to indicate that the request from the UE_A 10 is rejected.

In a case of receiving the create session request message, the SCEF_A 46 evaluates the third condition. In a case that the third condition is true, the SCEF_A 46 transmits a session generation response message to the MME_A 40 (S2212). The MME_A 40 receives the session generation response message. Otherwise, the SCEF_A 46 transmits a create session reject message to the MME_A 40 (S2212). Each apparatus completes the procedure (C) of this procedure, based on reception of the session generation response message and/or the create session reject message.

Note that the third condition evaluation is for evaluating whether or not the PGW_A 30 and/or the SCEF_A 46 is to accept the request from the UE_A 10. The third condition being true may be a case of accepting the request from the UE_A 10, that is, a case that the request from the UE_A 10 is allowed. Moreover, the third condition being false may be a case of rejecting the request from the UE_A 10, that is, a case of not judging that the third condition is true, and a case of not judging that the third condition is true.

Note that, in a case that the PCRF_A 60 performs the third condition evaluation, the PGW_A 30 may perform the third condition evaluation, based on a result of the third condition evaluation received from the PCRF_A 60. For example, in a case that the PCRF_A 60 accepts the request from the UE_A 10, the PCRF_A 60 and the PGW_A 30 may judge that the third condition is true; in a case that the PCRF_A 60 rejects the request from the UE_A 10, the PCRF_A 60 and the PGW_A 30 may judge that the third condition is false.

The MME_A 40 transmits the PDU session establishment accept message to the eNB_A 45, based on reception of the session generation response message (S2214). Note that, in a case of receiving the create session reject message, the MME_A 40 may start the procedure (B) of this procedure instead of continuing the procedure (A) of this procedure.

The eNB_A 45 receives the PDU session establishment accept message and transmits an RRC connection reconfiguration request message and/or a PDU session establishment accept message to the UE_A 10 (S2216). Note that the PDU session establishment accept message may be transmitted and/or received in an RRC connection reconfiguration request message.

Here, the MME_A 40 may include, in the PDU session establishment accept message, at least one or more pieces of identification information among the fourth identification information, the fifth identification information, the sixth identification information, the ninth identification information, the tenth identification information, the fifteenth identification information, and the sixteenth identification information, or an APN and/or an IP address, or may include these pieces of identification information in the message to indicate that the request from the UE_A 10 is accepted or that establishment of a multi-access session is allowed.

Moreover, each apparatus may transmit and/or receive the fourth identification information and/or the fifth identification information and/or the ninth identification information and/or the fifteenth identification information to indicate that the request to establish a first type multi-access session is accepted, indicate that a request to perform communication using Access Traffic Switching is accepted, or indicate a request to perform communication using NBIFOM is accepted.

Each apparatus may transmit and/or receive the fourth identification information and/or the fifth identification information and/or the ninth identification information and/ or the fifteenth identification information to indicate that the network supports Access Traffic Switching or indicate that a PDU session supporting Access Traffic Switching is established.

Moreover, each apparatus may transmit and/or receive the fifteenth identification information to indicate that an access for performing communication using a first type multi-access session is configured or that a routing rule corresponding to a first type multi-access session is configured.

Moreover, each apparatus may transmit and/or receive the fourth identification information and/or the sixth identification information and/or the tenth identification information and/or the sixteenth identification information to indicate that a request to establish a second type multi-access session is accepted or indicate that a request to perform communication using Access Traffic Splitting is accepted.

Each apparatus may transmit and/or receive the fourth identification information and/or the sixth identification information and/or the tenth identification information and/ or the sixteenth identification information to indicate that the network supports Access Traffic Splitting or indicate that a PDU session supporting Access Traffic Splitting is established.

Moreover, each apparatus may transmit and/or receive the sixteenth identification information to indicate whether or not the Access Traffic Splitting function is performed for each flow or indicate that a routing rule corresponding to a second type multi-access session is configured.

Each apparatus may transmit and/or receive the same APN and/or IP address as that of the multi-access session already established before starting of this procedure, to indicate that a communication path via the first access is added to the multi-access session. In contrast, each apparatus may transmit and/or receive a new APN and/or IP address to indicate that a new multi-access session via the first access is established.

In a case of receiving an RRC connection reconfiguration request message, the UE_A 10 transmits the RRC connection reconfiguration request message to the eNB_A 45 (S2218). The eNB_A 45 receives an RRC connection reconfiguration request message, and transmits a bearer configuration message to the MME_A 40 (S2220). Moreover, the MME_A 40 receives the bearer configuration message.

In a case of receiving a PDU session establishment accept message, the UE_A 10 transmits a PDU session establishment complete message to the MME_A 40 via the eNB_A 45 (S2222) (S2224). Moreover, the MME_A 40 receives a PDU session establishment complete message to start a procedure (D) of this procedure.

Steps of the procedure (D) of this procedure will be described below. In a case that the second condition is true, the MME_A 40 transmits a modify bearer request message to the SGW_A 35 and starts the procedure (D) of this procedure (S2226). Moreover, the SGW_A 35 receives the modify bearer request message and transmits a Modify Bearer Response message to the MME_A 40 (S2228). Moreover, the MME_A 40 receives the Modify Bearer Response message and completes the procedure (D) of this procedure. Moreover, each apparatus completes the procedure (A) of this procedure, based on transmission and/or reception of the PDU session establishment complete message and/or completion of the procedure (D) of this procedure.

Next, steps of the procedure (B) of this procedure will be described. The MME_A 40 transmits a PDU session establishment reject message to the UE_A 10 via the eNB_A 45 and starts the procedure (B) of this procedure (S2230).

Moreover, the UE_A 10 receives the PDU session establishment reject message and recognizes that the request from the UE_A 10 is rejected. Each apparatus completes the procedure (B) of this procedure, based on transmission and/or reception of the PDU session establishment reject message.

The MME_A 40 may include, in the PDU session establishment reject message, one or more pieces of identification information among the eleventh identification information, the twelfth identification information, the seventeenth identification information, and the eighteenth identification information, include these pieces of identification information to indicate that the request from the UE_A 10 is rejected, indicate that the connection destination network does not support establishment of a multi-access session, or indicate that establishment of a multi-access session is not allowed.

Moreover, each apparatus may transmit and/or receive the eleventh identification information and/or the seventeenth identification information to indicate that the request to establish a first type multi-access session is rejected, indicate that the request to perform communication using Access Traffic Switching is rejected, indicate that the request to perform communication using NBIFOM is rejected, or make notification about a cause of rejection of each request.

Moreover, each apparatus may transmit and/or receive the seventeenth identification information to indicate that configuration of an access for performing communication using a first type multi-access session is not allowed or indicate that configuration of a routing rule corresponding to a first type multi-access session is not allowed.

Each apparatus may transmit and/or receive the twelfth identification information and/or the eighteenth identification information to indicate that the request to establish a second type multi-access session is rejected, indicate that the request to perform communication using Access Traffic Splitting is rejected, or make notification about a cause of rejection of each request.

Moreover, each apparatus may transmit and/or receive the eighteenth identification information to indicate that execution of the Access Traffic Splitting function is not allowed for each flow or indicate that configuration of a routing rule corresponding to a second type multi-access session is not allowed.

Each apparatus completes this procedure, based on completion of the procedure (A) or (B) of this procedure. Note that each apparatus may change to a state in which a PDU session is established, based on completion of the procedure (A) of this procedure or may recognize that this procedure is rejected, based on completion of the procedure (B) of this procedure.

Moreover, each apparatus may establish a multi-access session, based on completion of this procedure. Specifically, each apparatus may establish a multi-access session in a case of transmitting and/or receiving one or more pieces of identification information among the fourth identification information, the fifth identification information, the sixth identification information, the ninth identification information, the tenth identification information, the fifteenth identification information, and the sixteenth identification information, and may not necessarily establish a multi-access session in a case of transmitting and/or receiving one or more pieces of identification information among the eleventh identification information, the twelfth identification information, the seventeenth identification information, and the eighteenth identification information. Moreover, each apparatus may establish a multi-access session to enable communication using a communication path via the first access and a communication path via the second access to be performed.

Moreover, in a case of transmitting and/or receiving the fourth identification information and/or the fifth identification information and/or the ninth identification information and/or the fifteenth identification information, each apparatus may establish a first type multi-access session or establish a PDU session supporting Access Traffic Switching. Moreover, in a case of transmitting and/or receiving the fourth identification information and/or the fifth identification information and/or the ninth identification information and/or the fifteenth identification information, each apparatus may recognize that the established PDU session is a first type multi-access session or recognize that Access Traffic Switching and/or NBIFOM is applied to the established PDU session.

In a case of transmitting and/or receiving the fourth identification information and/or the sixth identification information and/or the tenth identification information and/or the sixteenth identification information, each apparatus may establish a second type multi-access session or recognize that the established PDU session is a second type multi-access session. Moreover, in a case of transmitting and/or receiving the fourth identification information and/or the sixth identification information and/or the tenth identification information and/or the sixteenth identification information, each apparatus may establish a PDU session supporting Access Traffic Splitting or recognize that Access Traffic Splitting is applied to the established PDU session.

Moreover, in a case of transmitting and/or receiving the fifteenth identification information, each apparatus may recognize and store an access and/or a routing rule to be used in the established PDU session. Moreover, in a case of transmitting and/or receiving the sixteenth identification information, each apparatus may recognize and store information indicating whether or not the Access Traffic Splitting function is performed for each flow of user data to be transmitted and/or received and/or a routing rule to be used in the established PDU session.

Moreover, in a case of transmitting and/or receiving the eleventh identification information and/or the seventeenth identification information, each apparatus may recognize that configuration of an access for performing communication using a first type multi-access session is not allowed or recognize that configuration of a routing rule corresponding to a first type multi-access session is not allowed.

Moreover, in a case of transmitting and/or receiving the twelfth identification information and/or the eighteenth identification information, each apparatus may recognize that the Access Traffic Splitting function is not allowed for each flow or recognize that configuration of a routing rule corresponding to a second type multi-access session is not allowed.

Moreover, in a case of transmitting and/or receiving one or more pieces of identification information among the eleventh identification information, the twelfth identification information, the seventeenth identification information, and the eighteenth identification information, each apparatus may recognize that the request from the UE_A 10 is rejected or recognize a cause of rejection of the request from the UE_A 10. Moreover, each apparatus may perform this procedure again based on the cause of rejection of the request from the UE_A 10.

Moreover, each apparatus may determine whether a communication path via the first access is added to the multi-access session already established before starting of this procedure or a new multi-access session via the first access is established, based on completion of this procedure.

For example, in a case of transmitting and/or receiving the same APN and/or IP address as that of the already-established multi-access session, each apparatus may recognize that a communication path via the first access is added to the already-established multi-access session. In a case of transmitting and/or receiving a different APN and/or IP address from that of the already-established multi-access session, each apparatus may recognize that a new multi-access session via the first access is established.

The above-described first to third condition evaluation may be performed based on identification information included in a PDU session establishment request message and/or subscribed information and/or an operator policy. Conditions for determining whether each of the first to third conditions is true or false may not necessarily be limited to the above-described conditions.

For example, the first condition and/or the third condition may be true in a case that the UE_A 10 requests establishment of a multi-access session and the network allows the request. The first condition and/or the third condition may be false in a case that the UE_A 10 requests establishment of a multi-access session and the network does not allow the request. Moreover, the first condition and/or the third condition may be false in a case that the connection destination network of the UE_A 10 and/or an apparatus in the network does not support establishment of a multi-access session.

More specifically, the first condition and/or the third condition may be true in a case that the request from the UE_A 10 to establish a first type and/or second type multi-access session is accepted, and may be false in a case that the request is not accepted.

Moreover, the first condition and/or the third condition may be true in a case that the type of access and/or a routing rule requested from the UE_A 10 to be used in a multi-access session is accepted, and may be false in a case that the type of access and/or a routing rule is not accepted.

Moreover, the first condition and/or the third condition may be true in a case that the request from the UE_A 10 to enable or not to enable the Access Traffic Switching function and/or the NBIFOM function and/or the Access Traffic Splitting function is accepted, and may be false in a case that the request is not accepted.

Figure 18:
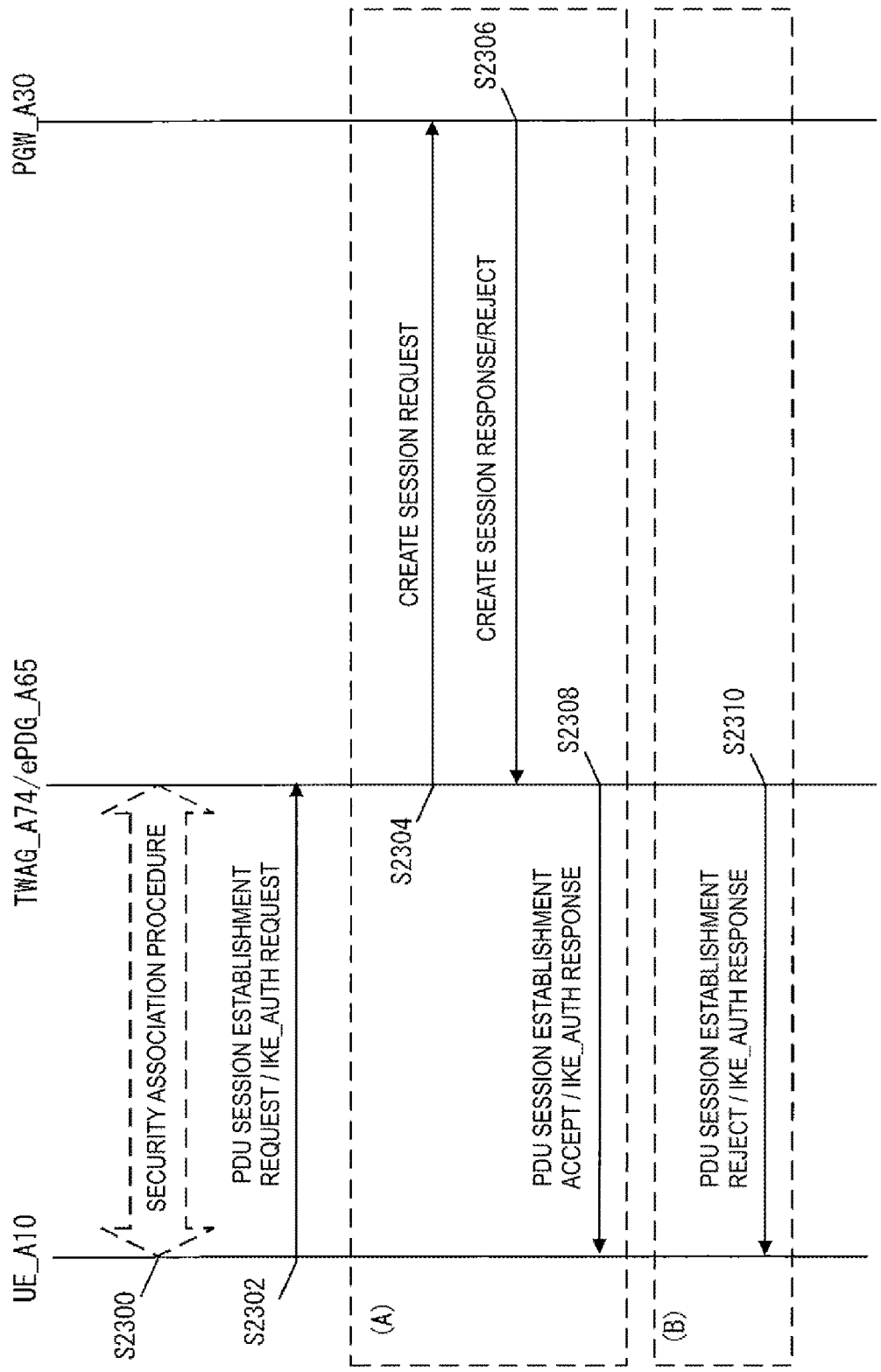
FIG. 18 is a diagram illustrating a UE-initiated PDU session establishment procedure via a second access.

1.3.2.2. Example of UE-Initiated PDU Session Establishment Procedure Via Second Access With reference to FIG. 18, a description will be given of an example of a process for performing a PDU session establishment procedure via the second access under the initiative of the UE_A 10. Steps of this procedure will be described below. First, the UE_A 10 performs a procedure for establishing a security association with an access network and/or the core network_A 90 (S2300). Note that, in a case that a security association with the network has already been established, the UE_A 10 may detail a security association procedure.

Next, the UE_A 10 transmits a control message to an apparatus in the access network. Specifically, in a case that the connection destination access network is a second access and/or the WLAN ANa 70, the UE_A 10 transmits a PDU session establishment request message to the TWAG_A 74 (S2302). In a case that the connection destination access network is a second access and/or the WLAN ANb 75, the UE_A 10 transmits an IKE_AUTH request message to the ePDG_A 65 (S2302).

Note that this procedure may be an example of the UE-initiated PDU session establishment procedure via the second access. Here, the UE_A 10 may include, in the PDU session establishment request message and/or the IKE_AUTH request message, at least one or more pieces of identification information among the first identification information, the second identification information, the third identification information, the seventh identification information, the eighth identification information, the thirteenth identification information, and the fourteenth identification information, or may include these pieces of identification information in the message to request to establish a multi-access session.

Moreover, each apparatus may transmit and/or receive one or more pieces of identification information among the first identification information, the second identification information, the third identification information, the seventh identification information, the eighth identification information, the thirteenth identification information, and the fourteenth identification information to perform a similar operation to that of a corresponding one of apparatuses in the above-described UE-initiated PDU session establishment procedure.

Moreover, in a case that a multi-access session is already established, the UE_A 10 may include, in the PDU session establishment request message and/or the IKE_AUTH request message, information indicating that this is not an initial request and/or the APN used in the multi-access session, to request to add a communication path via the second access to the already-established multi-access session. Note that the information indicating that this is not an initial request may be information indicating that this is a handover.

Alternatively, the UE_A 10 may transmit, in the PDU session establishment request message and/or the IKE_AUTH request message, information that this is an initial request or may include the identification information in the message to request to establish a new multi-access session via the second access.

In a case that the connection destination of the UE_A 10 is a second access and/or the WLAN ANa 70, the TWAG_A 74 receives the PDU session establishment request message and evaluates the first condition. In a case that the connection destination of the UE_A 10 is a second access and/or the WLAN ANb 75, the ePDG_A 65 receives an IKE_AUTH request message and evaluates the first condition. In a case that the first condition is true, the TWAG_A 74 and/or the ePDG_A 65 starts the procedure (A) of this procedure; in a case that the first condition is false, the TWAG_A 74 and/or the ePDG_A 65 starts the procedure (B) of this procedure.

Steps of the procedure (A) of this procedure will be described below. The TWAG_A 74 and/or the ePDG_A 65 transmits a create session request message to the PGW_A 30 and starts the procedure (A) of this procedure (S2304). Moreover, the PGW_A 30 receives the create session request message and evaluates the third condition.

Here, the TWAG_A 74 and/or the ePDG_A 65 may include, in the create session request message, one or more pieces of identification information among the first identification information, the second identification information, the third identification information, the seventh identification information, the eighth identification information, the thirteenth identification information, and the fourteenth identification information, include information indicating whether or not this is an initial request and/or an APN in the message, or include these pieces of identification information in the message to transfer the request from the UE_A 10.

The third condition evaluation may be performed by the PCRF_A 60 instead of the PGW_A 30, as in the above-described example of the UE-initiated PDU session establishment procedure. Therefore, description of the steps is omitted.

In a case that the third condition is true, the PGW_A 30 transmits a session generation response message to the transmission source of the create session request message (S2306). Moreover, the transmission source of the create session request message receives the session generation response message. Note that the transmission source of the create session request message may be the TWAG_A 74 or the ePDG_A 65.

The PGW_A 30 may include, in the session generation response message, one or more pieces of identification information among the fourth identification information, the fifth identification information, the sixth identification information, the ninth identification information, the tenth identification information, the fifteenth identification information, and the sixteenth identification information, indicate an APN and/or an IP address, or include these pieces of identification information in the message to indicate that the request from the UE_A 10 is allowed.

In a case that the third condition is false, the PGW_A 30 transmits a create session reject message to the transmission source of the create session request message (S2306). Moreover, the transmission source of the create session request message receives the create session reject message. Note that the create session reject message may be a session generation response message including a reject cause.

The PGW_A 30 may include, in the create session reject message, one or more pieces of identification information among the eleventh identification information, the twelfth identification information, the seventeenth identification information, and the eighteenth identification information, or may include these pieces of identification information in the message to indicate that the request from the UE_A 10 is rejected.

Note that the third condition evaluation is for evaluating whether or not the PGW_A 30 and/or the PCRF_A 60 is to accept the request from the UE_A 10. The third condition evaluation may be similar to that in the above-described example of the UE-initiated PDU session establishment procedure. Therefore, description of the steps is omitted.

Next, in a case of receiving a session generation response message, the TWAG_A 74 transmits the PDU session establishment accept message to the UE_A 10 (S2308). Alternatively, in a case of receiving a session generation response message, the ePDG_A 65 transmits an IKE_AUTH response message to the UE_A 10 (S2308). Note that, in a case of receiving the create session reject message, the TWAG_A 74 and/or the ePDG_A 65 may start the procedure (B) of this procedure instead of continuing the procedure (A) of this procedure.

Here, the TWAG_A 74 may include, in the PDU session establishment accept message, at least one or more pieces of identification information among the fourth identification information, the fifth identification information, the sixth identification information, the ninth identification information, the tenth identification information, the fifteenth identification information, and the sixteenth identification information, indicate an APN and/or an IP address, or include these pieces of identification information in the message to indicate that the request from the UE_A 10 is allowed or that establishment of a multi-access session is allowed.

The ePDG_A 65 may include, in the IKE_AUTH response message, at least one or more pieces of identification information among the fourth identification information, the fifth identification information, the sixth identification information, the ninth identification information, the tenth identification information, the fifteenth identification information, and the sixteenth identification information, indicate an APN and/or an IP address, or include these pieces of identification information in the message to indicate that the request from the UE_A 10 is allowed or that establishment of a multi-access session is allowed.

Moreover, each apparatus may transmit and/or receive one or more pieces of identification information among the fourth identification information, the fifth identification information, the sixth identification information, the ninth identification information, the tenth identification information, the fifteenth identification information, and the sixteenth identification information to perform a similar operation to that of a corresponding one of apparatuses in the above-described UE-initiated PDU session establishment procedure.

Each apparatus may transmit and/or receive the same APN and/or IP address as that of the multi-access session already established before starting of this procedure, to indicate that a communication path via the second access is added to the multi-access session. In contrast, each apparatus may transmit and/or receive a new APN and/or IP address to indicate that a new multi-access session via the second access is established.

The UE_A 10 receives the PDU session establishment accept message and/or the IKE_AUTH response message and completes the procedure (A) of this procedure.

Next, steps of the procedure (B) of this procedure will be described. In a case of receiving a PDU session establishment request message and/or a create session reject message, the TWAG_A 74 transmits a PDU session establishment reject message to the UE_A 10 (S2310). Alternatively, in a case of receiving an IKE_AUTH request message and/or a create session reject message, the ePDG_A 65 transmits an IKE_AUTH response message to the UE_A 10 (S2310).

The TWAG_A 74 may include, in the PDU session establishment reject message, one or more pieces of identification information among the eleventh identification information, the twelfth identification information, the seventeenth identification information, and the eighteenth identification information, to indicate that the request from the UE_A 10 is rejected, indicate that the connection destination network does not support establishment of a multi-access session, or indicate that establishment of a multi-access session is not allowed.

The ePDG_A 65 may include, in the IKE_AUTH response message, one or more pieces of identification information among the eleventh identification information, the twelfth identification information, the seventeenth identification information, and the eighteenth identification information, to indicate that the request from the UE_A 10 is rejected, indicate that the connection destination network does not support establishment of a multi-access session, or indicate that establishment of a multi-access session is not allowed.

Moreover, each apparatus may transmit and/or receive one or more pieces of identification information among the eleventh identification information, the twelfth identification information, the seventeenth identification information, and the eighteenth identification information, to perform a similar operation as that of a corresponding one of apparatuses in the above-described UE-initiated PDU session establishment procedure.

The UE_A 10 receives the PDU session establishment reject message and/or the IKE_AUTH response message and completes the procedure (B) of this procedure.

Each apparatus completes this procedure, based on completion of the procedure (A) or (B) of this procedure. Note that each apparatus may change to a state in which a PDU session is established, based on completion of the procedure (A) of this procedure or may recognize that this procedure is rejected, based on completion of the procedure (B) of this procedure.

Moreover, each apparatus may perform a similar operation as that of a corresponding apparatus in the above-described UE-initiated PDU session establishment procedure, based on completion of this procedure. Each apparatus may determine whether a communication path via the second access is added to the multi-access session already established before starting of this procedure or a new multi-access session via the second access is established, based on completion of this procedure.

For example, in a case of transmitting and/or receiving the same APN and/or IP address to that of the already-established multi-access session, each apparatus may recognize that a communication path via the second access has been added to the multi-access session. In a case of transmitting and/or receiving a different APN and/or IP address from that of the multi-access session, each apparatus may recognize that a new multi-access session via the second access is established.

The first condition evaluation and/or the third condition evaluation may be the similar to that in the above-described example of the UE-initiated PDU session establishment procedure.

1.3.3. Attach Procedure Example

Figure 16:
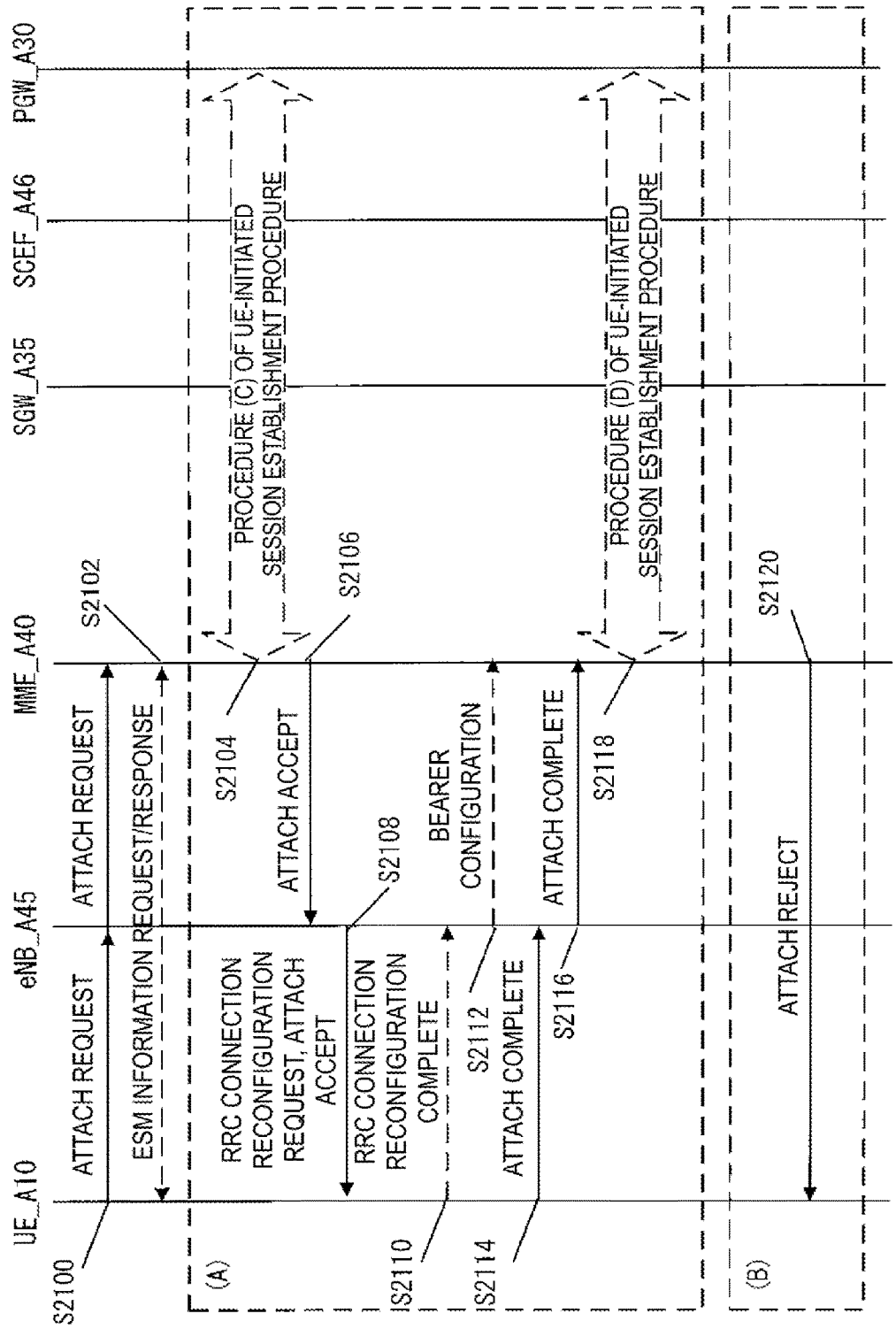
FIG. 16 is a diagram illustrating an attach procedure.

Using FIG. 16, an example of procedure for performing an attach procedure will be described. Steps of this procedure will be described below. At first, the UE_A 10 transmits an attach request message to the MME_A 40 via the eNB_A 45, and starts an attach procedure (S2100). The UE_A 10 may include and transmit the above-mentioned PDU session establishment request message in the attach request message, or may require to perform a PDU session establishment procedure during the attach procedure by including the PDU session establishment request message.

Note that the present procedure may be an attach procedure example via a first access. Here, the UE_A 10 may include, in the attach request message, at least one or more identification information of the first identification information, the second identification information, the third identification information, the seventh identification information, the eighth identification information, the thirteenth identification information, and the fourteenth identification information, or may indicate that the UE_A 10 supports establishment of a multiaccess session by including these pieces of identification information.

Furthermore, by transmitting and/or receiving the first identification information, and/or the second identification information, and/or the seventh identification information, and/or the thirteenth identification information, each device may indicate that the UE_A 10 supports establishment of the first type of the multiaccess session, or may indicate that the UE_A 10 supports communication using Access Traffic Switching, or may indicate that the UE_A 10 supports communication using NBIFOM.

Furthermore, by transmitting and/or receiving the first identification information, and/or the second identification information, and/or the seventh identification information, and/or the thirteenth identification information, each device may indicate that the UE_A 10 supports Access Traffic Switching, or may indicate that the UE_A 10 supports establishment of a PDU session supporting Access Traffic Switching.

Furthermore, each device may indicate an access capable of communication using the first type of the multiaccess session and/or a routing rule corresponding to the first type the multiaccess session configurable by the UE_A 10 by transmitting and/or receiving the thirteenth identification information.

In addition, by transmitting and/or receiving the first identification information, and/or the third identification information, and/or the eighth identification information, and/or the fourteenth identification information, each device may indicate that the UE_A 10 supports establishment of the second type of the multiaccess session, or may indicate that the UE_A 10 supports communication using Access Traffic Splitting.

Furthermore, by transmitting and/or receiving the first identification information, and/or the third identification information, and/or the eighth identification information, and/or the fourteenth identification information, each device may indicate that the UE_A 10 supports Access Traffic Splitting, or may indicate that the UE_A 10 supports establishment of a PDU session supporting Access Traffic Splitting.

Furthermore, by transmitting and/or receiving the fourteenth identification information, each device may indicate whether a function of Access Traffic Splitting can be performed to each flow, or may indicate a routing rule corresponding to the second type of the multiaccess session configurable by the UE_A 10.

Note that UE_A 10 may include and transmit these pieces of identification information in a different control message from the attach request. For example, the UE_A 10 may include and transmit these pieces of identification information in ESM information response message (S2102) which is a response message to a EPS Session Management (ESM) information request message.

The MME_A 40 receives the attach request message and/or the ESM information response message and determines the first condition. In a case that the first condition is true, the MME_A 40 starts a procedure (A) of this procedure; in a case that the first condition is false, the MME_A 40 starts a procedure (B) of this procedure.

Steps of the procedure (A) of this procedure will be described below. The MME_A 40 determines the fourth condition and starts the procedure (A) during the present procedure. In a case that the fourth condition is true, the MME_A 40 starts the procedure (C) during a UE-initiated PDU session establishment procedure and omits the procedure (C) in a case that the fourth condition is false (S2104). Furthermore, the MME_A 40 transmits an attach accept message to the eNB_A 45, based on reception of the attach request message and/or reception of a session generation response message (S2106). Note that, in a case of receiving the create session reject message, the MME_A 40 may start the procedure (B) in this procedure instead of continuing the procedure (A) in this procedure.

The eNB_A 45 receives the attach accept message, and transmits an RRC connection reconfiguration request message and/or the attach accept message to the UE_A 10 (S2108). Note that the attach accept message may be included and transmitted and/or received in the RRC connection reconfiguration request message. Furthermore, in a case that the fourth condition is true, the MME_A 40 may include and transmit the above-mentioned PDU session establishment accept message in the attach accept message, or may indicate that the PDU session establishment procedure is accepted by including the PDU session establishment accept message.

Here, the MME_A 40 may include, in the attach accept message, at least one or more identification information of the fourth identification information, the fifth identification information, the sixth identification information, the ninth identification information, the tenth identification information, the fifteenth identification information, and the sixteenth identification information, may include an APN and/ or an IP address, may indicate that the request of the UE_A 10 is accepted by including these pieces of identification information, or may indicate to allow for establishment of the multiaccess session.

Furthermore, by transmitting and/or receiving the fourth identification information, and/or the fifth identification information, and/or the ninth identification information, and/or the fifteenth identification information, each device may indicate that the network supports establishment of the first type of the multiaccess session, may indicate that the network supports communication by using Access Traffic Switching, or may indicate that the network supports communication by using NBIFOM.

In addition, by transmitting and/or receiving the fourth identification information, and/or the fifth identification information, and/or the ninth identification information, and/or the fifteenth identification information, each device may indicate that the network supports Access Traffic Switching, or may indicate that the network supports establishment of a PDU session supporting Access Traffic Switching.

Furthermore, by transmitting and/or receiving the fifteenth identification information, each device may indicate an access capable of communication using the first type of the multiaccess session, or may indicate a routing rule corresponding to the first type of the multiaccess session configurable by the network.

In addition, by transmitting and/or receiving the fourth identification information, and/or the sixth identification information, and/or the tenth identification information, and/ or the sixteenth identification information, each device may indicate that the network supports establishment of the second type of the multiaccess session, or may indicate that the network supports communication using Access Traffic Splitting.

In addition, by transmitting and/or receiving the fourth identification information, and/or the sixth identification information, and/or the tenth identification information, and/ or the sixteenth identification information, each device may indicate that the network supports Access Traffic Splitting, or may indicate that the network supports establishment of a PDU session supporting Access Traffic Splitting.

Furthermore, by transmitting and/or receiving the sixteenth identification information, each device may indicate whether a function of Access Traffic Splitting can be performed to each flow, or may indicate a routing rule corresponding to the second type of the multiaccess session configurable by the network.

Here, the first to third condition determination may be the same as the first to third condition determination during the UE-initiated PDU session establishment procedure. In addition, the fourth condition determination is intended to determine whether the MME_A 40 performs the PDU session establishment procedure. The fourth condition being true may be a case that the PDU session establishment request message is received, or may be a case that the UE-initiated PDU session establishment procedure is also performed during the present procedure. Furthermore, the fourth condition being false may be a case that the PDU session establishment request message is not received, may be a case that the UE-initiated PDU session establishment procedure is not also performed during the present procedure, or may be a case that the fourth condition is not determined to be true.

In a case that the RRC connection reconfiguration request message is received, the UE_A 10 transmits the RRC connection reconfiguration request message to the eNB_A 45 (S2110). The eNB_A 45 receives the RRC connection reconfiguration request message, and transmits a bearer configuration message to the MME_A 40 (S2112). Moreover, the MME_A 40 receives the bearer configuration message.

In a case that the attach accept message is received, the UE_A 10 transmits an attach complete message to the MME_A 40 via the eNB_A 45 (S2114) (S2116). Furthermore, the MME_A 40 receives the attach complete message. Furthermore, in a case that the fourth condition is true, the MME_A 40 starts the procedure (D) during the UE-initiated PDU session establishment procedure (S2118). Each device completes the procedure (A) during the present procedure, based on transmission and/or reception of the attach complete message and/or completion of the procedure (D) in the UE-initiated PDU session establishment procedure.

Note that the UE_A 10 may include and transmit the above-mentioned PDU session establishment complete message in the attach complete message in a case of receiving the PDU session establishment accept message, or may indicate that the PDU session establishment procedure is completed by including the PDU session establishment complete message.

Next, steps of the procedure (B) of this procedure will be described. The MME_A 40 transmits an attach reject message to the UE_A 10 via the eNB_A 45, and starts the procedure (B) during the present procedure (S2120). Furthermore, the UE_A 10 receives the attach reject message and recognizes that the request of the UE_A 10 is rejected. Each device completes the procedure (B) during the present procedure, based on the transmission and/or reception of the attach reject message. Note that in a case that the fourth condition is true, the MME_A 40 may include and transmit the above-mentioned PDU session establishment reject message in the attach reject message, or may indicate that the PDU session establishment procedure is rejected by including the PDU session establishment reject message.

In addition, the MME_A 40 may include, in the attach reject message, one or more identification information of the eleventh identification information, the twelfth identification information, the seventeenth identification information, and the eighteenth identification information, or by including these pieces of identification information, may indicate that the request of the UE_A 10 is rejected, may indicate that the network of the connection destination does not support establishment of the multiaccess session, or may indicate that establishment of the multiaccess session is not allowed.

Furthermore, by transmitting and/or receiving the eleventh identification information, and/or the seventeenth identification information, each device may indicate that the network does not support establishment of the first type of the multiaccess session, may indicate that the network does not support communication using Access Traffic Switching, may indicate that the network does not support communication using NBIFOM, or may notify of the reason why each request is rejected.

In addition, by transmitting and/or receiving the twelfth identification information and/or the eighteenth identification information, each device may indicate that the network does not support establishment of the second type of the multiaccess session, may indicate that the network does not support communication using Access Traffic Splitting, or may notify of the reason why each request is rejected.

Each apparatus completes this procedure, based on completion of the procedure (A) or (B) of this procedure. Note that each device may change its state to a state of the UE_A 10 being connected with the network and/or a registration state, based on completion of the procedure (A) during the present procedure, or may recognize that the present procedure is rejected, based on completion of the procedure (B) in the present procedure. In addition, transition to each state of each device may be performed based on completion of the present procedure, or may be performed based on establishment of a PDU session.

Furthermore, each device may determine that establishment of the multiaccess session is possible based on completion of the present procedure. In other words, each device may determine that establishment of the multiaccess session is possible in a case of transmitting and/or receiving one or more identification information of the fourth identification information, the fifth identification information, the sixth identification information, the ninth identification information, the tenth identification information, the fifteenth identification information, and the sixteenth identification information, and may determine that the establishment is not possible in a case of transmitting and/or receiving one or more identification information of the eleventh identification information, the twelfth identification information, the seventeenth identification information, and the eighteenth identification information. Furthermore, each device may determine that communication using a communication path via the first access and a communication path via the second access can be performed by determining that establishment of the multiaccess session is possible.

Furthermore, in a case of transmitting and/or receiving the fourth identification information, and/or the fifth identification information, and/or the ninth identification information, and/or the fifteenth identification information, each device may determine that establishment of the first type of the multiaccess session is possible, or may determine that establishment of the PDU session supporting Access Traffic Switching is possible. Furthermore, in a case of transmitting and/or receiving the fourth identification information, and/or the fifth identification information, and/or the ninth identification information, and/or the fifteenth identification information, each device may recognize that a PDU session to which Access Traffic Switching and/or NBIFOM is applicable can be established.

In addition, in a case of transmitting and/or receiving the fourth identification information, and/or the sixth identification information, and/or the tenth identification information, and/or the sixteenth identification information, each device may determine that establishment of the second type of the multiaccess session is possible, or may determine that establishment of the PDU session supporting Access Traffic Splitting is possible. Furthermore, in a case of transmitting and/or receiving the fourth identification information, and/or the sixth identification information, and/or the tenth identification information, and/or the sixteenth identification information, each device may recognize that a PDU session to which Access Traffic Splitting is applicable can be established.

Furthermore, in a case of transmitting and/or receiving the fifteenth identification information, each device may recognize and store an access and/or a routing rule available in the first type of the multiaccess session. Furthermore, in a case of transmitting and/or receiving the sixteenth identification information, each device may recognize and store information for indicating whether a function of Access Traffic Splitting is performable to each flow of user data transmitted and/or received, and/or a routing rule available in the second type of the multiaccess session.

Furthermore, in a case of transmitting and/or receiving one or more identification information of the eleventh identification information, the twelfth identification information, the seventeenth identification information, and the eighteenth identification information, each device may recognize the reason why the request of the UE_A 10 is rejected. Moreover, each apparatus may perform this procedure again based on the cause of rejection of the request from the UE_A 10.

In addition, the above-mentioned first to fourth condition determination may be performed based on identification information, and/or subscriber information, and/or operator policy included in the attach request message. In addition, the condition for determining if the first to the fourth conditions are true or false does not need to be limited to the conditions mentioned above.

For example, in addition, the first condition determination and/or the third condition determination may be similar to the above-mentioned UE-initiated PDU session establishment procedure example.

1.3.3.1. Example of Attach Procedure Via Second Access

Next, an implementation example of an attach procedure via the second access will be described. Note that this procedure may be similar to the above-described example of the UE-initiated PDU session establishment procedure via the second access. Therefore, description of the steps is omitted.

1.3.4. Example of Routing Rule Update Procedure

Next, an example of a routing rule update procedure will be described. This procedure is a procedure for updating a routing rule for a multi-access session. Each apparatus can perform this procedure at an arbitrary timing as long as the UE_A 10 is connected to the core network_A 90 via multiple access networks and/or has established a multi-access session. In other words, each apparatus can start this procedure in the first state. Note that each apparatus may enter a state of allowing Access Traffic Switching in a multi-access session or a state of allowing Access Traffic Splitting, upon completion of this procedure.

This procedure may be performed under the initiative of the UE_A 10 or performed under the initiative of a network. For example, the network may perform this procedure under the initiative of the network, based on detection of a change in subscriber information and/or operator policy, or perform this procedure under the initiative of the network, based on reception of a control message from the UE_A 10. The UE_A 10 may perform this procedure under the initiative of the UE_A 10 upon detection of a change in configuration and/or state of the UE_A 10 itself.

This procedure may be a procedure via the first access or a procedure via the second access. For example, in a case of changing a routing rule and/or various configurations associated with the first access, each apparatus may perform this procedure via the first access; in a case of changing a routing rule and/or various configuration associated with the second access, each apparatus may perform this procedure via the second access.

1.3.4.1. Example of Network-Initiated Routing Rule Update Procedure

Figure 19:
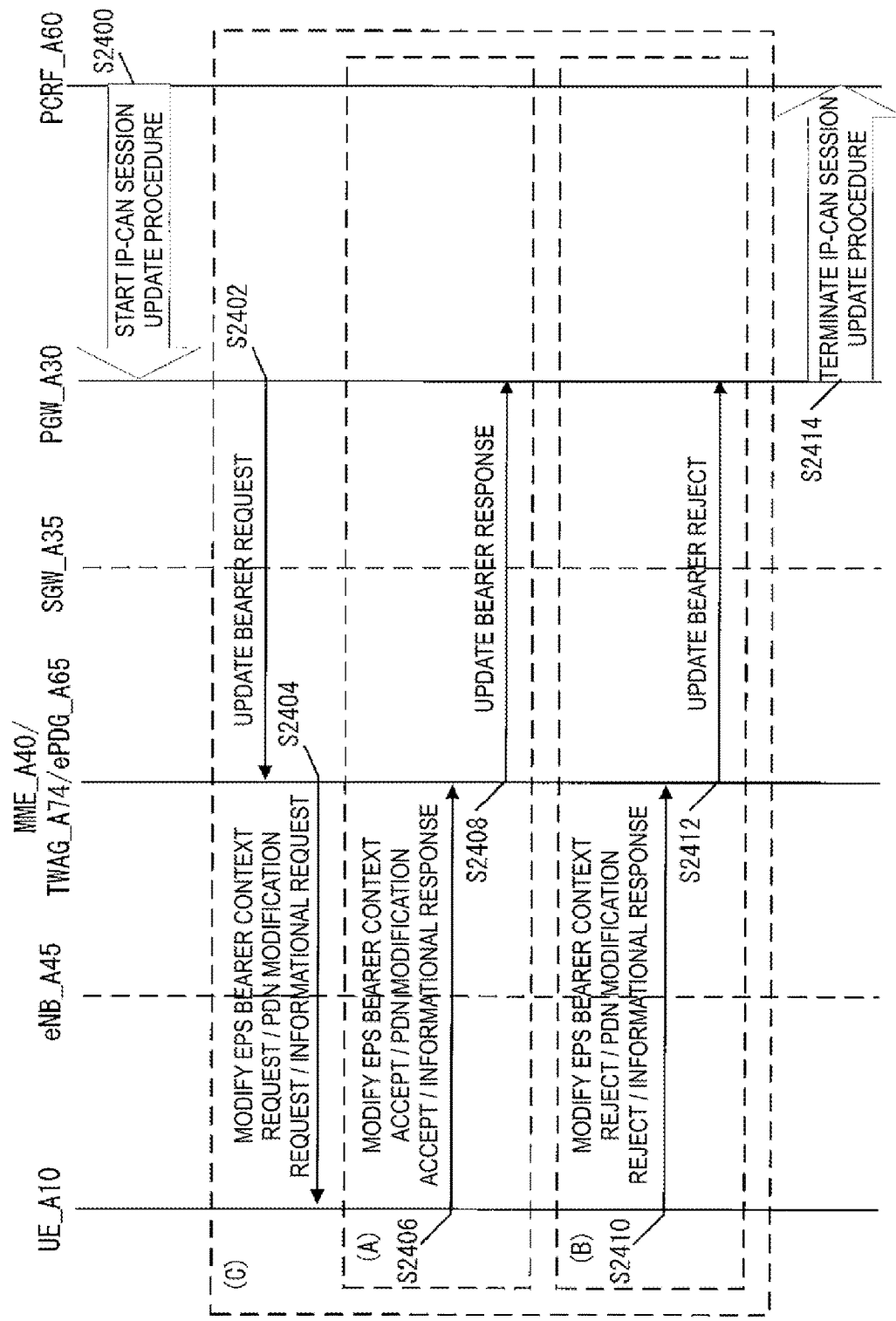
FIG. 19 is a diagram illustrating a network-initiated routing rule update procedure.

With reference to FIG. 19, a description will be given of an example of a process for performing the routing rule update procedure under the initiative of a network. Steps of this procedure will be described below. First, the PCRF_A 60 starts the IP-CAN session update procedure with the PGW_A 30 (S2400). More specifically, the PCRF_A 60 transmits a request message in the IP-CAN session update procedure to the PGW_A 30. Moreover, the PGW_A 30 receives the request message in the IP-CAN session update procedure.

Here, the PCRF_A 60 may include, in the request message in the IP-CAN session establishment procedure, at least the nineteenth identification information and/or the twentieth identification information, or may include these pieces of identification information in the message to request to update a routing rule.

Next, the PGW_A 30 starts the procedure (C) of this procedure. Steps of the procedure (C) of this procedure will be described below. The PGW_A 30 transmits an update bearer request message to the SGW_A 35 and/or the TWAG_A 74 and/or the ePDG_A 65 and starts the procedure (C) of this procedure (S2402). Moreover, the SGW_A 35 and/or the TWAG_A 74 and/or the ePDG_A 65 receives the update bearer request message. Note that the PGW_A 30 may perform selection of the SGW_A 35 and/or the TWAG_A 74 and/or the ePDG_A 65, based on a received bearer resource command message to be described later, or perform the selection, based on a context for a multi-access session held by the PGW_A 30.

Here, the PGW_A 30 and/or the SGW_A 35 may include, in the update bearer request message, at least the nineteenth identification information and/or the twentieth identification information, or may include these pieces of identification information in the message to request to update a routing rule.

Next, in a case of receiving the update bearer request message, the SGW_A 35 transmits the update bearer request message to the MME_A 40 (S2402). Moreover, the MME_A 40 receives the update bearer request message and transmits a modify EPS bearer context request message to the UE_A 10 (S2404). In a case of receiving the update bearer request message, the TWAG_A 74 transmits the PDN modification request message to the UE_A 10 (S2404). In a case that the ePDG_A 65 has received the update bearer request message, the UE_A 10 transmits an INFORMATIONAL request message to the UE_A 10 (S2404). Note that the modify EPS bearer context request message and/or the PDN modification request message and/or the INFORMATIONAL request message may be a routing rule update request message.

Here, the MME_A 40 may include, in the modify EPS bearer context request message, at least the nineteenth identification information and/or the twentieth identification information, or include these pieces of identification information in the message request to update a routing rule.

The TWAG_A 74 may include, in the PDN modification request message, at least the nineteenth identification information and/or the twentieth identification information, or include these pieces of identification information in the message to request to update a routing rule.

The ePDG_A 65 may include, in the INFORMATIONAL request message, at least the nineteenth identification information and/or the twentieth identification information, or include these pieces of identification information in the message to request to update a routing rule.

Moreover, each apparatus may transmit and/or receive the nineteenth identification information to request to perform the Access Traffic Switching function and/or the NBIFOM function for a multi-access session.

Each apparatus may transmit and/or receive the nineteenth identification information to request to configure or modify the access for performing communication using a first type multi-access session or indicate the type of access after the configuration or modification. Note that the access to be configured or modified may be an access to be used for communication in one or multiple flows that can be performed using a first type multi-access session.

Each apparatus may transmit and/or receive the nineteenth identification information to request to configure or modify the routing rule associated with a first type multi-access session or indicate a routing rule to be associated with a first type multi-access session.

Moreover, each apparatus may transmit and/or receive the twentieth identification information to request to perform the Access Traffic Splitting function for communication in one or multiple flows that can be performed using a second type multi-access session or request to stop the Access Traffic Splitting function. Moreover, each apparatus may transmit and/or receive the twentieth identification information to indicate the communication of a flow to perform the Access Traffic Switching function.

Each apparatus may transmit and/or receive the twentieth identification information to request to configure or modify the routing rule associated with a second type multi-access session or indicate a routing rule to be associated with a second type multi-access session.

Next, the UE_A 10 receives the modify EPS bearer context request message and/or the PDN modification request message and/or INFORMATIONAL request message and evaluates a fifth condition. In a case that the fifth condition is true, the UE_A 10 starts the procedure (A) of this procedure; in a case that the fifth condition is false, the UE_A 10 starts the procedure (B) of this procedure.

Here, the fifth condition evaluation is for evaluating whether or not the UE_A 10 is to accept a request from the network. The fifth condition being true may be a case of accepting the request from the network, that is, a case that the request from the network is allowed. Moreover, the fifth condition being false may be a case of rejecting the request from the network, that is, a case of not judging that the fifth condition is true.

More specifically, the fifth condition evaluation is for evaluating whether or not the UE_A 10 is to accept a request in the routing rule update procedure. The fifth condition being true may be a case that the UE_A 10 allows update of a routing rule; the fifth condition being false may be a case that the UE_A 10 does not allow update of a routing rule.

For example, in a case that the network requests update of a routing rule and the UE_A 10 allows the request, the fifth condition may be true. In a case that the network requests update of a routing rule and the UE_A 10 does not allow the request, the fifth condition may be false. Moreover, in a case that the UE_A 10 does not support update of a routing rule, the fifth condition may be false.

More specifically, the fifth condition may be true in a case that a request of update of a first type and/or second type routing rule from the network is accepted, and may be false in a case that the request is not accepted.

Moreover, the fifth condition may be true in a case that the type of access and/or a routing rule requested from the network to be used in a multi-access session is accepted, and may be false in a case that the type of access and/or the routing rule is not accepted.

Moreover, the fifth condition may be true in a case that the request from the network to enable or not the Access Traffic Switching function and/or the NBIFOM function and/or the Access Traffic Splitting function is accepted, and may be false in a case that the request is not accepted.

Here, steps of the procedure (A) of this procedure will be described below. The UE_A 10 transmits a response message for acceptance to the transmission source of the control message and starts the procedure (A) of this procedure (S2406). Specifically, in a case of receiving a modify EPS bearer context request message, the UE_A 10 transmits a modify EPS bearer context accept message to the MME_A 40 (S2406). Moreover, the MME_A 40 receives the modify EPS bearer context accept message. In a case of receiving the PDN modification request message, the UE_A 10 transmits the PDN modification accept message to the TWAG_A 74 (S2406). Moreover, the TWAG_A 74 receives the PDN modification accept message. In a case of receiving an INFORMATIONAL request message, the UE_A 10 transmits an INFORMATIONAL response message to the ePDG_A 65 (S2406). Moreover, the ePDG_A 65 receives the INFORMATIONAL response message. Note that the modify EPS bearer context accept message and/or the PDN modification accept message and/or the INFORMATIONAL response message may be a routing rule update request message.

Here, the UE_A 10 may include, in the modify EPS bearer context accept message and/or the PDN modification accept message and/or INFORMATIONAL response message, the twenty-first identification information and/or the twenty-second identification information, or include these pieces of identification information in the message(s) to indicate that update of the routing rule is allowed.

Moreover, each apparatus may transmit and/or receive the twenty-first identification information to indicate that the Access Traffic Switching function and/or the NBIFOM function is to be performed for a multi-access session.

Each apparatus may transmit and/or receive the twenty-first identification information to indicate that configuration or modification of the access for performing communication using a first type multi-access session is allowed or indicate the type of access after the configuration or modification. Note that the access to be configured or modified may be an access to be used for communication in one or multiple flows that can be performed using a first type multi-access session.

Each apparatus may transmit and/or receive the twenty-first identification information to indicate that configuration or modification of the routing rule associated with a first type multi-access session is allowed or indicate the routing rule associated with a first type multi-access session.

Moreover, each apparatus may transmit and/or receive the twenty-second identification information to indicate that execution of the Access Traffic Splitting function for communication in one or multiple flows that can be performed using a second type multi-access session is allowed or indicate that stopping of the Access Traffic Splitting function is allowed. Moreover, each apparatus may transmit and/or receive the twenty-second identification information to indicate the communication of a flow for which the Access Traffic Splitting function is to be performed.

Each apparatus may transmit and/or receive the twenty-second identification information to indicate that configuration or modification of the routing rule associated with a second type multi-access session is allowed or indicate the routing rule associated with a second type multi-access session.

Next, in a case of receiving a modify EPS bearer context accept message, the MME_A 40 transmits an Update Bearer Response message to the SGW_A 35 (S2408). Moreover, the SGW_A 35 receives the Update Bearer Response message and transmits the Update Bearer Response message to the PGW_A 30 (S2408). In a case of receiving a PDN modification accept message, the TWAG_A 74 transmits an Update Bearer Response message to the PGW_A 30 (S2408). In a case of receiving an INFORMATIONAL response message, the ePDG_A 65 transmits an Update Bearer Response message to the PGW_A 30 (S2408). Moreover, the PGW_A 30 receives the Update Bearer Response message. Each apparatus completes the procedure (A) of this procedure, based on transmission and/or reception of the Update Bearer Response message.

Here, the MME_A 40 and/or the SGW_A 35 and/or the TWAG_A 74 and/or the ePDG_A 65 may include, in the Update Bearer Response message, at least the twenty-first identification information and/or the twenty-second identification information, or include these pieces of identification information in the message to indicate that update of a routing rule is allowed.

Next, steps of the procedure (B) of this procedure will be described below. The UE_A 10 transmits a response message for rejection to the transmission source of the control message and starts the procedure (B) of this procedure (S2410). Specifically, in a case of receiving a modify EPS bearer context request message, the UE_A 10 transmits a modify EPS bearer context reject message to the MME_A 40 (S2410). Moreover, the MME_A 40 receives the modify EPS bearer context reject message. In a case of receiving the PDN modification request message, the UE_A 10 transmits a PDN modification reject message to the TWAG_A 74 (S2410). Moreover, the TWAG_A 74 receives the PDN modification reject message. In a case of receiving an INFORMATIONAL request message, the UE_A 10 transmits an INFORMATIONAL response message to the ePDG_A 65 (S2410). Moreover, the ePDG_A 65 receives the INFORMATIONAL response message. Note that the modify EPS bearer context reject message and/or the PDN modification reject message and/or the INFORMATIONAL request message may be a routing rule update response message.

Here, the UE_A 10 may include, in the modify EPS bearer context reject message and/or the PDN modification reject message and/or the INFORMATIONAL response message, the twenty-third identification information and/or the twenty-fourth identification information in the modify EPS bearer context reject message, or include these pieces of identification information in the message(s) to indicate that update of the routing rule is allowed.

Moreover, each apparatus may transmit and/or receive the twenty-third identification information to indicate that the Access Traffic Switching function and/or the NBIFOM function is not allowed to be performed for a multi-access session.

Moreover, each apparatus may transmit and/or receive the twenty-third identification information to indicate that a request to configure or modify an access for performing communication using a first type multi-access session is rejected or indicate that a request to configure or modify an access to be used for communication that can be performed using a first type multi-access session in one or multiple flows is rejected.

Each apparatus may transmit and/or receive the twenty-third identification information to indicate that a request to configure or modify the routing rule associated with a first type multi-access session is rejected or make notification about cause of rejection of each request.

Moreover, each apparatus may transmit and/or receive the twenty-third identification information to indicate that configuration or modification of an access for performing communication using a first type multi-access session is not allowed or indicate that configuration or modification of a routing rule corresponding to a first type multi-access session is not allowed.

Moreover, each apparatus may transmit and/or receive the twenty-fourth identification information to indicate that a request to perform the Access Traffic Splitting function for communication in one or multiple flows that can be performed using a second type multi-access session is rejected or indicate that a request to stop the Access Traffic Splitting function is rejected. Moreover, each apparatus may transmit and/or receive the twenty-fourth identification information to indicate which flow of the communication is not to perform the Access Traffic Splitting function.

Each apparatus may transmit and/or receive the twenty-fourth identification information to indicate that a request to configure or modify the routing rule associated with a second type multi-access session is rejected or make notification about cause of rejection of each request.

Moreover, each apparatus may transmit and/or receive the twenty-fourth identification information to indicate that execution of Access Traffic Splitting function is not allowed for each flow or indicate that configuration or modification of a routing rule corresponding to a second type multi-access session is not allowed.

Next, in a case of receiving a modify EPS bearer context reject message, the MME_A 40 transmits an update bearer reject message to the SGW_A 35 (S2412). Moreover, the SGW_A 35 receives the update bearer reject message and transmits the update bearer reject message to the PGW_A 30 (S2412). In a case of receiving a PDN modification reject message, the TWAG_A 74 transmits an update bearer reject message to the PGW_A 30 (S2412). In a case of receiving an INFORMATIONAL response message, the ePDG_A 65 transmits an update bearer reject message to the PGW_A 30 (S2412). Moreover, the PGW_A 30 receives the update bearer reject message. Each apparatus completes the procedure (B) of this procedure, based on transmission and/or reception of the update bearer reject message. Note that the update bearer reject message may be an Update Bearer Response message including a reject cause.

Here, the MME_A 40 and/or the SGW_A 35 and/or the TWAG_A 74 and/or the ePDG_A 65 may include, in the update bearer reject message, at least the twenty-third identification information and/or the twenty-fourth identification information, or include these pieces of identification information in the message to indicate that update of a routing rule is not allowed.

Each apparatus completes the procedure (C) of this procedure, based on completion of the procedure (A) and/or (B) of this procedure. The PGW_A 30 terminates the IP-CAN session update procedure, based on completion of the procedure (C) of this procedure (S2414). More specifically, the PGW_A 30 transmits a response message in the IP-CAN session establishment procedure to the PCRF_A 60 and terminates the IP-CAN session update procedure. Moreover, the PCRF_A 60 receives the response message in the IP-CAN session update procedure.

Here, the PGW_A 30 may include, in the response message of the IP-CAN session establishment procedure, the twenty-first identification information and/or the twenty-second identification information or include these pieces of identification information in the message to indicate that update of a routing rule is allowed.

The PGW_A 30 may include, in the response message of the IP-CAN session establishment procedure, the twenty-third identification information and/or the twenty-fourth identification information or include these pieces of identification information in the message to indicate that update of a routing rule is not allowed.

Note that, in a case that an established multi-access session and/or the PGW_A 30 does not use the PCRF_A 60, the IP-CAN session update procedure (S2400) (S2414) may be omitted. In this case, this procedure may be a PGW_A 30 initiated procedure instead of being a PCRF_A 60 initiated procedure, and the role of the PCRF_A 60 may be performed by the PGW_A 30.

Each apparatus completes this procedure, based on completion of the procedure (C) of this procedure and/or completion of the IP-CAN session update procedure. Note that each apparatus may recognize that this procedure is accepted, based on completion of the procedure (A) of this procedure or may recognize that this procedure is rejected, based on completion of the procedure (B) of this procedure.

Each apparatus may update or may not necessarily update the routing rule corresponding to a multi-access session, based on completion of this procedure. In other words, in a case of receiving the twenty-first identification information and/or the twenty-second identification information, each apparatus may update the routing rule corresponding to the multi-access session. In a case of receiving the twenty-third identification information and/or the twenty-fourth identification information, each apparatus may update the routing rule corresponding to the multi-access session.

Moreover, in a case of transmitting and/or receiving the twenty-first identification information, each apparatus may perform the Access Traffic Switching function and/or the NBIFOM function for the multi-access session. In a case of transmitting and/or receiving the twenty-first identification information, each apparatus may recognize that the access for performing communication using a first type multi-access session is configured or modified, or recognize the access after the configuration or modification.

In a case of transmitting and/or receiving the twenty-first identification information, each apparatus may recognize that the routing rule associated with a first type multi-access session is configured or modified, or recognize or store the routing rule associated with a first type multi-access session.

Moreover, in a case of transmitting and/or receiving the twenty-second identification information, each apparatus may perform or stop the Access Traffic Splitting function for communication of one or multiple flows that can be performed by using a second type multi-access session. Moreover, in a case of transmitting and/or receiving the twenty-second identification information, each apparatus may recognize the communication in a flow to which the Access Traffic Splitting function is applicable.

In a case of transmitting and/or receiving the twenty-second identification information, each apparatus may recognize that the routing rule associated with a second type multi-access session is configured or modified, or recognize or store the routing rule associated with a second type multi-access session.

Moreover, in a case of transmitting and/or receiving the twenty-third identification information, each apparatus may determine that it is not possible to perform the Access Traffic Switching function and/or the NBIFOM function for the multi-access session, or recognize that the access for performing communication using a first type multi-access session is not configured or modified.

In a case of transmitting and/or receiving the twenty-third identification information, each apparatus may recognize that the routing rule associated with a first type multi-access session is not configured or modified.

Moreover, in a case of transmitting and/or receiving the twenty-fourth identification information, each apparatus may determine that the Access Traffic Splitting function cannot be executed or stopped for communication in one or multiple flows that can be performed using a second type multi-access session or recognize the communication of a flow to which the Access Traffic Splitting function is not applicable.

In a case of transmitting and/or receiving the twenty-fourth identification information, each apparatus may recognize that the routing rule associated with a second type multi-access session is not configured or modified.

1.3.4.2. Example of UE-Initiated Routing Rule Update Procedure

Figure 20:
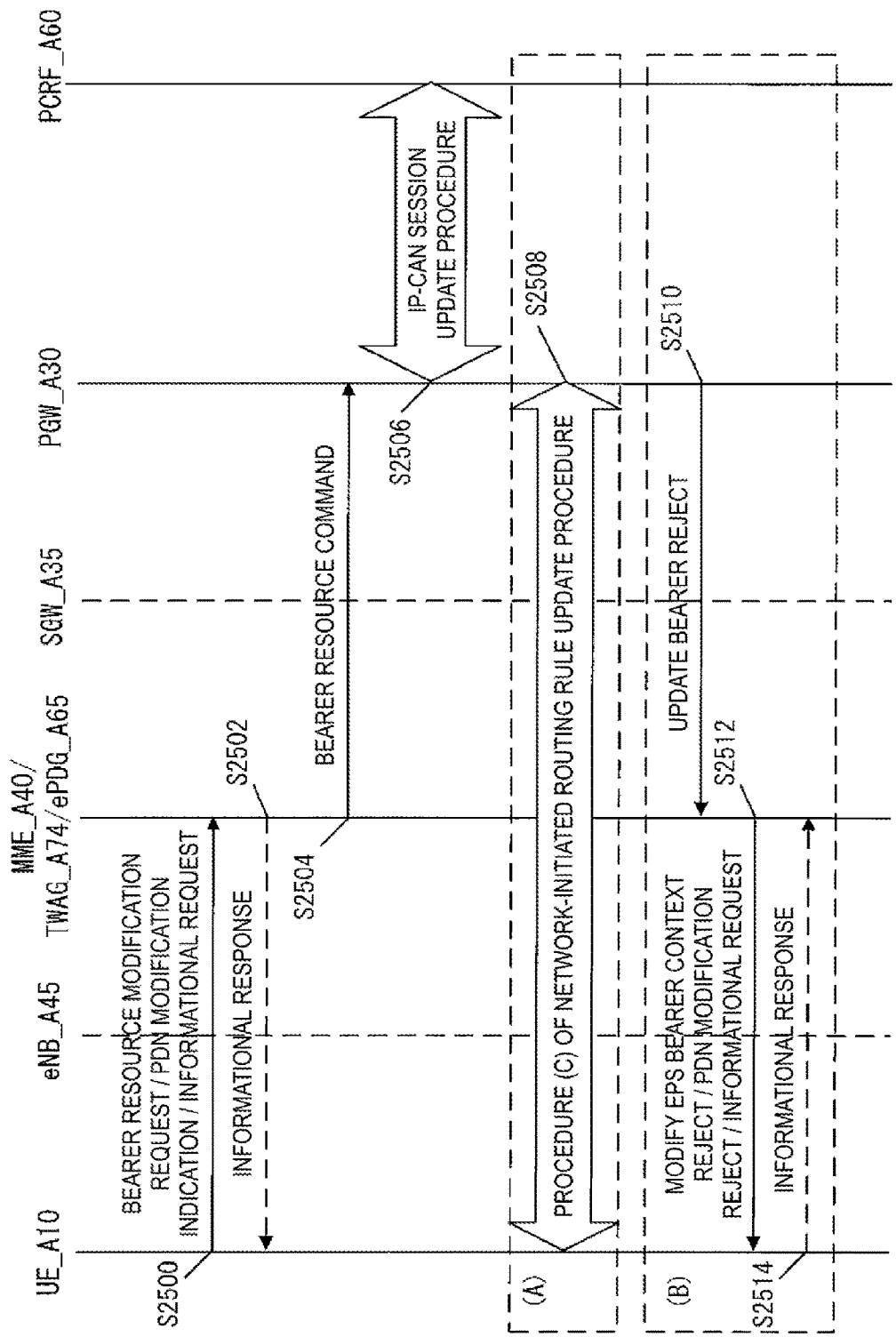
FIG. 20 is a diagram illustrating a UE-initiated routing rule update procedure.

With reference to FIG. 20, a description will be given of an example of a process for performing the routing rule update procedure under the initiative of the UE_A 10. Steps of this procedure will be described below. First, the UE_A 10 transmits a control message to an apparatus in an access network that has established a multi-access session and/or an apparatus in the core network_A 90 and starts the UE-initiated routing rule update procedure (S2500).

Specifically, in a case that a multi-access session is established via the first access, the UE_A 10 may transmit a bearer resource modification request message to the MME_A 40 (S2500). Moreover, the MME_A 40 may receive the bearer resource modification request message. Specifically, in a case that a multi-access session is established via the second access and/or the WLAN ANa 70, the UE_A 10 may transmit a PDN modification indication message to the TWAG_A 74. Moreover, the TWAG_A 74 may receive the PDN modification indication message. In a case that a multi-access session is established via the second access and/or the WLAN ANb 65, the UE_A 10 may transmit an INFORMATIONAL request message to the ePDG_A 65. Moreover, the ePDG_A 65 may receive the INFORMATIONAL request message and transmit an INFORMATIONAL response message to the UE_A 10. Note that the bearer resource modification request message and/or the PDN modification indication message and/or the INFORMATIONAL request message may be a routing rule modification request message.

Here, the UE_A 10 may include, in the bearer resource modification request message and/or the PDN modification indication message and/or the INFORMATIONAL request message, the thirteenth identification information and/or the fourteenth identification information, or include these pieces of identification information in the message(s) to request to update a routing rule.

Moreover, each apparatus may transmit and/or receive the thirteenth identification information to request to perform the Access Traffic Switching function and/or the NBIFOM function for a multi-access session.

Each apparatus may transmit and/or receive the thirteenth identification information to request to configure or modify the access for performing communication using a first type multi-access session or indicate the type of access after the configuration or modification. Note that the access to be configured or modified may be an access to be used for communication in one or multiple flows that can be performed using a first type multi-access session.

Each apparatus may transmit and/or receive the thirteenth identification information to request to configure or modify the routing rule associated with a first type multi-access session or indicate a routing rule to be associated with a first type multi-access session.

Moreover, each apparatus may transmit and/or receive the fourteenth identification information to request to perform the Access Traffic Splitting function for communication in one or multiple flows that can be performed using a second type multi-access session or request to stop the Access Traffic Splitting function. Moreover, each apparatus may transmit and/or receive the fourteenth identification information to indicate a communication of a flow that is to perform the Access Traffic Splitting function.

Each apparatus may transmit and/or receive the fourteenth identification information to request to configure or modify the routing rule associated with a second type multi-access session or indicate a routing rule to be associated with a second type multi-access session.

Next, in a case of receiving a bearer resource modification request message, the MME_A 40 transmits a bearer resource command message to the SGW_A 35 (S2504). Moreover, in a case of receiving a bearer resource command message, the SGW_A 35 transmits the bearer resource command message to the PGW_A 30 (S2504). In a case of receiving a PDN modification indication message, the TWAG_A 74 transmits a bearer resource command message to the PGW_A 30 (S2504). In a case of receiving an INFORMATIONAL request message, the ePDG_A 65 transmits a bearer resource command message to the PGW_A 30 (S2504).

Here, the MME_A 40 and/or the SGW_A 35 and/or the TWAG_A 74 and/or the ePDG_A 65 may include the thirteenth identification information and/or the fourteenth identification information in the bearer resource command message, or include these pieces of identification information in the message to request to update a routing rule.

The PGW_A 30 receives the bearer resource command message and performs the IP-CAN session update procedure with the PCRF_A 60 (S2506). Specifically, the PGW_A 30 transmits a request message in the IP-CAN session update procedure to the PCRF_A 60. Moreover, the PCRF_A 60 receives the request message in the IP-CAN session update procedure, evaluates the sixth condition, and transmits a response message in the IP-CAN session update procedure to the PGW_A 30. Moreover, the PGW_A 30 receives the response message in the IP-CAN session update procedure and realizes a result of the sixth condition evaluation.

Here, the sixth condition evaluation is for evaluating whether or not a network is to accept a request from the UE_A 10. The sixth condition being true may be a case of accepting the request from the UE_A 10, that is, a case that the request from the UE_A 10 is allowed. Moreover, the sixth condition being false may be a case of rejecting the request from the UE_A 10, that is, a case of not judging that the sixth condition is true.

For example, in a case that the UE_A 10 requests update of a routing rule and the network allows the request, the sixth condition may be true. In a case that the UE_A 10 requests update of a routing rule and the network does not allow the request, the sixth condition may be false. Moreover, in a case that the network that is the connection destination of the UE_A 10 and/or an apparatus in the network does not support update of a routing rule, the sixth condition may be false.

More specifically, the sixth condition may be true in a case that a request of update of a first type and/or second type routing rule from the UE_A 10 is accepted, and may be false in a case that the request is not accepted.

Moreover, the sixth condition may be true in a case that the type of access and/or a routing rule requested from the UE_A 10 to be used in a multi-access session is accepted, and be false in a case that the type of access and/or the routing rule is not accepted.

Moreover, the sixth condition may be true in a case that the request from the UE_A 10 to enable or not to enable the Access Traffic Switching function and/or the NBIFOM function and/or the Access Traffic Splitting function is accepted, and be false in a case that the request is not accepted.

Here, the PGW_A 30 may include the thirteenth identification information and/or the fourteenth identification information in the request message in the IP-CAN session update procedure, or may include these pieces of identification information in the message to request to update a routing rule.

The PCRF_A 60 may include, in a response message in the IP-CAN session update procedure, at least the result of the sixth information evaluation or include this result in the message to notify the PGW_A 30 of the result of the sixth condition evaluation.

Moreover, the PCRF_A 60 may include, in the response message in the IP-CAN session update procedure, the fifteenth identification information and/or the sixteenth identification information, or include these pieces of identification information in the message to indicate that update of a routing rule is allowed.

The PCRF_A 60 may include, in the response message in the IP-CAN session update procedure, the seventeenth identification information and/or the eighteenth identification information, or include these pieces of identification information in the message to indicate update of a routing rule is not allowed.

Note that, in a case that an established multi-access session and/or the PGW_A 30 does not use the PCRF_A 60, the IP-CAN session update procedure may be omitted. In this case, the sixth condition evaluation may be performed by the PGW_A 30 instead of the PCRF_A 60.

Next, in a case that the sixth condition is true, the PGW_A 30 starts the procedure (A) of this procedure; in a case that the sixth condition is false, the PGW_A 30 starts the procedure (B) of this procedure. Here, the procedure (A) of this procedure may be similar to the procedure (C) of the network-initiated routing rule update procedure.

Note that, in the procedure (A) of this procedure, the PGW_A 30 and/or the SGW_A 35 may include, in the modify bearer request message, the fifteenth identification information and/or the sixteenth identification information, or include these pieces of identification information in the message to indicate that update of a routing rule is allowed.

Here, the MME_A 40 may include the fifteenth identification information and/or the sixteenth identification information in the modify EPS bearer context request message, or include these pieces of identification information in the message to indicate that update of a routing rule is allowed.

The TWAG_A 74 may include, in the PDN modification request message, the fifteenth identification information and/or the sixteenth identification information, or include these pieces of identification information in the message to indicate that update of a routing rule is allowed.

The ePDG_A 65 may include, in the INFORMATIONAL request message, the fifteenth identification information and/or the sixteenth identification information, or include these pieces of identification information in the message to indicate that update of a routing rule is allowed.

Moreover, each apparatus may transmit and/or receive the fifteenth identification information to indicate that the Access Traffic Switching function and/or the NBIFOM function is to be performed for a multi-access session.

Each apparatus may transmit and/or receive the fifteenth identification information to indicate that configuration or modification of the access for performing communication using a first type multi-access session is allowed or indicate the type of access after the configuration or modification. Note that the access to be configured or modified may be an access to be used for communication in one or multiple flows that can be performed using a first type multi-access session.

Each apparatus may transmit and/or receive the fifteenth identification information to indicate that configuration or modification of the routing rule associated with a first type multi-access session is allowed or indicate the routing rule associated with a first type multi-access session.

Moreover, each apparatus may transmit and/or receive the sixteenth identification information to indicate that execution of the Access Traffic Splitting function for communication in one or multiple flows that can be performed using a second type multi-access session is allowed or indicate that stopping of the Access Traffic Splitting function is allowed. Moreover, each apparatus may transmit and/or receive the sixteenth identification information to indicate the communication of a flow for which the Access Traffic Splitting function is to be performed.

Each apparatus may transmit and/or receive the sixteenth identification information to indicate that configuration or modification of the routing rule associated with a second type multi-access session is allowed or indicate the routing rule associated with a second type multi-access session.

Note that the modify EPS bearer context request message and/or the PDN modification request message and/or the INFORMATIONAL request message may be a routing rule update response message.

Next, steps of the procedure (B) of this procedure will be described. The PGW_A 30 transmits a bearer update reject message to the transmission source of the bearer resource command message and starts the procedure (B) of this procedure (S2510). More specifically, the PGW_A 30 transmits a bearer update reject message to the SGW_A 35 and/or the TWAG_A 74 and/or the ePDG_A 65 (S2510). Moreover, the SGW_A 35 and/or the TWAG_A 74 and/or the ePDG_A 65 receives the bearer update reject message. Note that the bearer update reject message may be an update bearer request message or an Update Bearer Response message including a reject cause.

Here, the PGW_A 30 and/or the SGW_A 35 may include, in the bearer update reject message, the seventeenth identification information and/or the eighteenth identification information, or include these pieces of identification information in the message to indicate that update of a routing rule is not allowed.

Next, in a case that the SGW_A 35 receives the bearer update reject message, the SGW_A 35 transmits the bearer update reject message to the MME_A 40 (S2510). Moreover, the MME_A 40 receives the bearer update reject message and transmits a modify EPS bearer context reject message to the UE_A 10 (S2512). In a case of receiving the PDN modification reject message, the TWAG_A 74 transmits the PDN modification reject message to the UE_A 10 (S2512). In a case that the ePDG_A 65 receives the bearer update reject message, the ePDG_A 65 transmits an INFORMATIONAL request message to the UE_A 10 (S2512). Note that the modify EPS bearer context reject message and/or the PDN modification reject message and/or the INFORMATIONAL request message may be a routing rule update reject message.

Here, the MME_A 40 may include, in the modify EPS bearer context reject message, the seventeenth identification information and/or the eighteenth identification information, or include these pieces of identification information in the message to indicate that update of a routing rule is not allowed.

The TWAG_A 74 may include the seventeenth identification information and/or the eighteenth identification information in the PDN modification reject message, or include these pieces of identification information in the message to indicate that update of a routing rule is not allowed.

The ePDG_A 65 may include, in the INFORMATIONAL request message, the seventeenth identification information and/or the eighteenth identification information, or include these pieces of identification information in the message to indicate that update of a routing rule is not allowed.

Moreover, each apparatus may transmit and/or receive the seventeenth identification information to indicate that the Access Traffic Switching function and/or the NBIFOM function is not allowed to be performed for a multi-access session.

Each apparatus may transmit and/or receive the seventeenth identification information to indicate that a request to configure or modify an access for performing communication using a first type multi-access session is rejected or indicate that a request to configure or modify an access to be used for communication that can be performed using a first type multi-access session in one or multiple flows.

Each apparatus may transmit and/or receive the seventeenth identification information to indicate that a request to configure or modify the routing rule associated with a first type multi-access session is rejected or make notification about cause of rejection of each request.

Moreover, each apparatus may transmit and/or receive the seventeenth identification information to indicate that configuration or modification of an access for performing communication using a first type multi-access session is not allowed or indicate that configuration or modification of a routing rule corresponding to a first type multi-access session is not allowed.

Moreover, each apparatus may transmit and/or receive the eighteenth identification information to indicate that a request to perform the Access Traffic Splitting function for communication in one or multiple flows that can be performed using a second type multi-access session is rejected or indicate that a request to stop the Access Traffic Splitting function is rejected. Moreover, each apparatus may transmit and/or receive the eighteenth identification information to indicate the communication of a flow not to perform the Access Traffic Splitting function.

Each apparatus may transmit and/or receive the eighteenth identification information to indicate that a request to configure or modify the routing rule associated with a second type multi-access session is rejected or make notification about cause of rejection of each request.

Moreover, each apparatus may transmit and/or receive the eighteenth identification information to indicate that execution of Access Traffic Splitting function is not allowed for each flow or indicate that configuration or modification of a routing rule corresponding to a second type multi-access session is not allowed.

The UE_A 10 receives the modify EPS bearer context reject message and/or the PDN modification reject message and/or INFORMATIONAL request message. Moreover, in a case of receiving an INFORMATIONAL request message, the UE_A 10 transmits an INFORMATIONAL response message to the ePDG_A 65 (S2514). Each apparatus completes the procedure (B) of this procedure, based on transmission and/or reception of the modify EPS bearer context reject message and/or the PDN modification reject message and/or the INFORMATIONAL request message and/or the INFORMATIONAL response message.

Each apparatus completes this procedure, based on completion of the procedure (A) or (B) of this procedure. Note that each apparatus may recognize that this procedure is accepted, based on completion of the procedure (A) of this procedure or recognize that this procedure is rejected, based on completion of the procedure (B) of this procedure.

Each apparatus may update or may not necessarily update the routing rule corresponding to a multi-access session, based on completion of this procedure. In other words, in a case of receiving the fifteenth identification information and/or the sixteenth identification information, each apparatus may update the routing rule corresponding to the multi-access session. In a case of receiving the seventeenth identification information and/or the eighteenth identification information, each apparatus may update the routing rule corresponding to the multi-access session.

Moreover, in a case of transmitting and/or receiving the fifteenth identification information, each apparatus may perform the Access Traffic Switching function and/or the NBIFOM function for the multi-access session. In a case of transmitting and/or receiving the fifteenth identification information, each apparatus may recognize that the access for performing communication using a first type multi-access session is configured or modified, or recognize the access after the configuration or modification.

In a case of transmitting and/or receiving the fifteenth identification information, each apparatus may recognize that the routing rule associated with a first type multi-access session is configured or modified, or recognize or store the routing rule associated with a first type multi-access session.

Moreover, in a case of transmitting and/or receiving the sixteenth identification information, each apparatus may perform or stop the Access Traffic Splitting function for communication of one or multiple flows that can be performed by using a second type multi-access session. Moreover, in a case of transmitting and/or receiving the sixteenth identification information, each apparatus may recognize the communication in a flow to which the Access Traffic Splitting function is applicable.

In a case of transmitting and/or receiving the sixteenth identification information, each apparatus may recognize that the routing rule associated with a second type multi-access session is configured or modified, or recognize or store the routing rule associated with a second type multi-access session.

Moreover, in a case of transmitting and/or receiving the seventeenth identification information, each apparatus may determine that it is not possible to perform the Access Traffic Switching function and/or the NBIFOM function for the multi-access session, or recognize that the access for performing communication using a first type multi-access session is not configured or modified.

In a case of transmitting and/or receiving the seventeenth identification information, each apparatus may recognize that the routing rule associated with a first type multi-access session is not configured or modified.

Moreover, in a case of transmitting and/or receiving the eighteenth identification information, each apparatus may determine that the Access Traffic Splitting function cannot be executed or stopped for communication in one or multiple flows that can be performed using a second type multi-access session or recognize the communication of a flow to which the Access Traffic Splitting function is not applicable.

In a case of transmitting and/or receiving the eighteenth identification information, each apparatus may recognize that the routing rule associated with a second type multi-access session is not configured or modified.

1.3.5. Modified Example of Present Embodiment

Each apparatus according to the present embodiment may be an apparatus different from the corresponding apparatus described above. For example, the MME_A 40 is an apparatus that plays a role of mobility management of each apparatus, such as the UE_A 10, and/or session management between apparatuses, but the role of mobility management and the role of session management may be played by different apparatuses in the core network_A 90 of the present embodiment.

Specifically, a Session Management Entity (SME) may play the function of session management of the MME_A 40. In this case, the MME_A 40 of the present embodiment can be replaced with a Session Management Entity (SME). Moreover, each message transmitted from and/or received by the MME_A 40 described regarding the communication procedure in the present embodiment may be transmitted from and/or received by the SME, or each process performed by the MME_A 40 described regarding the communication procedure may be performed by the SME.

The eNB_A 45 in the present embodiment may be an apparatus in another 3GPP access network instead of being an apparatus in the E-UTRAN_A 80. For example, the eNB_A 45 may be a NextGen BS_A 122, a NB_A 22, or a BSS_A 26. The TWAG_A 74 in the present embodiment may be an apparatus in another non-3GPP access network or the WAG_A 126.

2. MODIFIED EXAMPLE

A program running on an apparatus according to the present invention may serve as a program that controls a Central Processing Unit (CPU) and the like to cause a computer to operate in such a manner as to realize the functions of the embodiment according to the present invention. Programs or the information handled by the programs are stored in a volatile memory, such as a Random Access Memory (RAM), a non-volatile memory, such as a flash memory, a Hard Disk Drive (HDD), or another storage apparatus system.

Note that programs for implementing the functions of the embodiments related to the present invention may be recorded in a computer-readable recording medium. The programs recorded in this recording medium may be read by the computer system for execution, to implement the functions. It is assumed that the "computer system" refers to a computer system built into the apparatuses, and the computer system includes an operating system and hardware components such as a peripheral apparatus. Furthermore, the "computer-readable recording medium" may be any of a semiconductor recording medium, an optical recording medium, a magnetic recording medium, a medium configured to dynamically hold the programs for a short time period, and another computer-readable recording medium.

Furthermore, each functional block or various characteristics of the apparatuses used in the above-described embodiments may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic apparatuses, discrete gates or transistor logic, discrete hardware components, or a combination thereof. The general-purpose processor may be a microprocessor, or may be a processor of known type, a controller, a micro-controller, or a state machine instead. The above-mentioned electric circuits may be constituted of a digital circuit, or may be constituted of an analog circuit. Furthermore, in a case that with advances in semiconductor technology, a circuit integration technology appears that replaces the present integrated circuits, one or multiple modes of the present invention can use a new integrated circuit based on the technology.

Note that the invention of the present patent application is not limited to the above-described embodiments. In the embodiments, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

REFERENCE SIGNS LIST

1 Mobile communication system
5 PDN_A
10 UE_A
20 UTRAN_A
22 NB_A
24 RNC_A
25 GERAN_A
26 BSS_A
30 PGW_A
35 SGW_A
40 MME_A
45 eNB_A
46 SCEF_A
50 HSS_A
55 AAA_A
60 PCRF_A
65 ePDG_A 70 WLAN ANa
72 WLAN APa
74 TWAG_A
75 WLAN ANb
76 WLAN APb
80 E-UTRAN_A
90 Core network_A
120 NextGen RAN_A
122 NextGen BS_A
125 WLAN ANc
126 WAG_A

The invention claimed is:

1. A User Equipment (UE) comprising:
transmission and reception circuitry; and
a controller,
wherein:
the transmission and reception circuitry is configured to:
  transmit, to a core network, over 3GPP access, a Protocol Data Unit (PDU) Session Establishment Request message; and
  receive, from the core network, over the 3GPP access, a PDU Session Establishment Accept message, as a response to the PDU Session Establishment Request message, the PDU Session Establishment Accept message including routing rules for a Multi-Access PDU Session and identification information for establishing the Multi-Access PDU Session;
the controller is configured to recognize that the Multi-Access PDU Session is established, based on receiving the PDU Session Establishment Accept message;
a first communication path over the 3GPP access is established;
the transmission and reception circuitry is further configured to receive, over non-3GPP access, a control message including the identification information; and
a second communication path over the non-3GPP access is established.

2. The UE according to claim 1, wherein the PDU Session Establishment Request message further includes information indicating that the UE supports Access Traffic Switching and Access Traffic Splitting.

3. The UE according to claim 1, wherein the PDU Session Establishment Request message further includes information indicating that the UE supports Access Traffic Splitting.

4. The UE according to claim 1, wherein the PDU Session Establishment Request message further includes information indicating that the UE supports Access Traffic Switching.

5. A communication method performed by a User Equipment (UE), the communication method comprising:
transmitting, a to a core network, over 3GPP access, a Protocol Data Unit (PDU) Session Establishment Request message;
receiving, from the core network, over the 3GPP access, a PDU Session Establishment Accept message, as a response to the PDU Session Establishment Request message, the PDU Session Establishment Accept message including routing rules for a Multi-Access PDU Session and identification information for establishing the Multi-Access PDU Session; and
recognizing that the Multi-Access PDU Session is established, based on receiving the PDU Session Establishment Accept message;
establishing a first communication path over the 3GPP access;
receiving, over non-3GPP access, a control message including the identification information; and
establishing a second communication path over the non-3GPP access.

6. The communication method according to claim 5, wherein the PDU Session Establishment Request message further includes information indicating that the UE supports Access Traffic Switching and Access Traffic Splitting.

7. The communication method according to claim 5, wherein the PDU Session Establishment Request message further includes information indicating that the UE supports Access Traffic Splitting.

8. The communication method according to claim 5, wherein the PDU Session Establishment Request message further includes information indicating that the UE supports Access Traffic Switching.

* * * * *